United States Patent
Kompala et al.

(10) Patent No.: US 11,679,345 B2
(45) Date of Patent: Jun. 20, 2023

(54) PARTICLE SETTLING DEVICES

(71) Applicant: SUDHIN BIOPHARMA, Superior, CO (US)

(72) Inventors: Dhinakar S. Kompala, Superior, CO (US); Braden L. Smith, Lafayette, CO (US)

(73) Assignee: Sudhin Biopharma, Superior, CO (US)

( * ) Notice: Subject to any disclaimer, the term of this patent is extended or adjusted under 35 U.S.C. 154(b) by 21 days.

(21) Appl. No.: 17/205,858

(22) Filed: Mar. 18, 2021

(65) Prior Publication Data

US 2021/0291080 A1    Sep. 23, 2021

Related U.S. Application Data

(60) Provisional application No. 62/991,976, filed on Mar. 19, 2020.

(51) Int. Cl.
*B01D 21/02* (2006.01)
*B01D 21/00* (2006.01)
(Continued)

(52) U.S. Cl.
CPC ....... *B01D 21/003* (2013.01); *B01D 21/0006* (2013.01); *B01D 21/0045* (2013.01); *B01D 21/2416* (2013.01); *B01D 21/2494* (2013.01); *B01D 21/265* (2013.01); *B01D 21/30* (2013.01); *B01J 8/007* (2013.01); *C02F 1/38* (2013.01); *C02F 3/12* (2013.01); *C02F 2001/007* (2013.01); *C02F 2103/34* (2013.01); *C02F 2203/006* (2013.01)

(58) Field of Classification Search
CPC ............. B01D 21/003; B01D 21/0045; B01D 21/0087; B01D 21/2416; B01D 21/30
USPC ....................... 210/802, 519, 521, 522, 532.1
See application file for complete search history.

(56) References Cited

U.S. PATENT DOCUMENTS 1,274,814 A * 8/1918 Sundness .................. B04C 5/02
                                                                210/521
1,578,221 A * 3/1926 Vachier .................. C13B 20/00
                                                                210/521

(Continued)

FOREIGN PATENT DOCUMENTS

CA       2853391      12/2015
CN      101707916     5/2010

(Continued)

OTHER PUBLICATIONS

Official Action for Canada Patent Application No. 3097587, dated Oct. 26, 2021, 3 pages.

(Continued)

*Primary Examiner* — Christopher Upton
(74) *Attorney, Agent, or Firm* — Sheridan Ross P.C.

(57) ABSTRACT

Settling devices for separating particles from a bulk fluid with applications in numerous fields. The particle settling devices include a stack of cones with a small opening oriented upwardly or downwardly. The cones have an interior surface that is convex. These devices are useful for separating small (millimeter or micron sized) particles from a bulk fluid with applications in numerous fields, such as biological (microbial, mammalian, plant, insect or algal) cell cultures, solid catalyst particle separation from a liquid or gas and waste-water treatment.

20 Claims, 47 Drawing Sheets

(51) Int. Cl.
*C02F 1/38* (2023.01)
*B01D 21/24* (2006.01)
*B01J 8/00* (2006.01)
*C02F 3/12* (2023.01)
*B01D 21/26* (2006.01)
*B01D 21/30* (2006.01)
*C02F 1/00* (2023.01)
*C02F 103/34* (2006.01)

(56) References Cited

U.S. PATENT DOCUMENTS

| | | | |
|---|---|---|---|
| 1,602,935 A | 10/1926 | Rasey | |
| 1,682,256 A * | 8/1928 | Schwarz | B01D 21/2416 |
| | | | 210/522 |
| 1,701,068 A | 2/1929 | Flowers | |
| 2,230,386 A | 2/1941 | Pecker | |
| 2,253,543 A | 8/1941 | Weber et al. | |
| 2,261,101 A | 10/1941 | Erwin | |
| 2,307,154 A | 1/1943 | Osuna | |
| 2,470,076 A | 5/1949 | Warren et al. | |
| 2,651,415 A | 9/1953 | Worthen et al. | |
| 3,306,456 A | 2/1967 | Fromson et al. | |
| 3,337,050 A | 8/1967 | Labecki | |
| 3,718,257 A | 2/1973 | Bach | |
| 3,915,862 A | 10/1975 | Moloney | |
| 3,919,084 A * | 11/1975 | Bebech | B01D 21/0045 |
| | | | 210/519 |
| 3,960,734 A | 6/1976 | Zagorski | |
| 4,048,069 A | 9/1977 | Cuvillier et al. | |
| 4,138,342 A | 2/1979 | Middelbeek et al. | |
| 4,151,084 A | 4/1979 | Probstein | |
| 4,264,454 A | 4/1981 | Ankersmit | |
| 4,348,215 A | 9/1982 | Dehne | |
| 4,406,789 A * | 9/1983 | Brignon | B01D 17/02 |
| | | | 210/519 |
| 4,859,347 A | 8/1989 | Simon et al. | |
| 4,931,175 A | 6/1990 | Krofta | |
| 4,939,087 A | 7/1990 | Van Wie et al. | |
| 4,988,441 A | 1/1991 | Moir | |
| 5,320,963 A | 6/1994 | Knaack et al. | |
| 5,401,404 A | 3/1995 | Strauss | |
| 5,492,622 A | 2/1996 | Broussard | |
| 5,624,580 A | 4/1997 | De Hoxar | |
| 5,637,217 A | 6/1997 | Herman et al. | |
| 5,713,985 A | 2/1998 | Hamilton | |
| 5,817,505 A | 10/1998 | Thompson et al. | |
| 5,840,198 A | 11/1998 | Clarke | |
| 5,904,855 A | 5/1999 | Manz et al. | |
| 5,948,271 A | 9/1999 | Wardwell et al. | |
| 6,133,019 A | 10/2000 | Herman | |
| 6,146,891 A | 11/2000 | Conden et al. | |
| 6,720,358 B2 | 4/2004 | Espinoza et al. | |
| 7,078,439 B2 | 7/2006 | Odueyngbo et al. | |
| 7,293,657 B1 | 11/2007 | Kelton et al. | |
| 7,431,846 B2 | 10/2008 | Palmer | |
| 7,931,445 B2 | 4/2011 | Haans et al. | |
| 8,216,854 B2 | 7/2012 | Ballerstadt et al. | |
| 8,342,338 B2 * | 1/2013 | Andoh | B01D 21/0045 |
| | | | 210/519 |
| 8,728,318 B2 | 5/2014 | Vellinga et al. | |
| 10,576,399 B2 | 3/2020 | Kompala | |
| 10,596,492 B2 | 3/2020 | Kompala | |
| 11,148,076 B2 * | 10/2021 | Kompala | B01D 21/0045 |
| 11,185,799 B2 * | 11/2021 | Kompala | B01D 21/0045 |
| 2003/0136729 A1 | 7/2003 | Batson | |
| 2005/0194316 A1 | 9/2005 | Pourahmadi et al. | |
| 2005/0194322 A1 | 9/2005 | Palmer | |
| 2006/0032486 A1 | 2/2006 | Prasad | |
| 2007/0246431 A1 | 10/2007 | Palmer | |
| 2008/0290023 A1 | 11/2008 | Greene et al. | |
| 2008/0318309 A1 | 12/2008 | Chang et al. | |
| 2009/0035856 A1 | 2/2009 | Galliher et al. | |
| 2009/0159523 A1 | 6/2009 | McCutchen | |
| 2009/0178975 A1 | 7/2009 | Slough et al. | |
| 2010/0133197 A1 | 6/2010 | Langner | |
| 2010/0165447 A1 | 7/2010 | Komatsu et al. | |
| 2011/0097800 A1 | 4/2011 | Kauling et al. | |
| 2012/0180662 A1 | 7/2012 | Missalla et al. | |
| 2013/0052105 A1 | 2/2013 | Butler | |
| 2013/0272943 A1 | 10/2013 | Braga | |
| 2014/0011270 A1 | 1/2014 | Chotteau et al. | |
| 2014/0044696 A1 | 2/2014 | Bamdad | |
| 2014/0225286 A1 | 8/2014 | Paxton | |
| 2014/0243571 A1 | 8/2014 | Lyon et al. | |
| 2015/0083651 A1 | 3/2015 | Jons et al. | |
| 2017/0090490 A1 | 3/2017 | Mills | |
| 2017/0197158 A1 | 7/2017 | Kompala | |
| 2017/0333815 A1 * | 11/2017 | Kompala | B01D 21/0045 |
| 2019/0210042 A1 | 7/2019 | Kompala | |
| 2019/0321756 A1 * | 10/2019 | Kompala | B01D 21/0045 |
| 2020/0269161 A1 | 8/2020 | Kompala | |
| 2020/0282341 A1 | 9/2020 | Kompala | |

FOREIGN PATENT DOCUMENTS

| | | |
|---|---|---|
| DE | 4438510 | 4/1996 |
| EP | 0521583 | 1/1993 |
| GB | 105318 | 4/1917 |
| GB | 2170419 | 8/1986 |
| JP | S53-139271 | 12/1978 |
| JP | S55-076005 | 5/1980 |
| JP | 2000-301022 | 10/2000 |
| RU | 2182508 | 5/2002 |
| RU | 2260468 | 9/2005 |
| WO | WO 91/06627 | 5/1991 |
| WO | WO 2012/098055 | 7/2012 |
| WO | WO 2016/007730 | 1/2016 |
| WO | WO 2016/089874 | 6/2016 |

OTHER PUBLICATIONS

Official Action (with English summary) for Japan Patent Application No. 2020-558546, dated Jan. 5, 2022, 10 pages.
Notice of Allowance (with English claims) for Russia Patent Application No. 2020137505, dated Nov. 22, 2021, 14 pages.
Notice of Allowance for Singapore Patent Application No. 11202010274X, dated Dec. 13, 2021, 6 pages.
Official Action for Australia Patent Application No. 2019257236, dated Sep. 14, 2021, 4 pages.
Official Action for China Patent Application No. 201980026831.7, dated Aug. 4, 2021, 14 pages.
Notice of Allowance for U.S. Appl. No. 16/806,904, dated Aug. 3, 2021, 16 pages.
Official Action (with English translation available) for Russia Patent Application No. 2020137505, dated May 24, 2021, 12 pages.
International Search Report and Written Opinion for International (PCT) Patent Application No. PCT/US2021/023006, dated May 27, 2021, 26 pages.
Notice of Allowance for U.S. Appl. No. 16/827,347, dated Jun. 3, 2021, 13 pages.
Acrivos et al., "Enhanced sedimentation in settling tanks with inclined walls," Journal of Fluid Mechanics, vol. 92, No. 3, Jun. 12, 1979, pp. 435-457. Abstract only.
Batt et al., "Inclined Sedimentation for Selective Retention of Viable Hybridomas in a Continuous Suspension Bioreactor," Biotechnology Progress, vol. 6, 1990, pp. 458-464. Abstract only.
Boycott, "Sedimentation of Blood Corpuscles," Nature, 1920, vol. 104, No. 2621, pp. 532. Abstract Only.
Brennan et al., "A perfusion system for antibody production by shear-sensitive hybridoma cells in a stirred reactor," Biotechnol. Techniques, vol. 1, No. 3, 1987, pp. 169-174. Abstract only.
Brown et al., "On-Line Removal of Cells from Continuous Suspension Cultures," in Production of Biologicals from Animal Cells in Culture, 1991, pp. 416-420. Abstract only.
Bungay et al., "Cross-Flow Lamellar Settlers for Microbial Cells," Biotechnology and Bioengineering, 1984, vol. 26, pp. 640-641.
Cilliers et al., "The application of mini-gydrocyclones in the concentration of yeast suspensions," Chemical Engineering Journal, vol. 65, No. 1, 1997, pp. 21-26. Abstract only.

(56) References Cited

OTHER PUBLICATIONS

Elsayed et al., "Use of Hydrocyclones for Mammalian Cell Retention: Separation Efficiency and Cell Viability (Part 1)," Eng. Life Sci., vol. 6, No. 4, 2006, pp. 347-354.
Geiler, et al., "Genetically Engineered In Vitro Erythropoiesis," International Journal of Stem Cells, vol. 9, No. 1, 2016, pp. 53-59.
Gorenflo et al., "Optimization of an Acoustic Cell Filter with a Novel Air-Backflush System," Biotechnology Progress, vol. 19, 2003, pp. 30-36. Abstract only.
Himmelfarb et al., "Spin Filter Culture: The Propagation of Mammalian Cells in Suspension" Science, vol. 164, No. 3879, 1969, pp. 555-557. Abstract only.
Johnson et al., "Use of the Centritech Lab Centrifuge for Perfusion Culture of Hybridoma Cells in Protein-Free Medium," Biotechnology Progress, vol. 12, 1999, pp. 855-864. Abstract only.
Kitano et al., "Production of human monoclonal antibodies by heterohybridomas," Applied Microbiology and Biotechnology, vol. 24, No. 4, 1986, pp. 282-286. Abstract only.
Knazek et al., "Cell culture on artificial capillaries: an approach to tissue growth in vitro," vol. 178, No. 4056, 1972, pp. 65-67. Abstract Only.
May, "Gene Therapy Dollar Is Waiting on Viral Vector Dime," Genetic Engineering and Biotechnology News, Feb. 1, 2020, retrieved from https://www.genengnews.com/topics/bioprocessing/gene-therapy-dollar-is-waiting-on-viral-vector-dime/, 7 pages.
Pagliarulo, "In CAR-T, manufacturing a hurdle Novartis has yet to clear," Biopharma Dive, Dec. 6, 2018, retrieved from https://www.biopharmadive.com/news/in-car-t-manufacturing-a-hurdle-novartis-has-yet-to-clear/543624/, 4 pages.
Panuganti et al., "Three-Stage Ex Vivo Expansion of High-Ploidy Megakaryocytic Cells: Toward Large-Scale Platelet Production," Tissue Engineering Part A, 2013, vol. 19(7&8), pp. 998-1014.
Pohlscheidt et al., "Optimizing Capacity Utilization by Large Scale 3000 L Perfusion in Seed Train Bioreactors," Biotechnology Progress, vol. 29, No. 1, Dec. 5, 2012, pp. 222-229.
Roberts, "Single-Use Technology: Enjoy the Upsides, Handle the Downsides," Genetic Engineering and Biotechnology News, May 31, 2019, retrieved from https://www.genengnews.com/insights/single-use-technology-enjoy-the-upsides-handle-the-downsides/, 6 pages.
Searles et al., "Viable Cell Recycle with an Inclined Settler in the Perfusion Culture of Suspended Recombinant Chinese Hamster Ovary Cells," Biotechnology Progress, 1994, vol. 10, No. 2, pp. 198-206, Abstract only.
Southey, "Lonza: Out of spec Kymriah 'not a Novartis issue . . . it's an industry issue'," Jul. 31, 2018, retrieved from https://www.biopharma-reporter.com/Article/2018/07/31/Lonza-Out-of-spec-Kymriah-not-a-Novartis-issue-it-s-an-industry-issue, 2 pages.
Yuan et al., "An Investigation into the Possible Use of Hydrocyclones for the Removal of Yeast from Beer," Bioseparation, vol. 6, 1996, pp. 159-163. Abstract only.
International Search Report and Written Opinion for International (PCT) Patent Application No. PCT/US15/39723, dated Dec. 1, 2015, 14 pages.
International Preliminary Report on Patentability for International (PCT) Patent Application No. PCT/US15/39723, dated Jan. 10, 2017, 10 pages.
International Search Report and Written Opinion for International (PCT) Patent Application No. PCT/US15/63195, dated Feb. 12, 2016, 12 pages.
International Preliminary Report on Patentability for International (PCT) Patent Application No. PCT/US15/63195, dated Jun. 6, 2017, 9 pages.
International Search Report and Written Opinion for International (PCT) Patent Application No. PCT/US17/31252, dated Jul. 20, 2017, 8 pages.
International Search Report and Written Opinion for International (PCT) Patent Application No. PCT/US19/25884, dated Jul. 30, 2019 10 pages.
International Preliminary Report on Patentability for International (PCT) Application No. PCT/US2019/025884, dated Oct. 29, 2020, 7 pages.
Official Action (with English translation) for India Patent Application No. 202017048858, dated Apr. 8, 2021, 6 pages.
Written Opinion for Singapore Patent Application No. 11202010274X, dated Apr. 9, 2021, 6 pages.
Official Action for U.S. Appl. No. 15/586,902, dated Jul. 10, 2019 18 pages.
Notice of Allowance for U.S. Appl. No. 15/586,902, dated Nov. 11, 2019 16 pages.
Official Action for U.S. Appl. No. 16/827,347, dated Feb. 18, 2021, 17 pages.
Official Action for U.S. Appl. No. 16/099,248, dated Jul. 10, 2019 17 pages.
Official Action for U.S. Appl. No. 16/375,683, dated Jul. 9, 2019 21 pages.
Notice of Allowance for U.S. Appl. No. 16/375,683, dated Oct. 24, 2019 11 pages.
Official Action for U.S. Appl. No. 16/806,904, dated Jan. 29, 2021, 16 pages.
Official Action for Australia Patent Application No. 2019257236, dated Mar. 3, 2022, 2 pages.
Official Action (with English machine translation) for China Patent Application No. 201980026831.7, dated Mar. 25, 2022, 33 pages.
Extended European Search Report for Europe Patent Application No. 19788142.8, dated Feb. 28, 2022, 8 pages.
U.S. Appl. No. 17/968,479, filed Oct. 18, 2022, Kompala et al.
Notice of Allowance for Australia Patent Application No. 2019257236, dated Aug. 22, 2022, 4 pages.
Notice of Allowance for Canada Patent Application No. 3097587, dated Jul. 18, 2022, 1 page.
Notice of Allowance (with English machine translation) for China Patent Application No. 201980026831.7, dated Nov. 2, 2022, 7 pages.
Official Action (with English summary) for Japan Patent Application No. 2020-558546, dated Sep. 6, 2022, 6 pages.
International Preliminary Report on Patentability for International (PCT) Patent Application No. PCT/US2021/023006, dated Sep. 29, 2022, 11 pages.

* cited by examiner

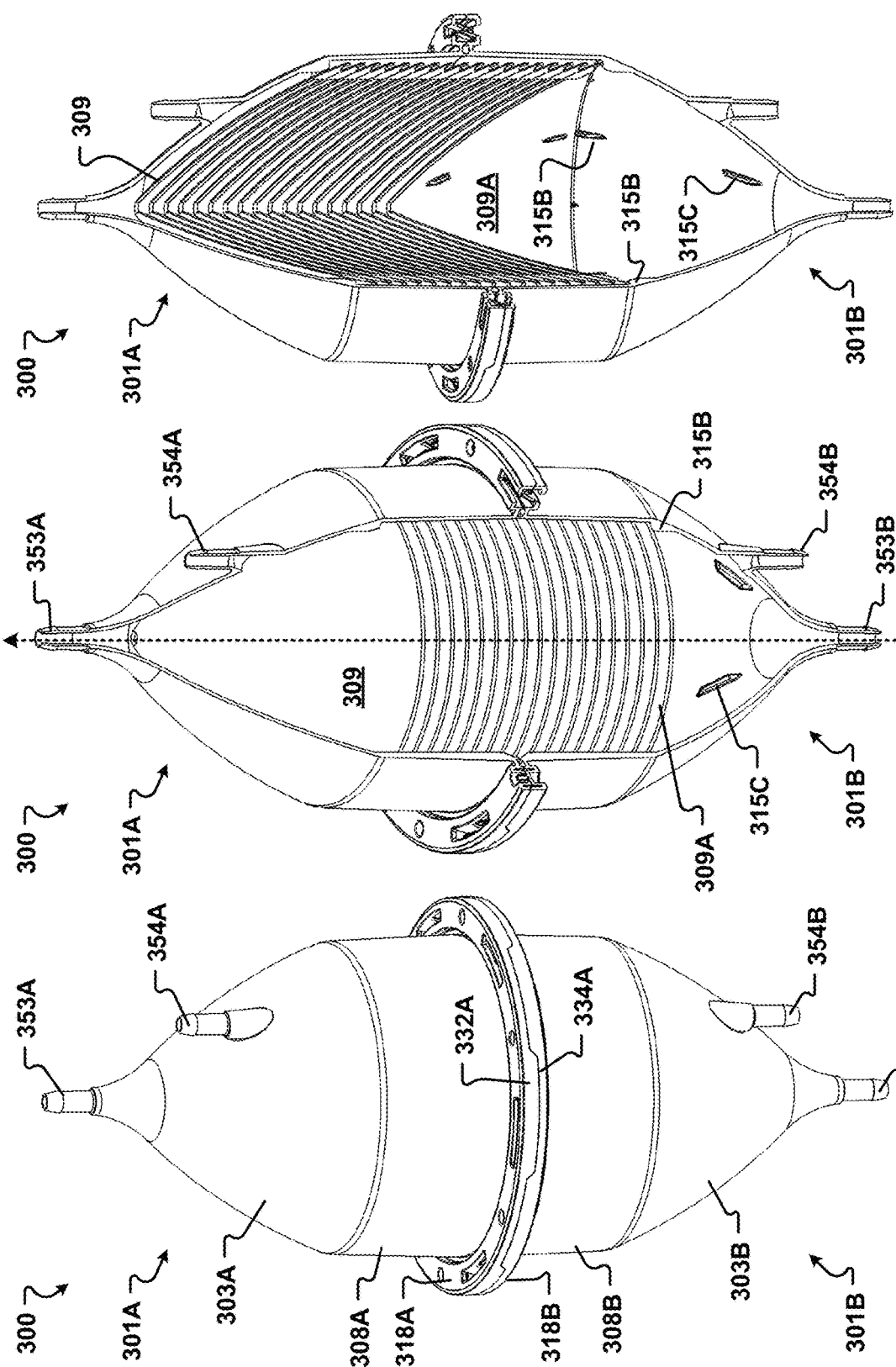

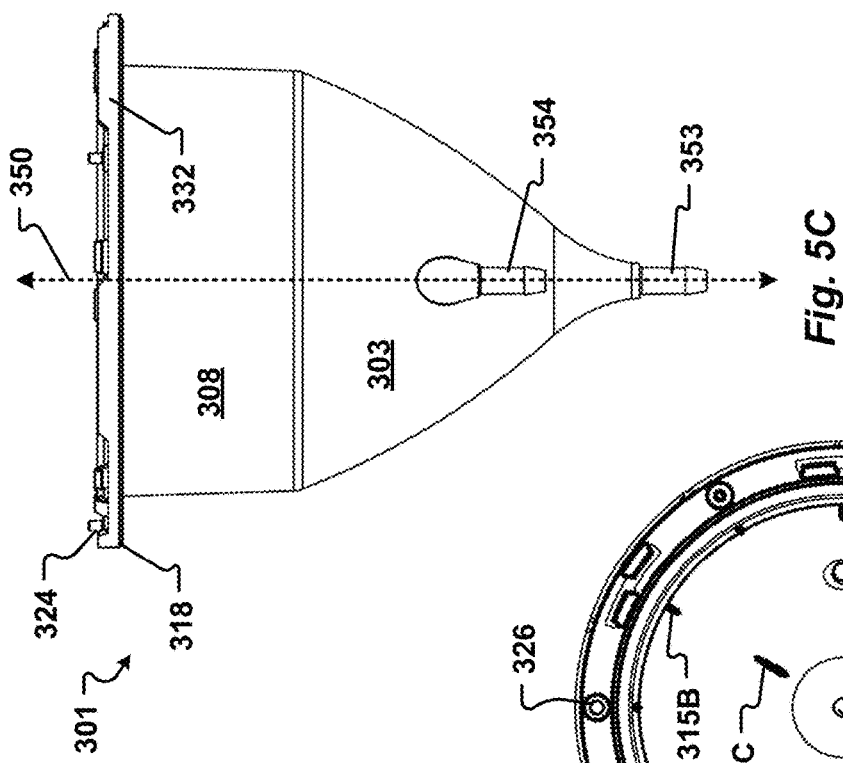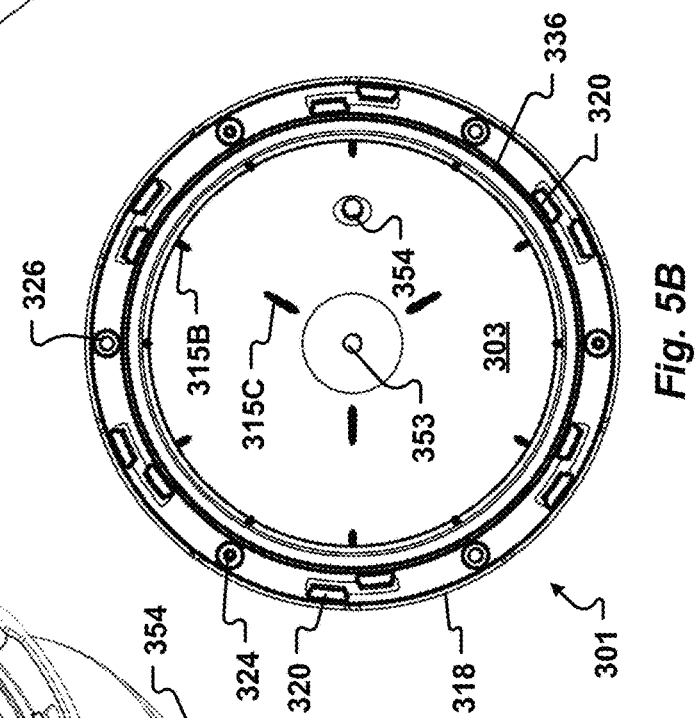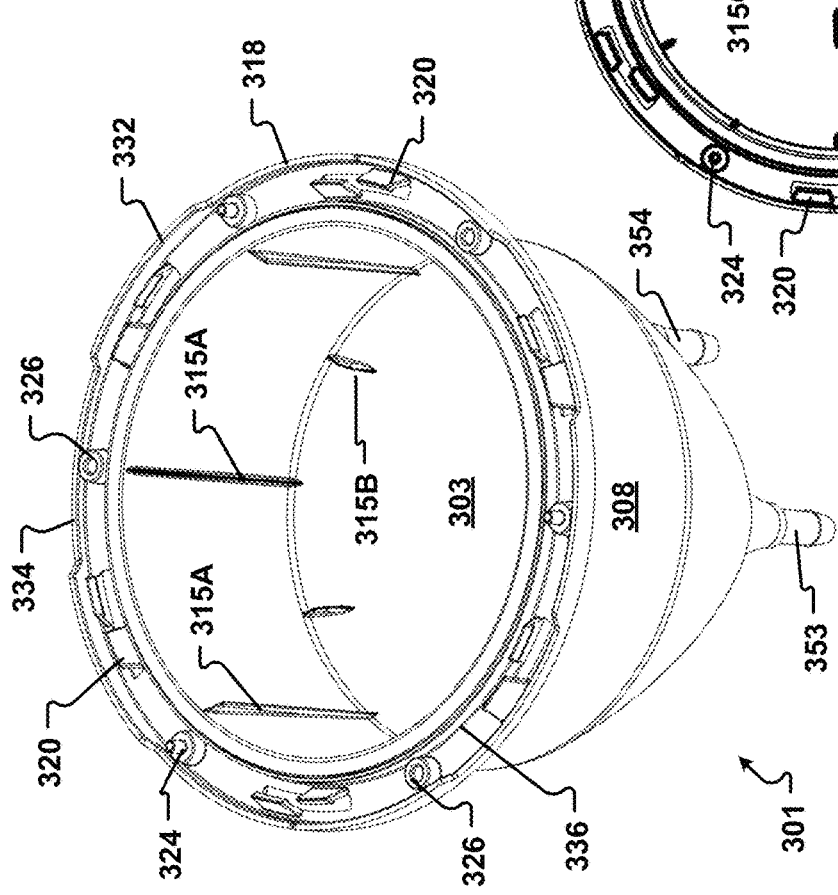

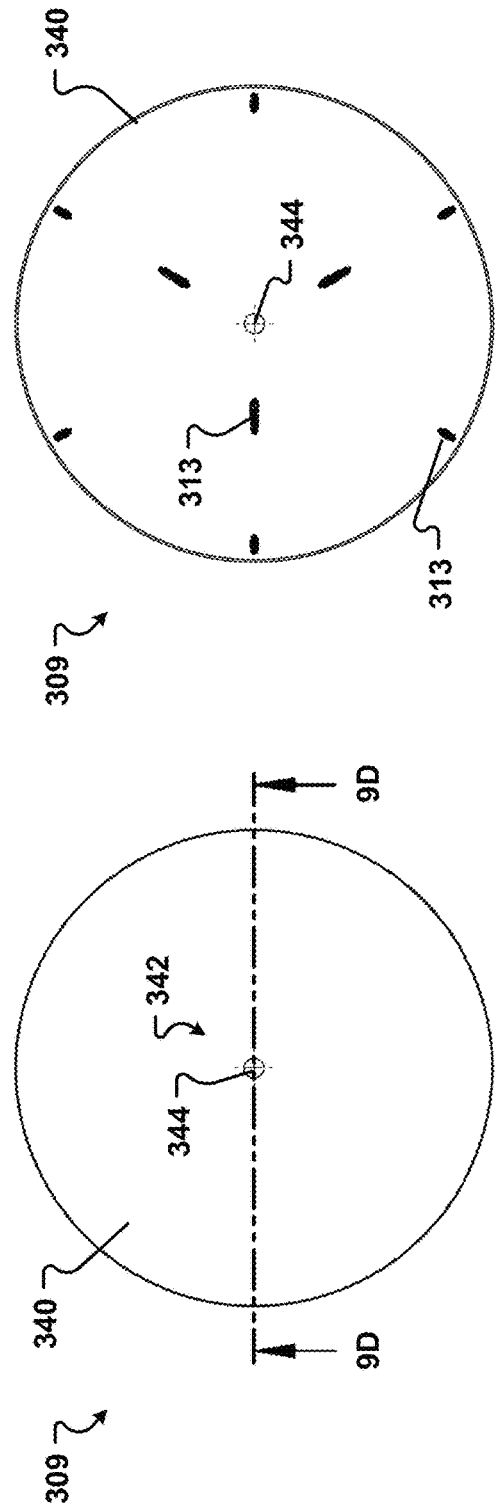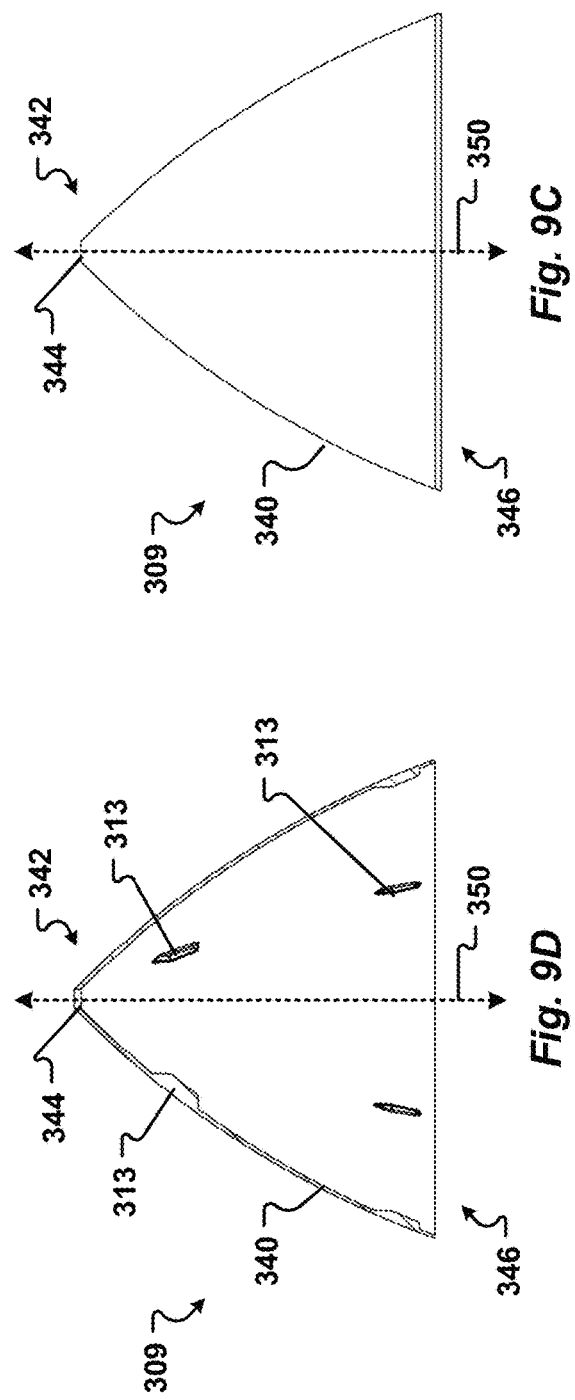

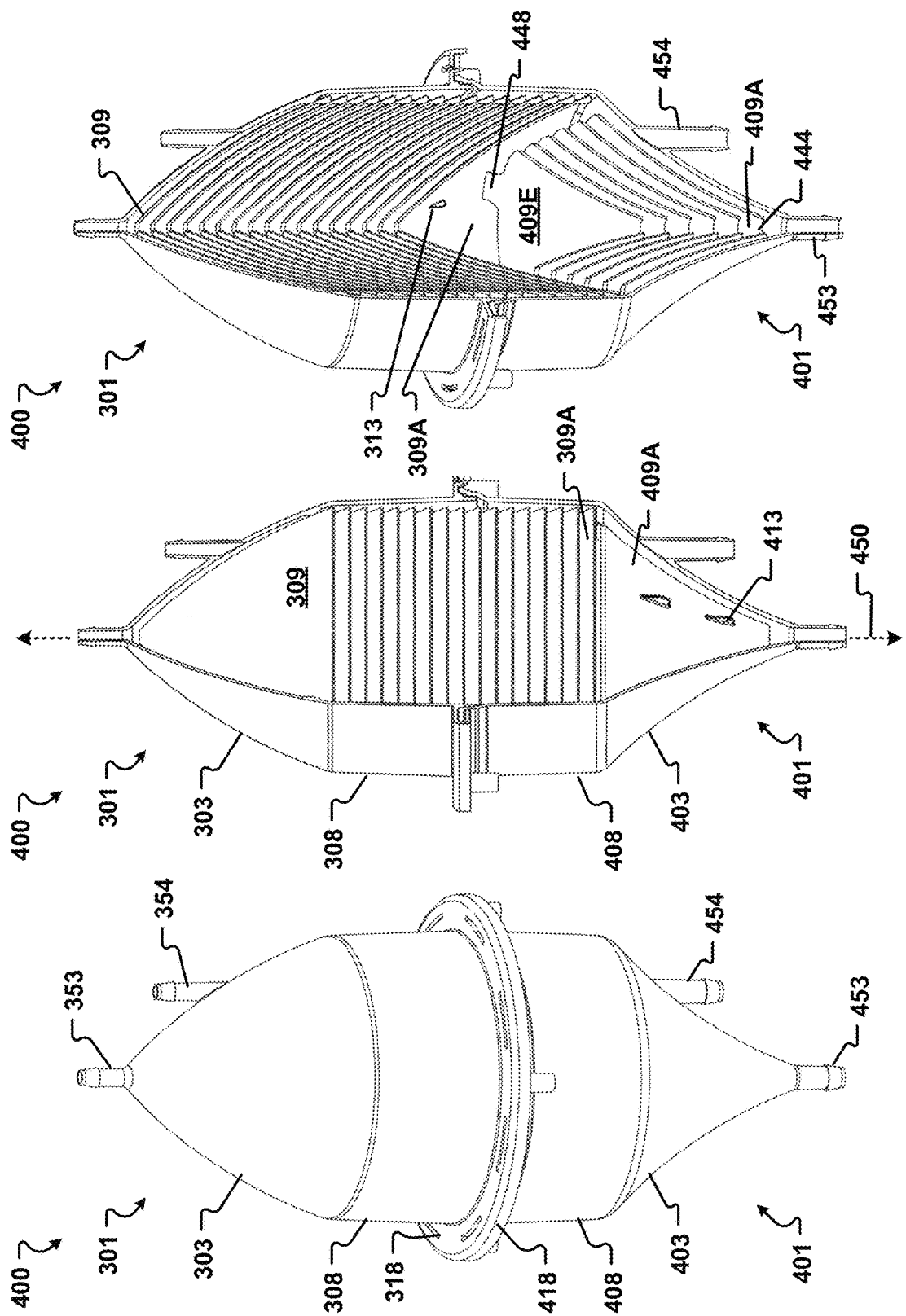

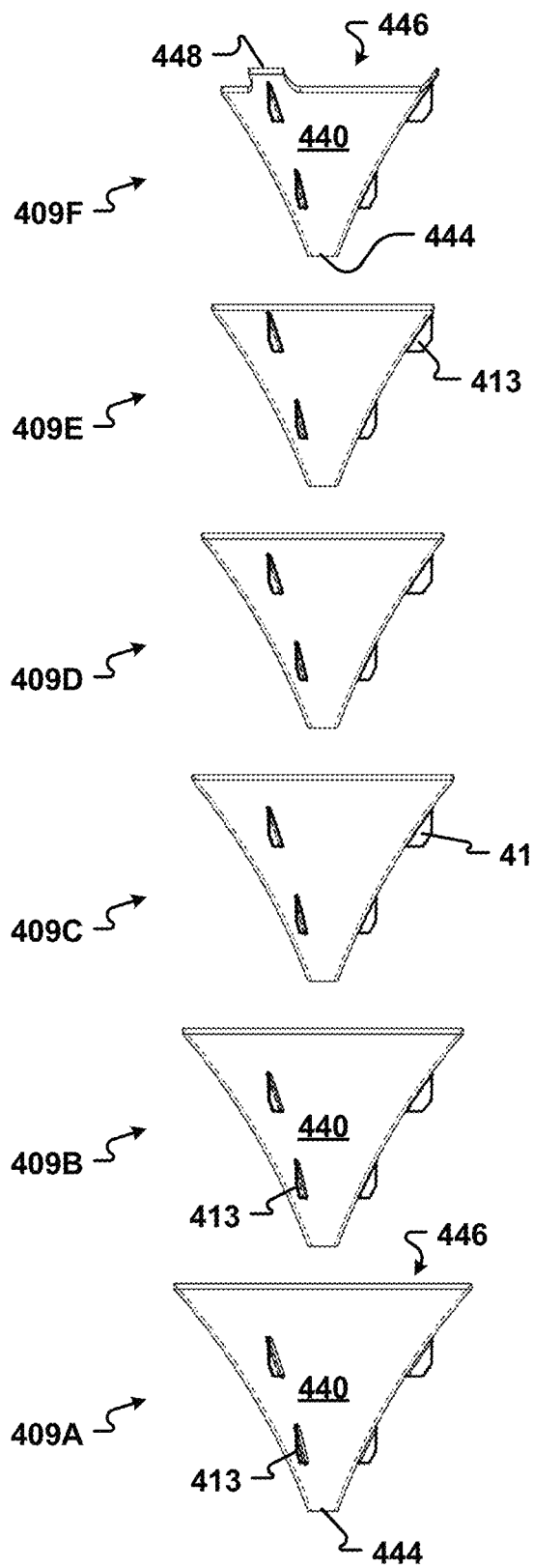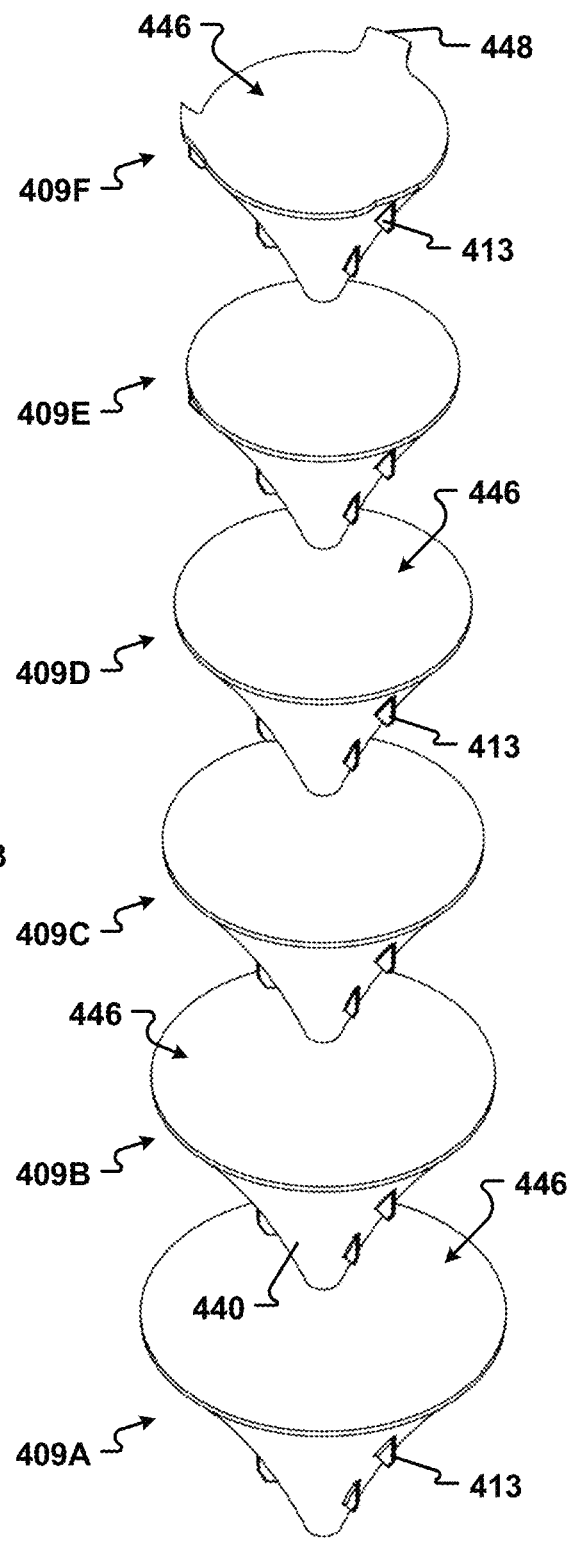
*Fig. 14*  *Fig. 15*

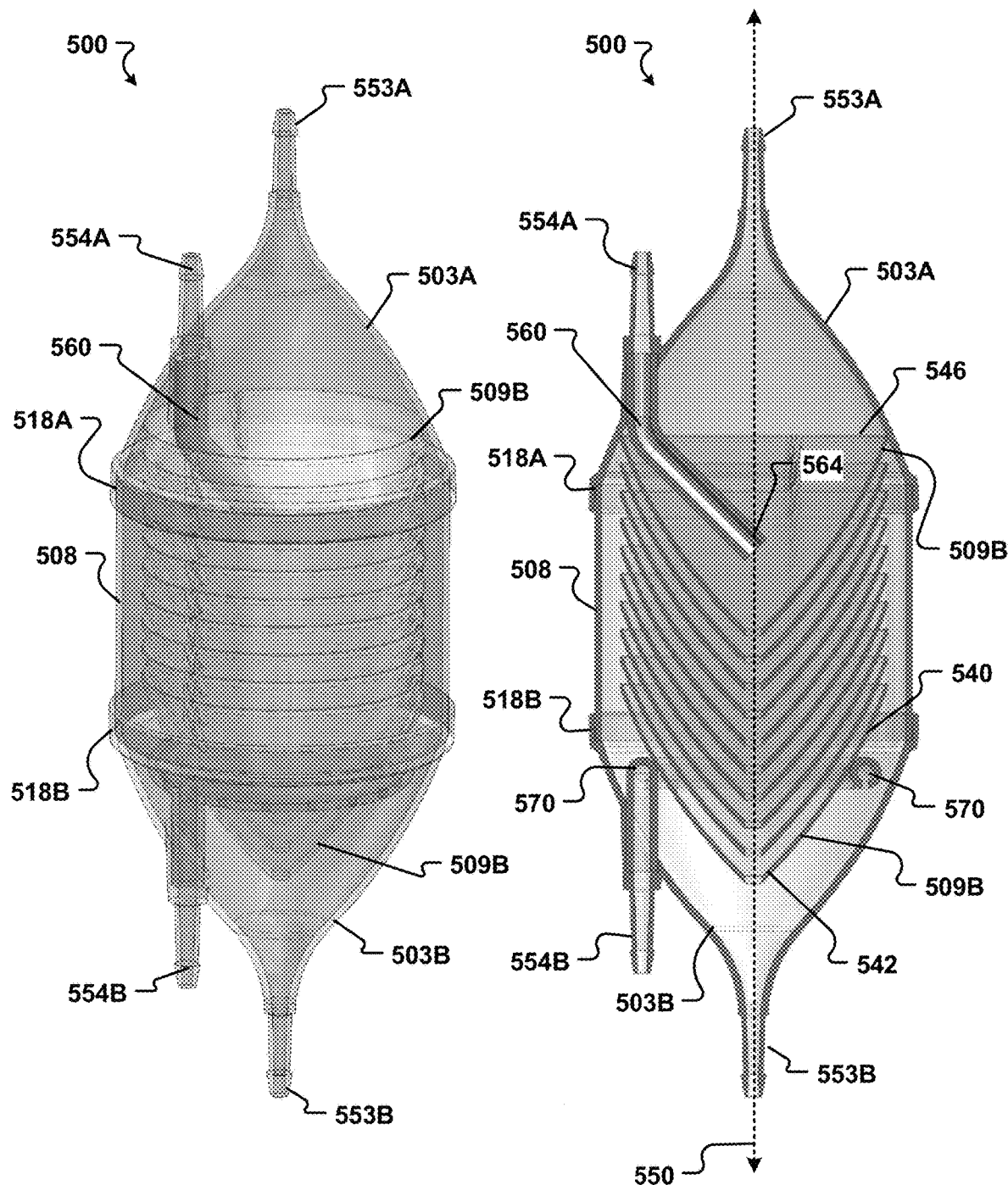
*Fig. 16*   *Fig. 17*

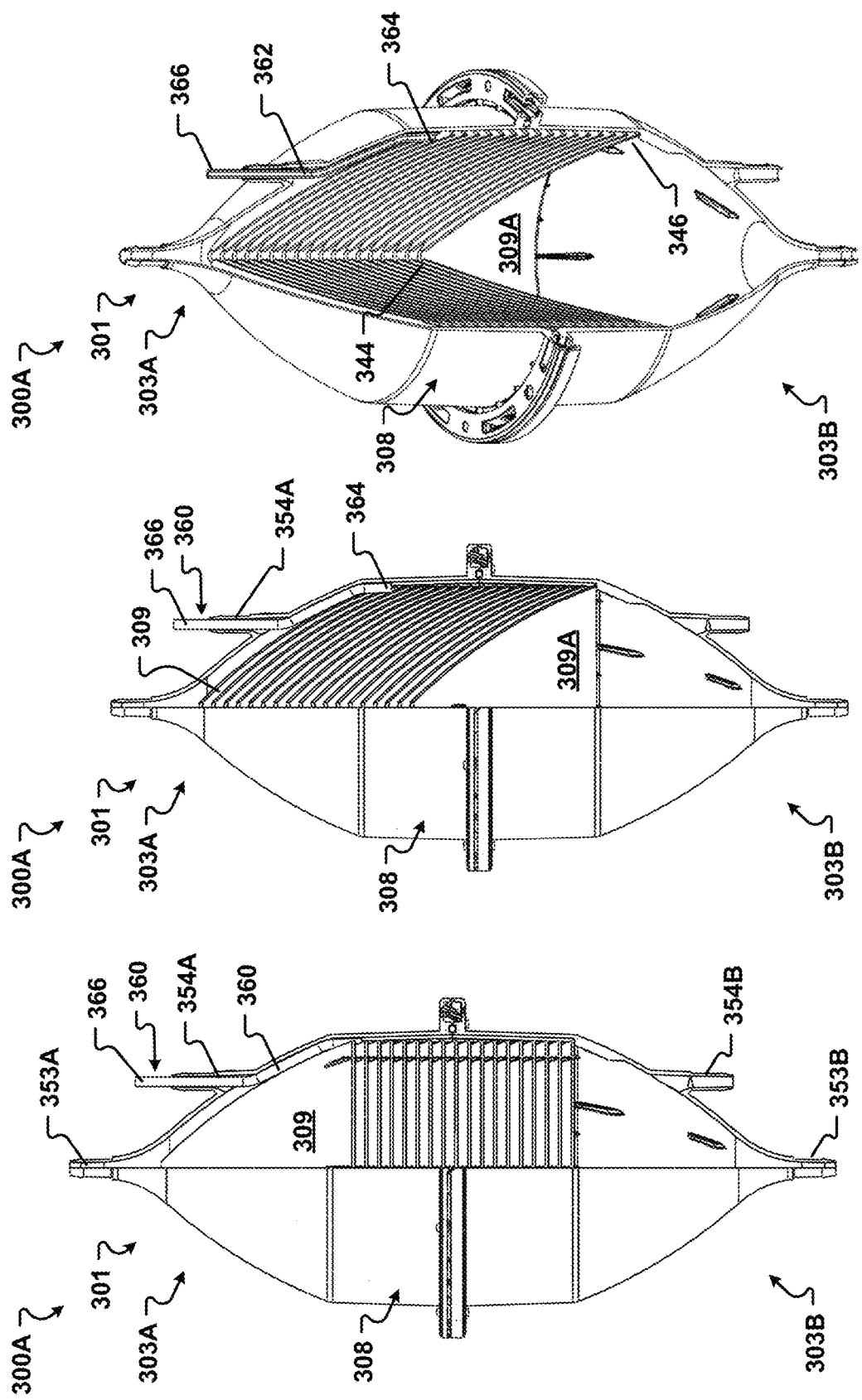

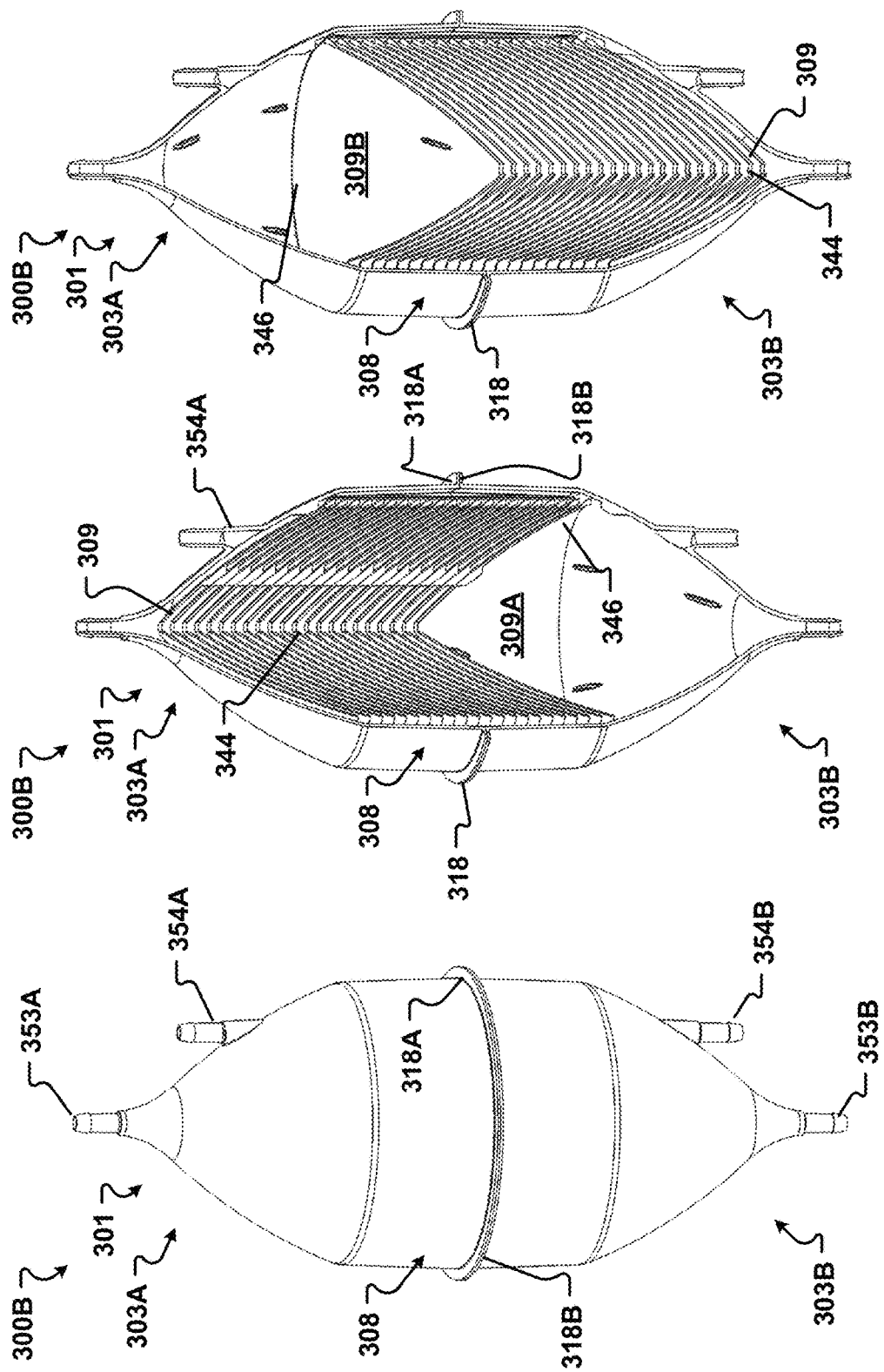

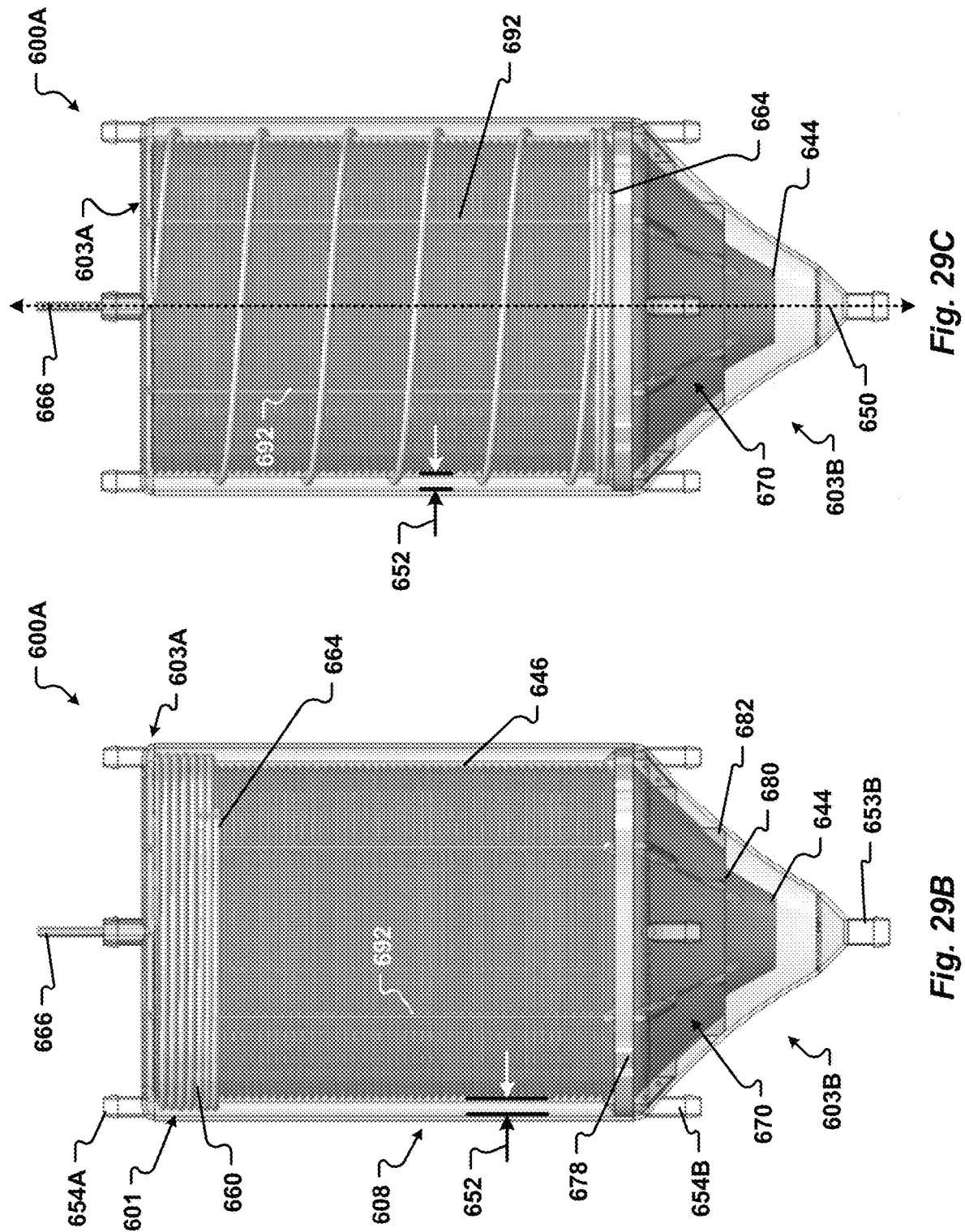

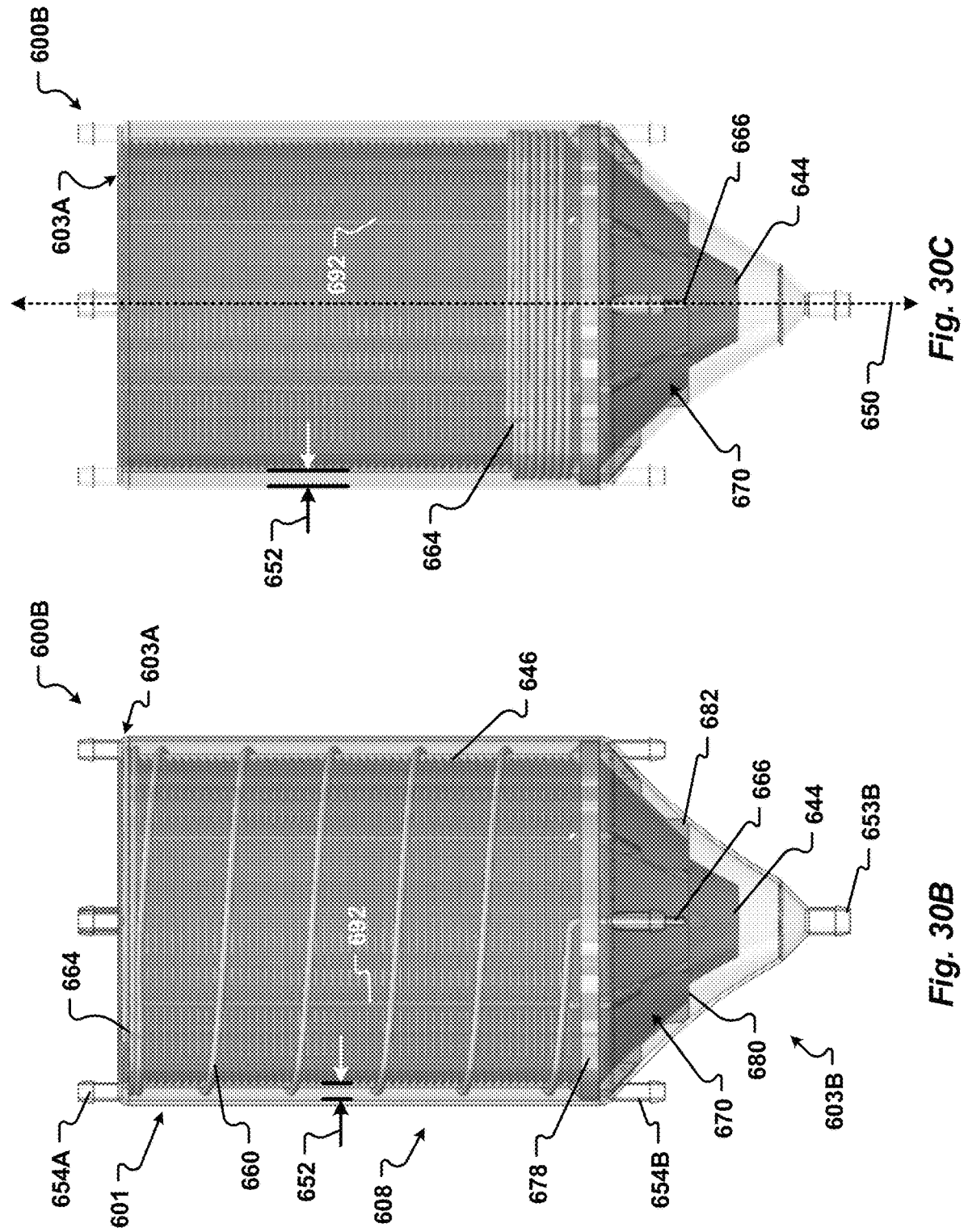

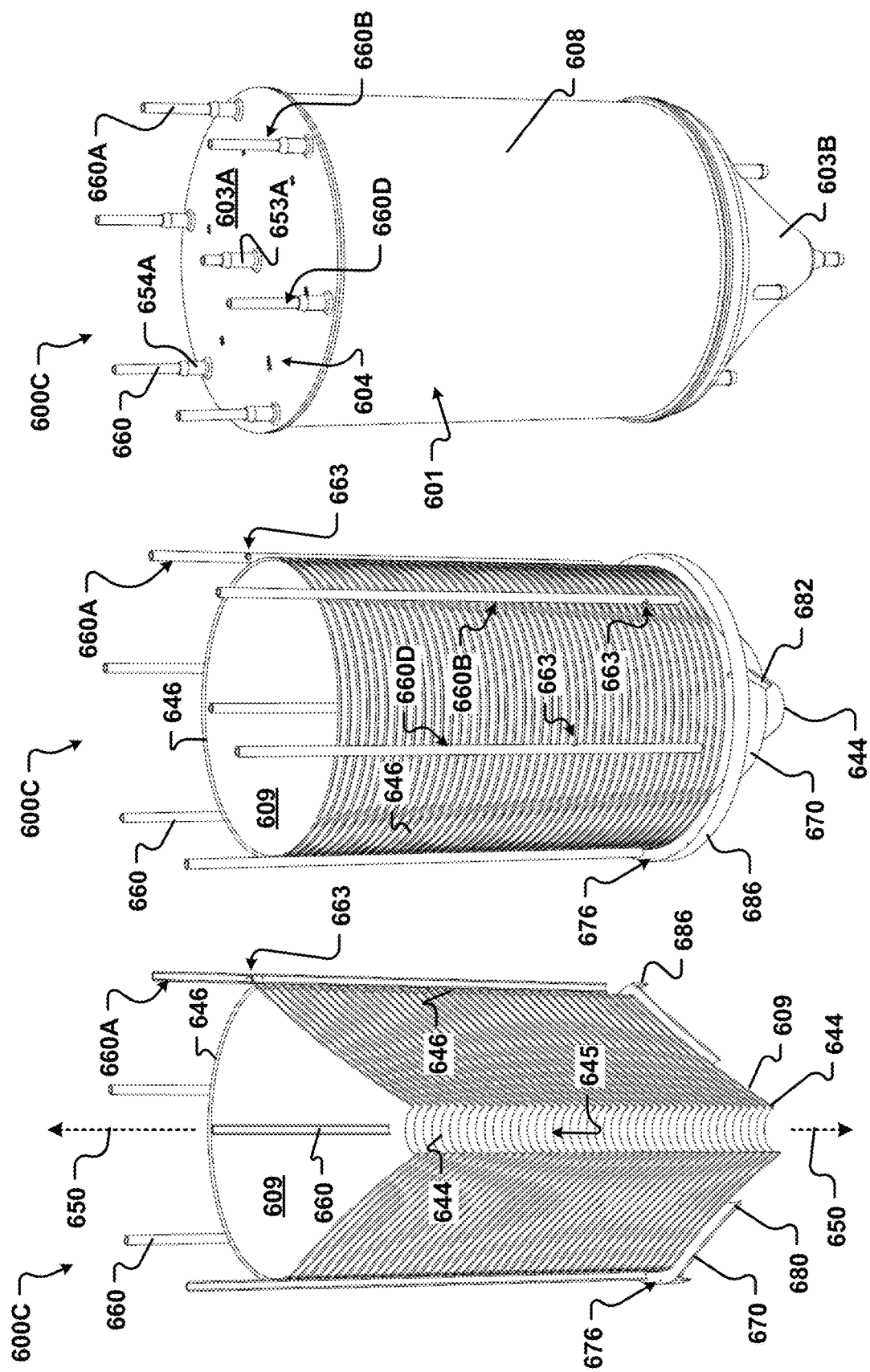

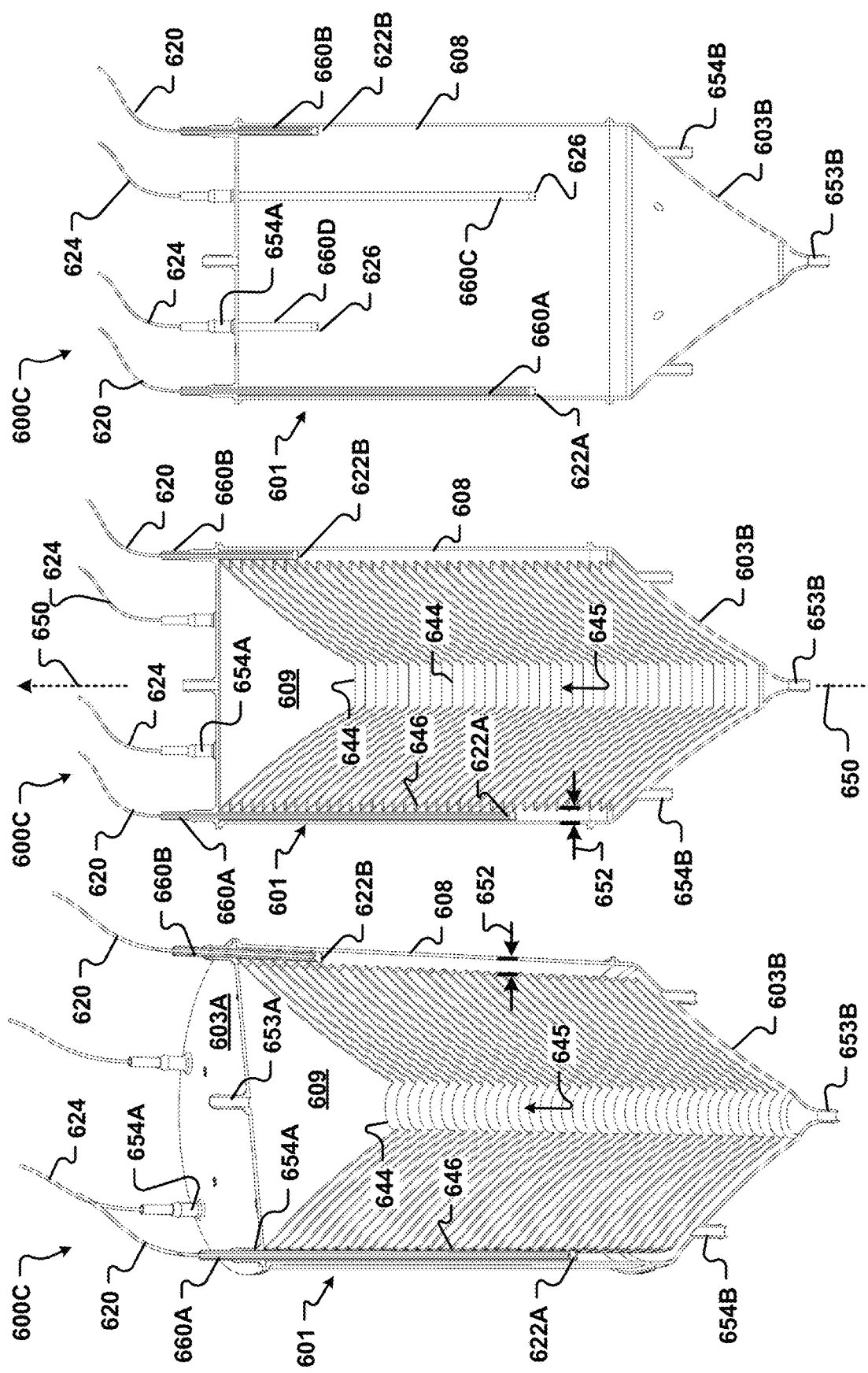

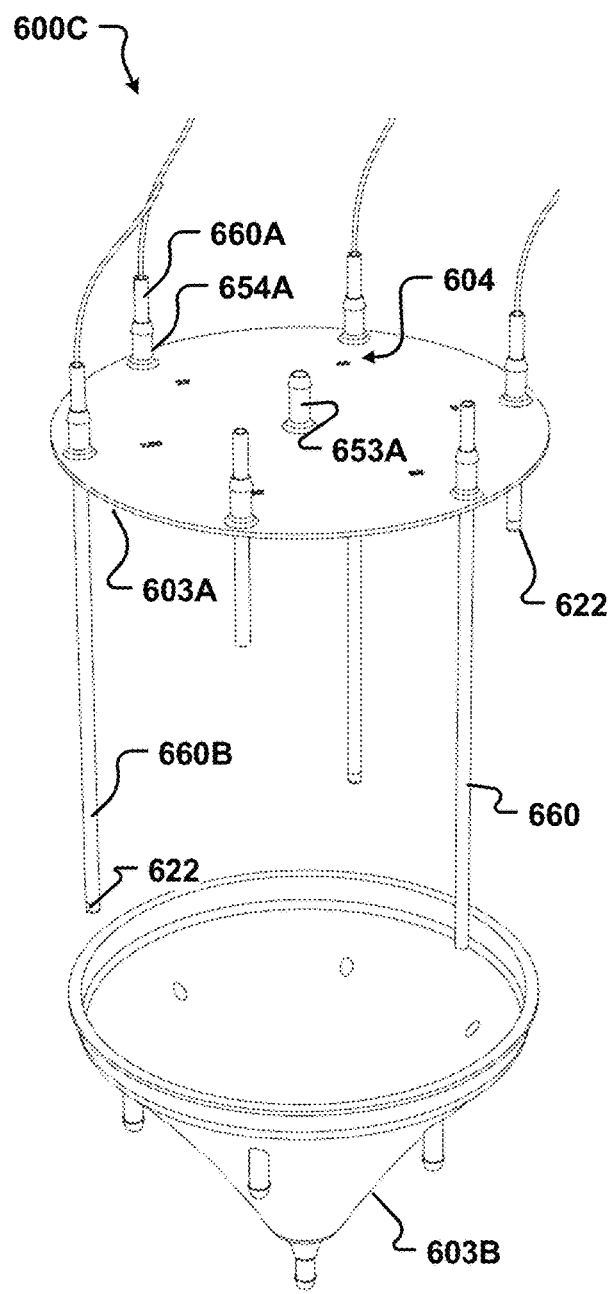
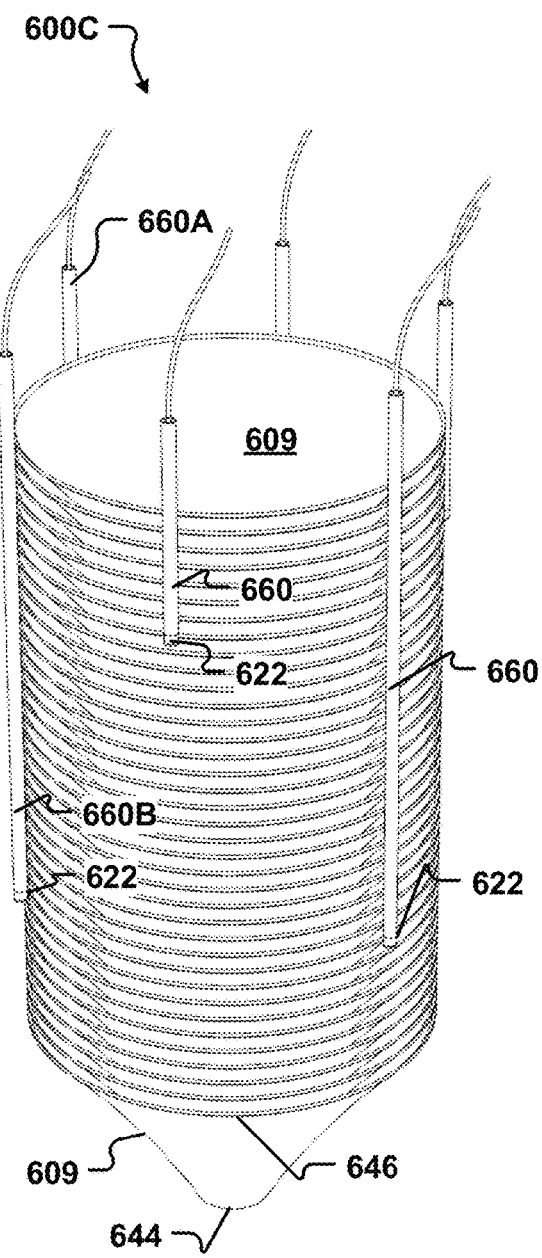
Fig. 45
Fig. 46

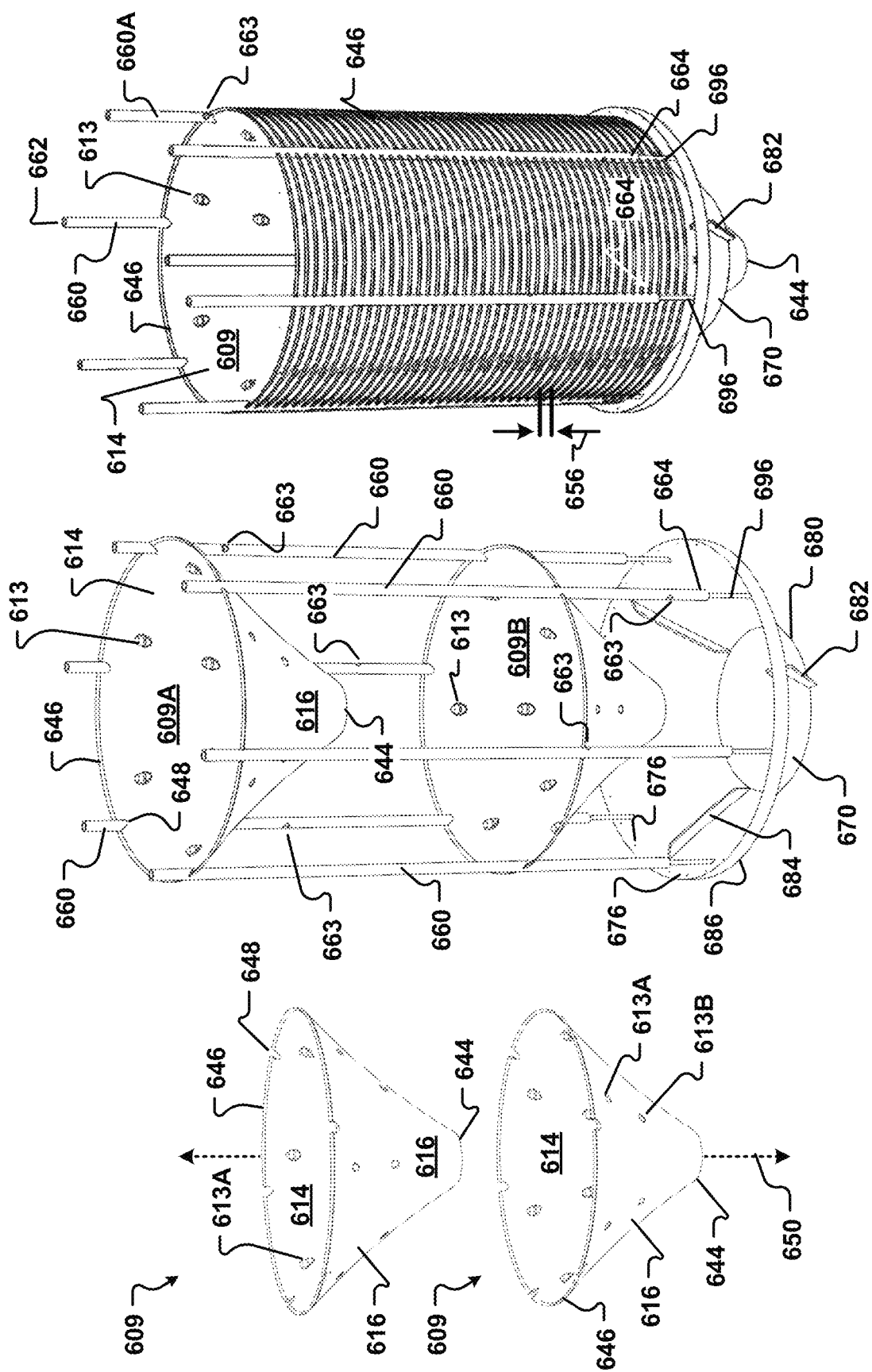

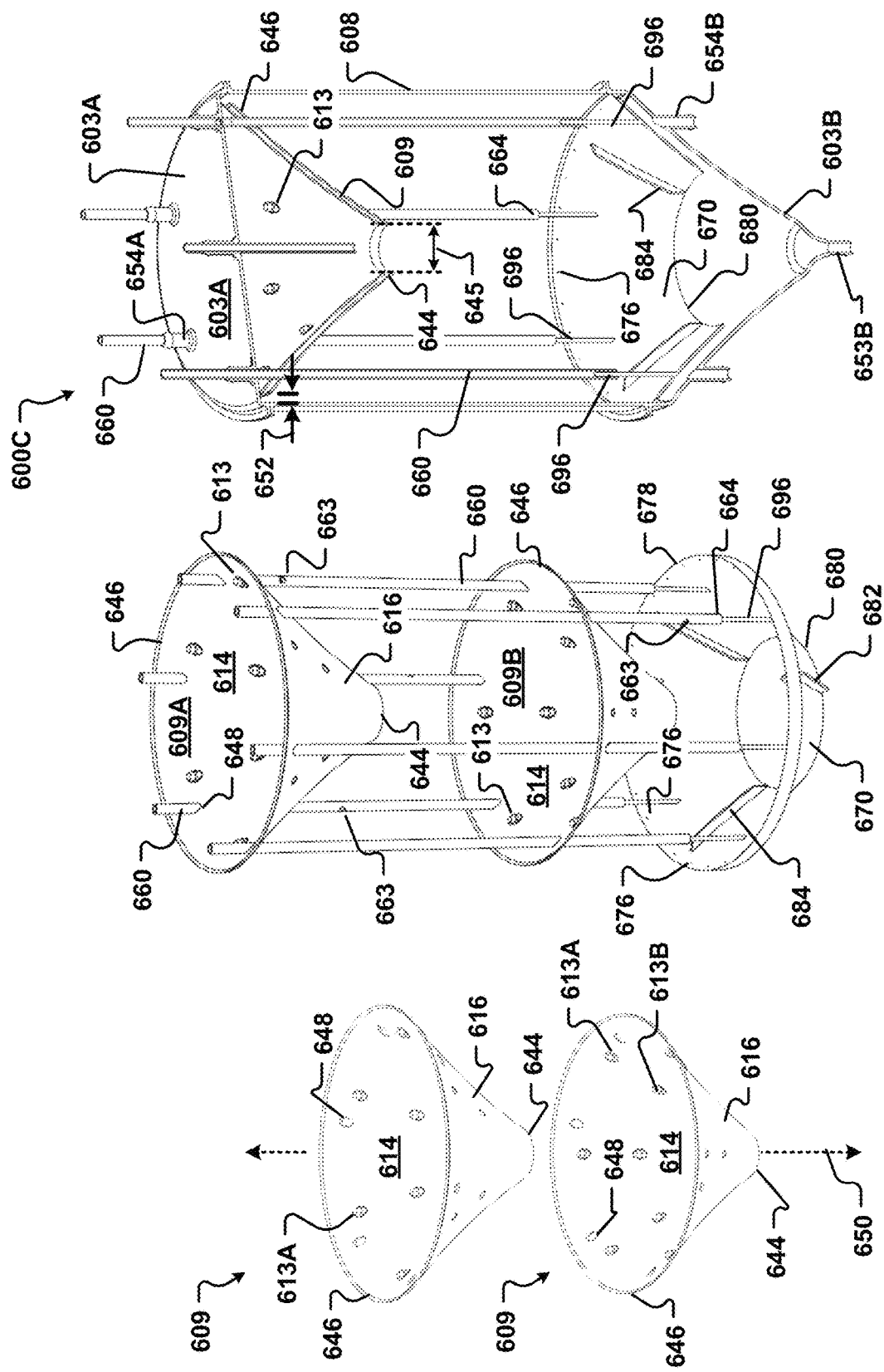

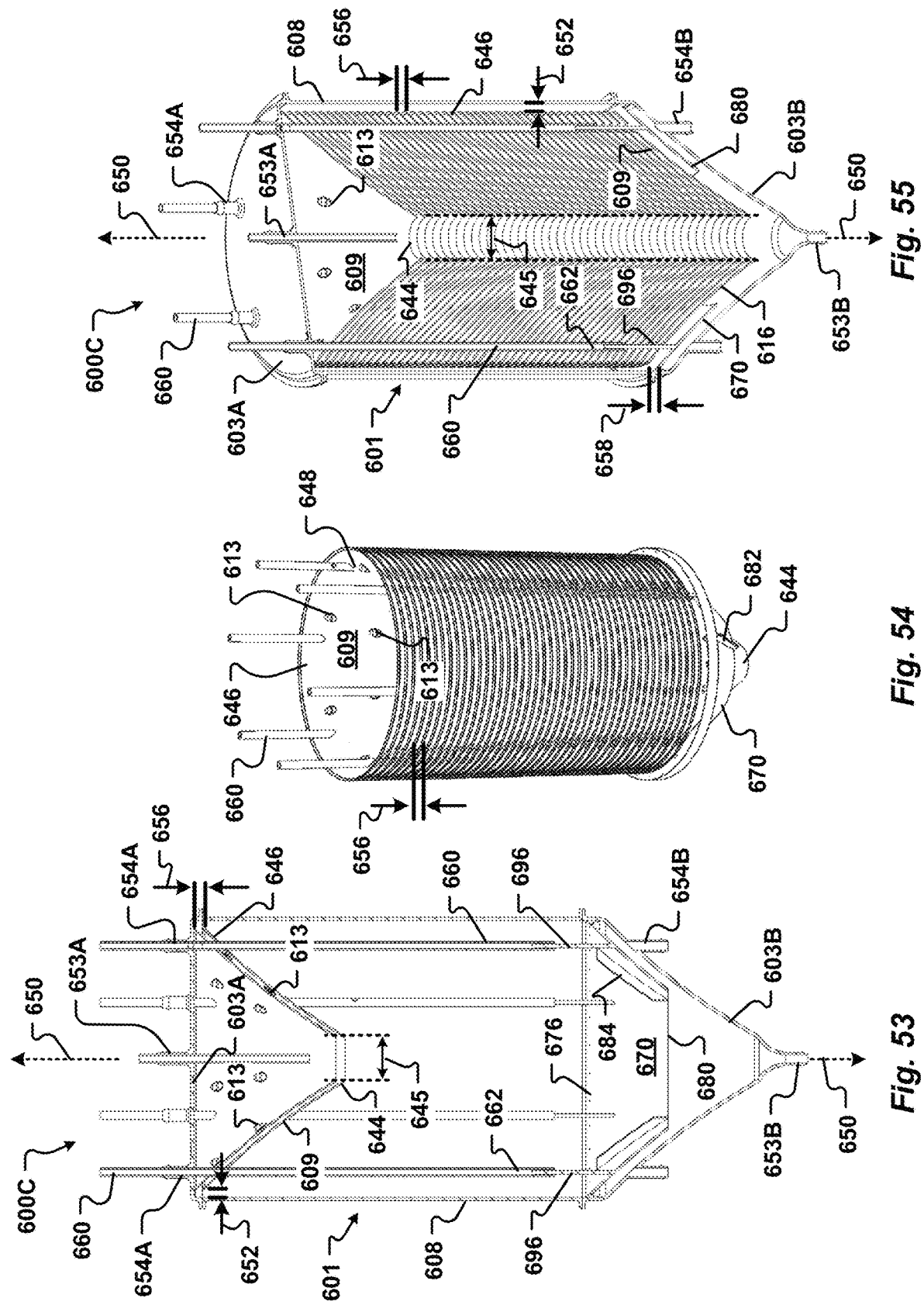

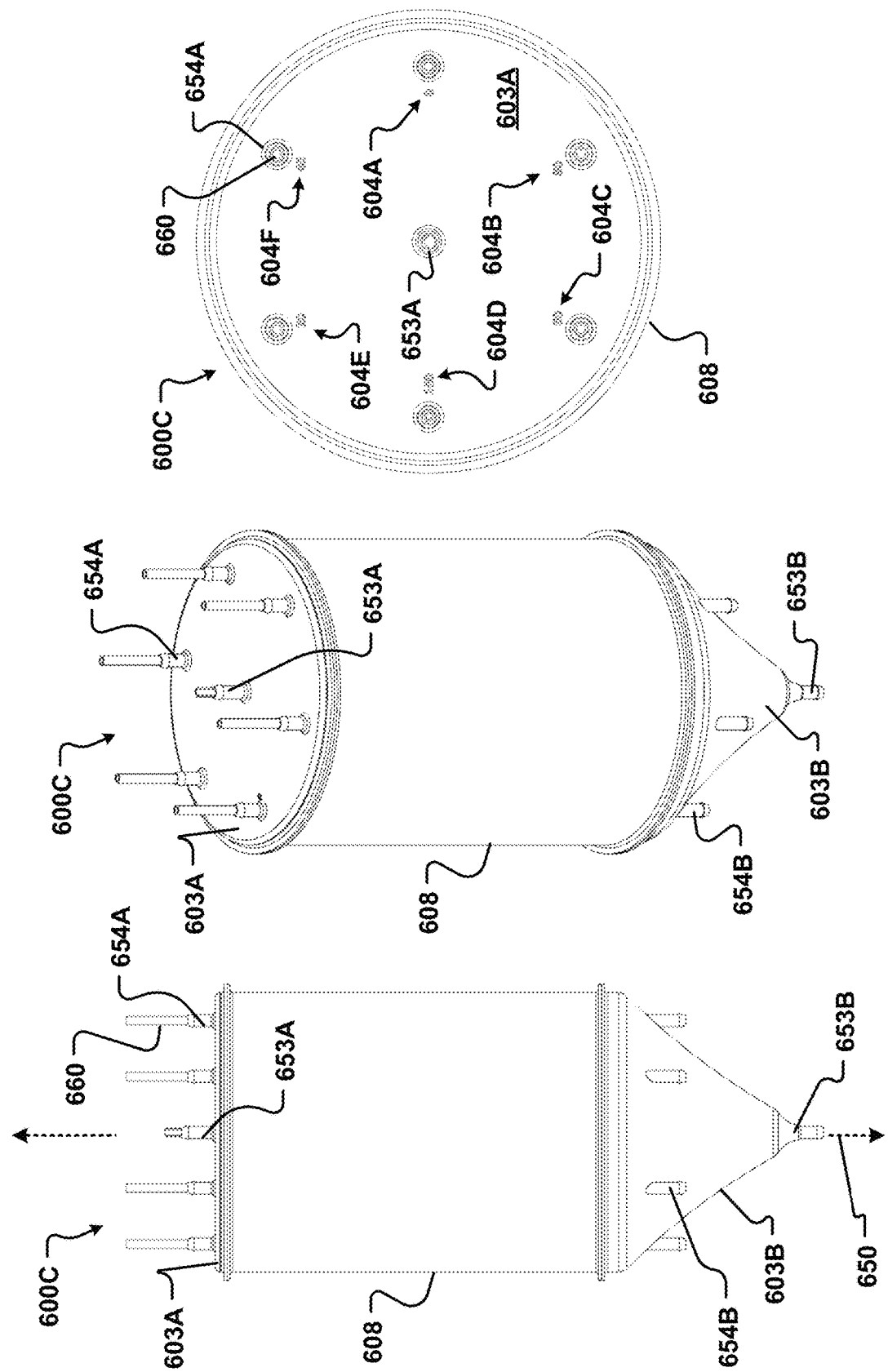

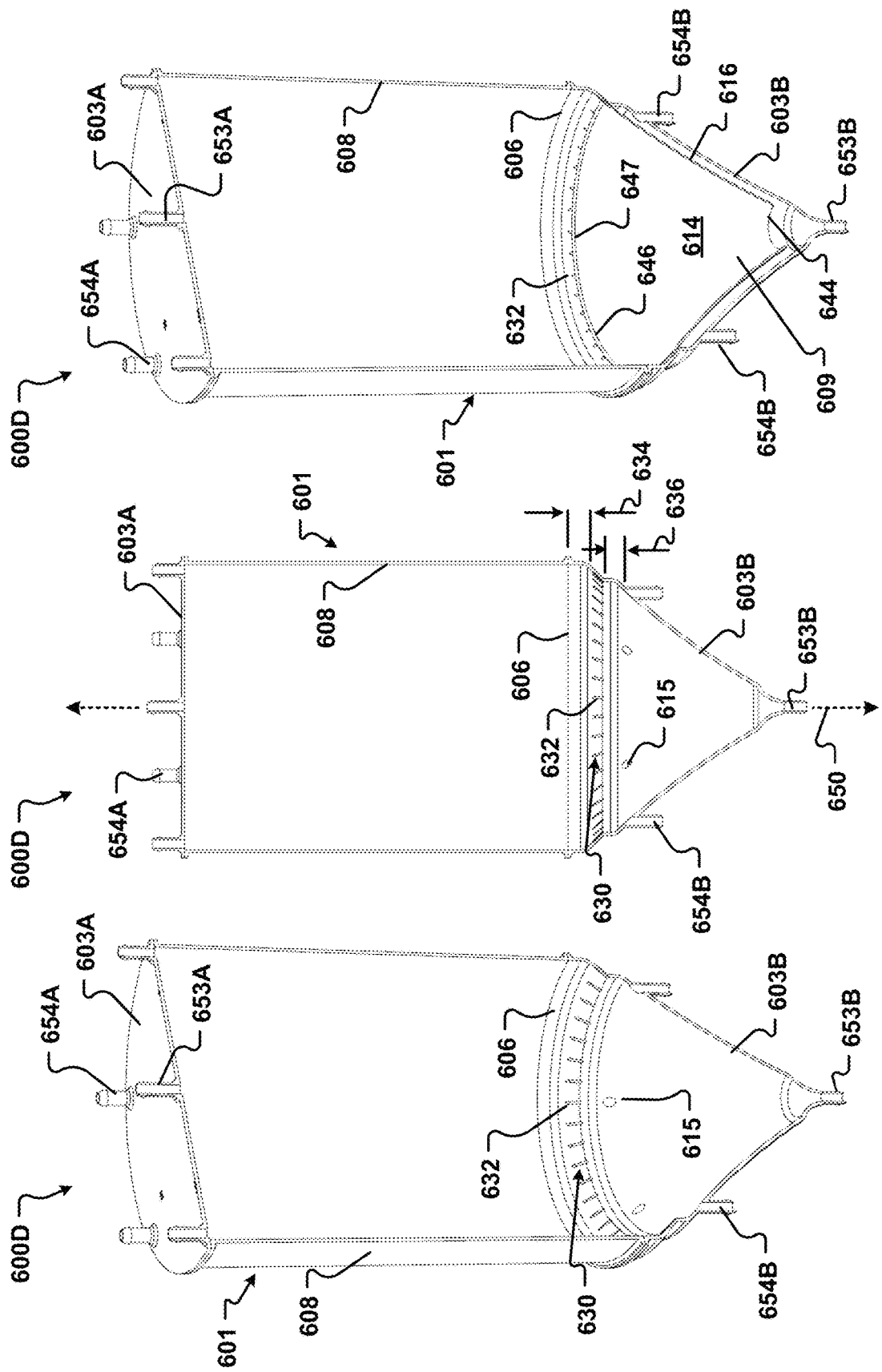

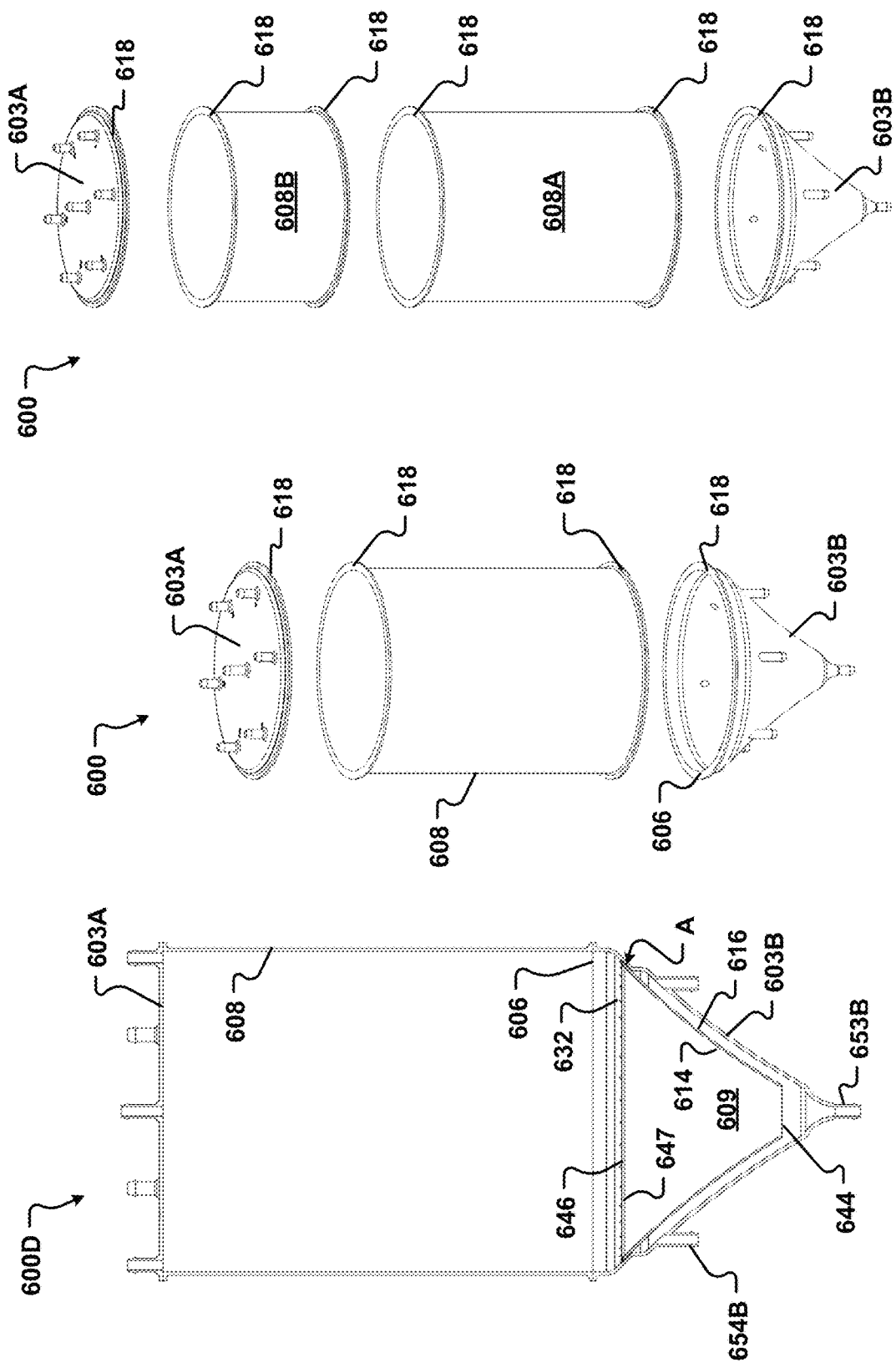

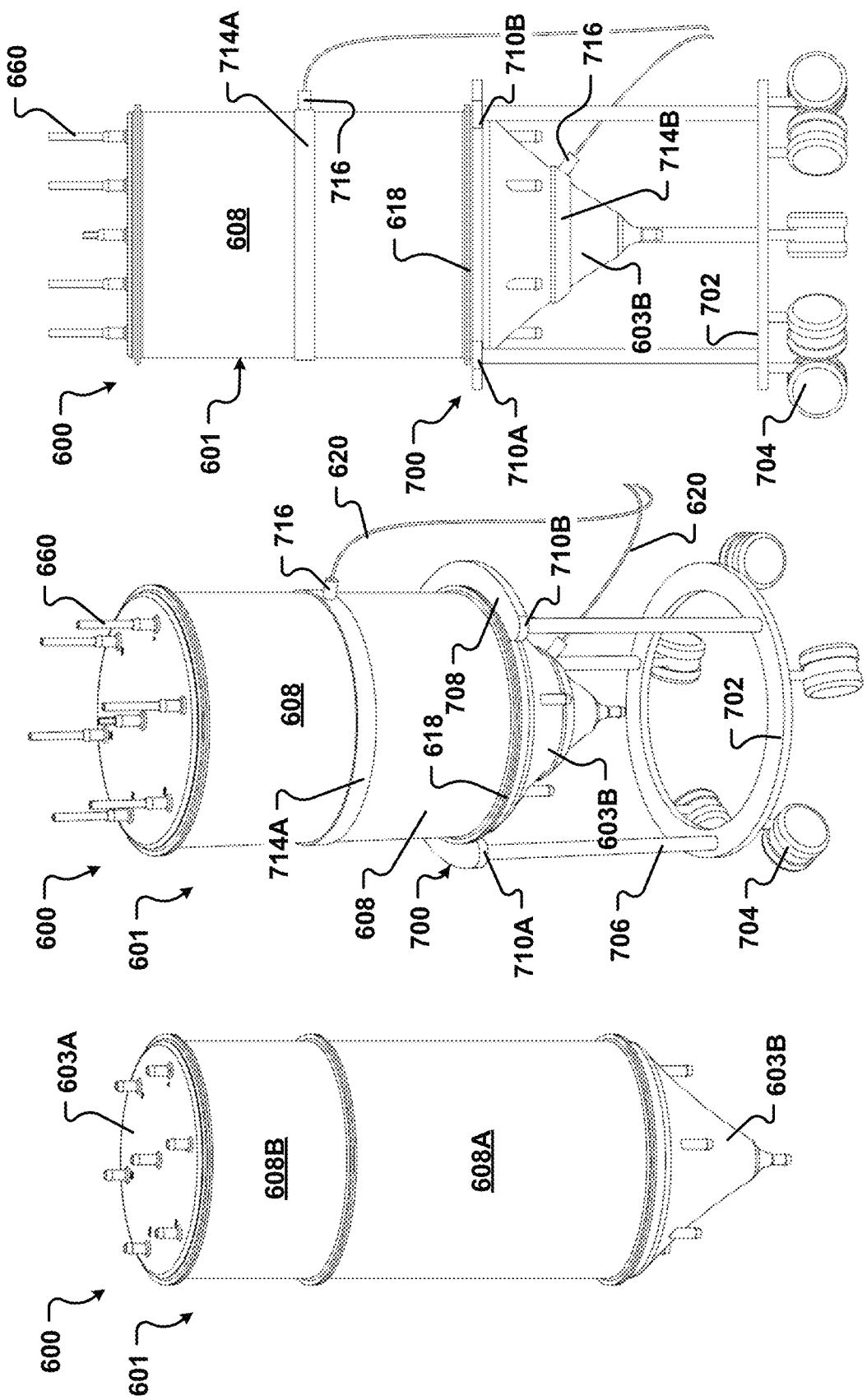

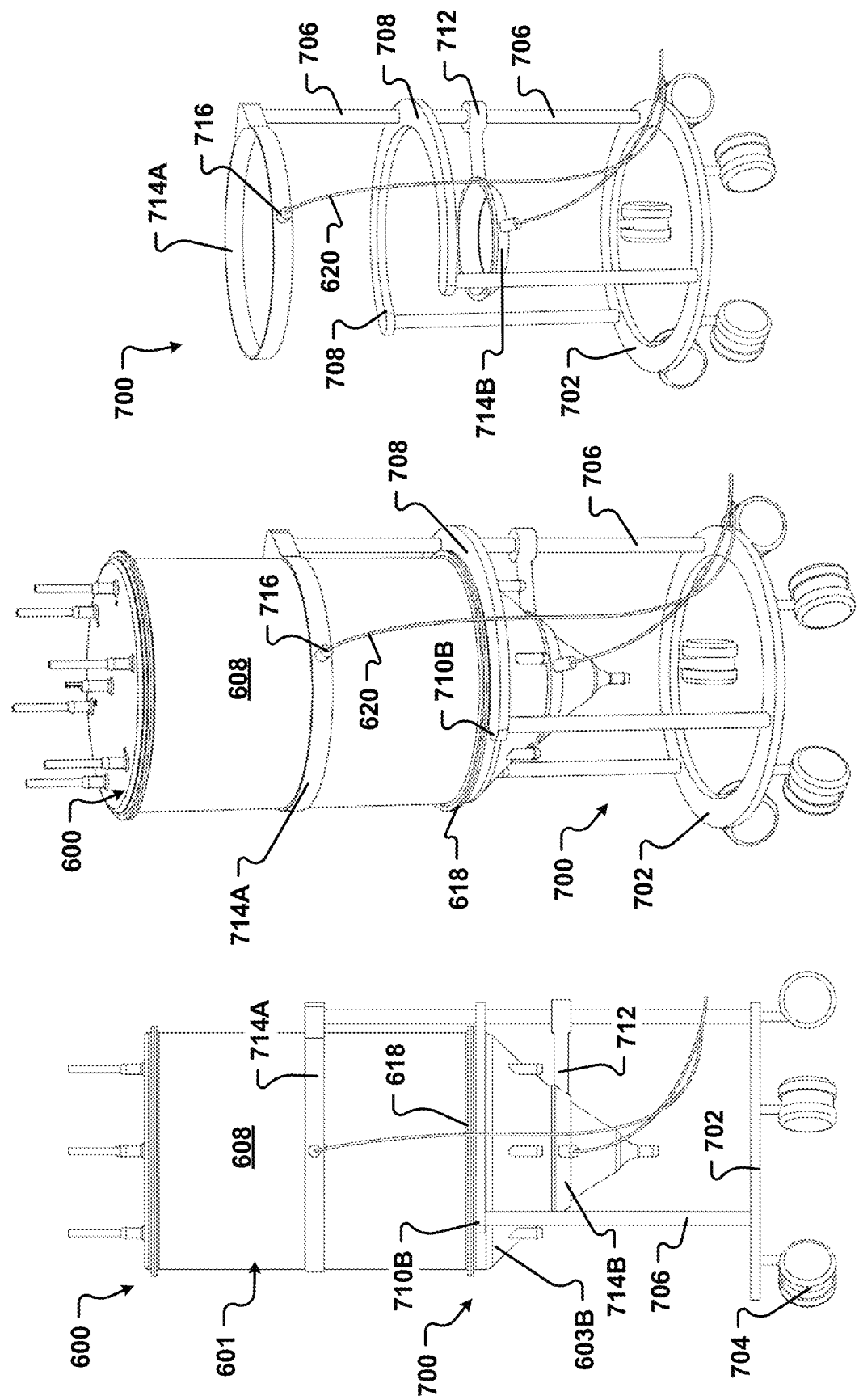

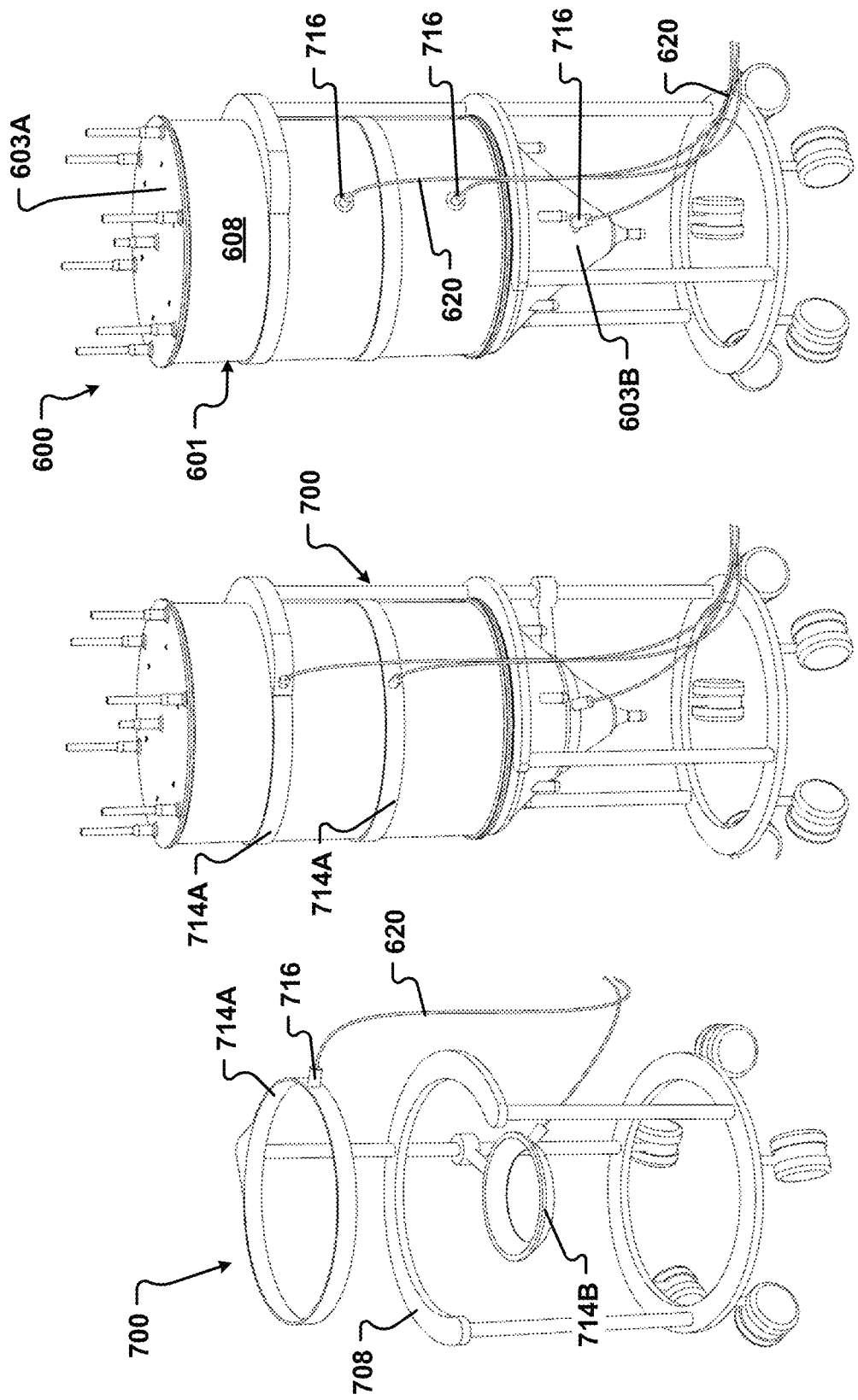

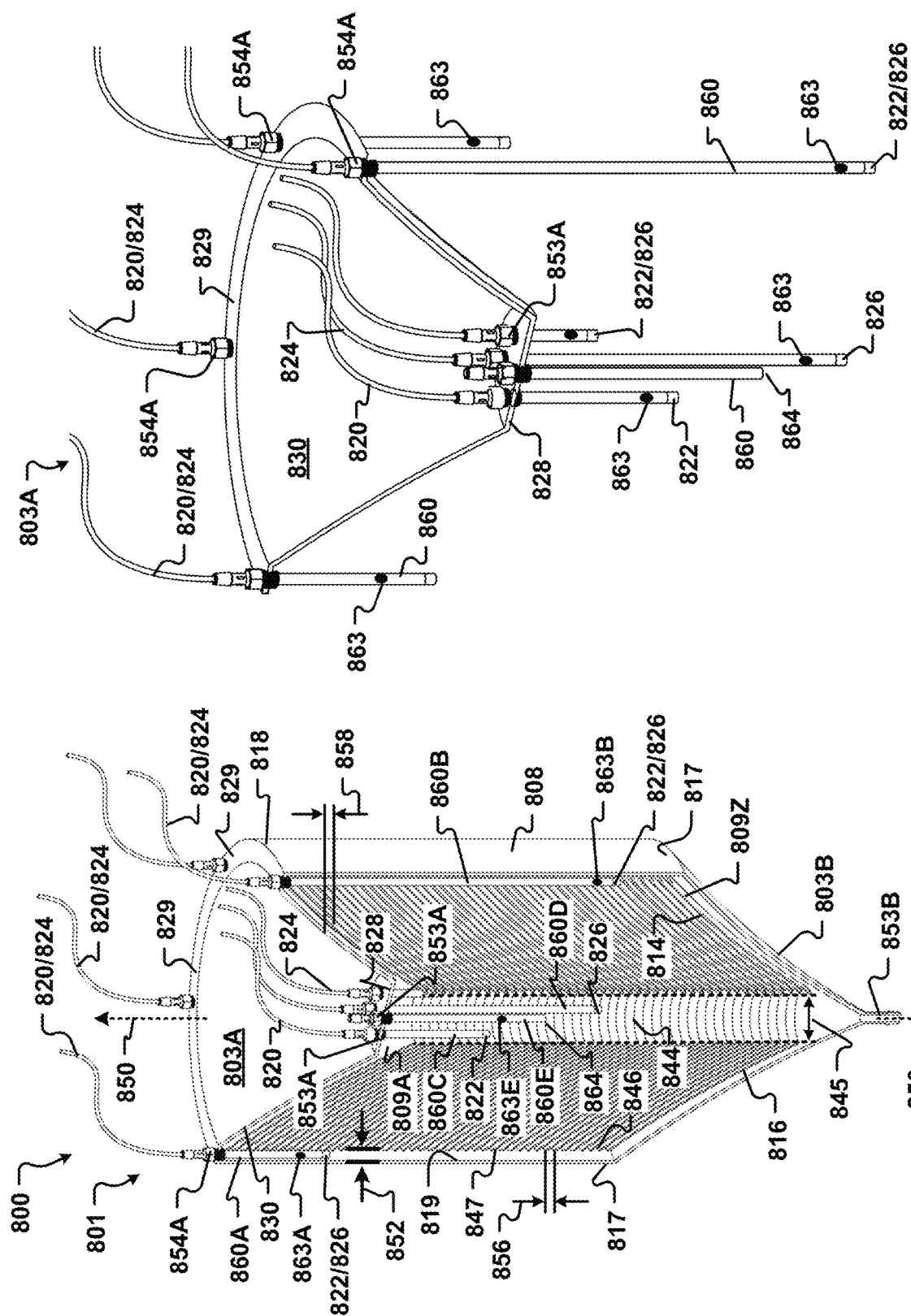

PARTICLE SETTLING DEVICES

CROSS REFERENCE TO RELATED APPLICATION

This application claims the benefit of priority under 35 U.S.C. § 119(e) to U.S. Provisional Patent Application Ser. No. 62/991,976 filed Mar. 19, 2020, entitled "PARTICLE SETTLING DEVICES" and is related to U.S. patent application Ser. No. 16/375,683, filed Apr. 4, 2019, now U.S. Pat. No. 10,576,399, which claims the benefit of priority under 35 U.S.C. § 119(e) to U.S. Provisional Patent Application Ser. No. 62/659,295 filed Apr. 18, 2018 and is related to U.S. patent application Ser. No. 15/586,902, filed May 4, 2017, now U.S. Pat. No. 10,596,492, which application is a continuation in part of U.S. patent application Ser. No. 15/324,062, filed Jan. 5, 2017, and to PCT Application No. PCT/US2015/063195 having an international filing date of Dec. 1, 2015 and which designated the United States. This application is also related to U.S. Provisional Patent Application No. 62/332,546, filed May 6, 2016, and to U.S. Provisional Patent Application No. 62/459,509, filed Feb. 15, 2017. U.S. patent application Ser. No. 15/324,062 is a national stage application under 35 U.S.C. 371 of PCT Application No. PCT/US2015/039723 having an international filing date of Jul. 9, 2015, which designated the United States, which PCT application claims the benefit of U.S. Provisional Patent Application No. 62/022,276, filed Jul. 9, 2014, and to U.S. Provisional Patent Application No. 62/037,513, filed Aug. 14, 2014. PCT Application No. PCT/US2015/063195 claims the benefit of U.S. Provisional Patent Application No. 62/086,122, filed Dec. 1, 2014. All of these applications are incorporated herein by reference in their entirety.

FIELD

This disclosure provides cell or particle settling devices with enhanced settling on multilayered inclined surfaces. The devices of the present disclosure have applications in numerous fields, including: (i) high cell density biological (mammalian, microbial, plant or algal) cell cultures secreting polypeptides, hormones, proteins or glycoproteins, vaccines or vaccine-like particles, or other small chemical products, such as ethanol, isobutanol, isoprenoids, flavor and fragrance compounds, etc.; (ii) separating and recycling porous or non-porous solid catalyst particles catalyzing chemical reactions in liquid or gas phase surrounding solid particles; (iii) separating and collecting newly formed solids in physical transformations such as crystallization, flocculation, agglomeration, precipitation, etc., from the surround liquid phase; (iv) capture and purification of secreted proteins, such as monoclonal antibodies, and others, on affinity ligands, such as protein A immobilized on microspherical beads; (v) in vitro expansion of various mammalian cells, such as human mesenchymal stem cells, differentiated human cells (e.g. cardiomyocytes or red blood cells), modified human cells (e.g. chimeric antigen receptor transfected T lymphocytes or CAR-T cells, etc. for autologous or allogenic cell therapy applications); and (vi) clarifying process water in large scale municipal or commercial waste water treatment plants by settling and removing complex biological consortia or activated sludge or other solid particles.

DESCRIPTION OF RELATED ART

Of all the above-mentioned fields of application for settling devices, the more immediately applicable well-established field is the production of biological proteins, polypeptides or hormones secreted from suspension cultures of recombinant microbial or mammalian cells. Most common methods of producing biological proteins in recombinant mammalian and microbial cells rely on fed-batch cultures, wherein cells are grown to high cell densities and then typically exposed to an induction medium or inducer to trigger the production of proteins. If the desired proteins are secreted out of the cells, it is more profitable to switch from a fed-batch culture to a continuous perfusion culture, which can maintain high cell density and high productivity over a much longer duration of culture. During continuous perfusion cultures, live and productive cells are retained or recycled back to the bioreactor while the secreted proteins are continuously harvested from the bioreactor for downstream purification processes.

Some key advantages of continuous perfusion cultures over fed-batch cultures are: (1) the secreted protein products are continuously removed from the bioreactor, without subjecting these products to potential degradation by proteolytic and/or glycolytic enzymes released into the culture medium from dead cells; (2) live and productive cells are retained or recycled back to achieve high cell densities in continuous perfusion bioreactors, where they continue to produce valuable proteins inside the controlled bioreactor environment for much longer culture duration, rather than being killed and removed from the bioreactor at the end of each fed-batch culture; (3) the perfusion bioreactor environment can be maintained much closer to steady state conditions (thereby maintaining a more consistent product quality by design) with the continuous addition of fresh nutrient media and removal of waste products along with the harvested protein products, unlike the dynamically changing concentrations of nutrients and waste products in fed-batch culture; and (4) with a subset of cell retention devices, smaller dead or dying cells can be selectively removed from the perfusion bioreactor before these cells lyse and release their intracellular enzymes, thereby maintaining a high viability fraction of cells and high quality of the secreted protein products as they are harvested.

Many cell retention devices have been developed in the mammalian cell culture industry, such as the internal spin filter devices (Himmelfarb et al., Science 164: 555-557, 1969), external filtration modules (Brennan et al., Biotechnol. Techniques, 1 (3): 169-174, 1987), hollow fiber modules (Knazek et al., Science, 178: 65-67, 1972), gravitational settling in a cyclone (Kitano et al., Appli. Microbiol. Biotechnol. 24, 282-286, 1986), inclined settlers (Batt et al., Biotechnology Progress, 6:458-464, 1990), continuous centrifugation (Johnson et al., Biotechnology Progress, 12, 855-864, 1999), and acoustic filtering (Gorenflo et al., Biotechnology Progress, 19, 30-36, 2003). The cyclones were found to be incapable of producing enough centrifugal force for sufficient cell separation at the device sizes and harvest flow rates used in the mammalian cell culture experiments (Kitano et al., 1986) and mammalian cells are seriously damaged at higher flow rates (and centrifugal forces) necessary for efficient cell separation (Elsayed, et al., Eng. Life Sci., 6: 347-354, 2006). While most of the other devices adequately retain all mammalian cells from the harvest, these devices are unable to separate dead cells from the live cells desired in the bioreactor. Consequently, dead cells keep accumulating inside the perfusion bioreactor and the membrane filters get clogged, necessitating the termination of the continuous perfusion bioreactor, typically within three or four weeks of mammalian cell culture.

Among all the cell retention devices available today, only the inclined settlers (Batt et al., 1990, supra and Searles et al., Biotechnology Progress, 10:198-206, 1994) enable selective removal of smaller dead cells and cell debris in the overflow or harvest stream, while bigger, live and productive mammalian cells are continually recycled via the underflow back to the perfusion bioreactor. Therefore, it is feasible to continue the perfusion bioreactor operation indefinitely at high viability and high cell densities while the protein product is continuously harvested from the top of the inclined settler.

The inclined settler has previously been scaled up as multi-plate or lamellar settlers (Probstein, R. F., U.S. Pat. No. 4,151,084, April 1979) and used extensively in several large-scale industrial processes such as wastewater treatment, potable water clarification, metal finishing, mining and catalyst recycling (e.g. Odueyngbo et al., U.S. Pat. No. 7,078,439, July 2006).

Citing our first demonstration of a single plate inclined settler (Batt et al., 1990) to enhance productivity of secreted proteins in mammalian cell culture applications, a multi-plate or lamellar settler device has been patented for the scale up of inclined settlers for use in hybridoma cell culture (Thompson and Wilson, U.S. Pat. No. 5,817,505, October 1998). Such lamellar inclined settler devices have been used to culture recombinant mammalian cells in continuous perfusion bioreactors at high bioreactor productivity (due to high cell density) and high viability (>90%) for long durations (e.g., several months without any need to terminate the perfusion culture). U.S. Patent Publication No. 2011/0097800 to Kauling et al., describes a scaled-up version of inclined settlers that uses cylindrical tubes wrapped at inclined angles. The device is described as useful in the culturing of larger mammalian cells, such as CHO, BHK, HEK, HKB, hybridoma cells, ciliates, and insect cells.

None of these cell retention devices have been demonstrated for harvesting secreted protein products in perfusion bioreactor cultures of the smaller, and hence more challenging, microbial cells. Lamellar settlers have been tested with yeast cells to investigate cell settling with limited success (Bungay and Millspaugh, Biotechnology and Bioengineering, 23:640-641, 1984). Hydrocyclones have been tested in yeast suspensions, mainly to separate the yeast cells from beer, again with only limited success (Yuan et al., Bioseparation, 6:159-163, 1996; Cilliers and Harrison, Chemical Engineering Journal, 65:21-26, 1997).

Thus, a particle settling device that can leverage centrifugal forces and gravitational forces on particles in liquid suspension in a relatively small space is desired.

SUMMARY

This disclosure provides cell or particle settling devices with enhanced settling on multilayered, inclined surfaces arranged within a housing. The housing may be a cyclone housing. The particle separation devices of this disclosure may be used in numerous applications and represent a large improvement over the prior art separation devices. In these settling devices, the inclined surfaces may be attached to a plurality of vertical cylindrical plates. The settling devices may include a spiral conical surface, or several inclined plates approximating an angled conical surface connected to the bottom of a spiral. The numerous, layered inclined plates enhance the settling efficiency of the particles from the bulk fluid moving either downward or upward inside a conical assembly in which the liquid volume moves progressively from the periphery of the conical or spiraled settling surfaces to the center of the settler device.

The settler devices of this disclosure may include a housing that encloses a series of stacked cones positioned inside the housing, tapering down to a central opening, with no vertical plates. The cones of this embodiment are supported in the stack, one above the other, by supports that maintain a distance (or channel width) between the successive cones in the stack. The supports may comprise three or more projections attached to the upper and/or lower surface of one or more of the cones to position successive cones at a desired distance (the desired channel width) apart. Optionally, the supports may comprise at least three L-shaped elements interconnected to a surface of each cone that is distal to the truncated apex of the cone. The L-shaped elements include a first side interconnected to a second side at an apex and are interconnected to the surface such that the first side supports a second cone in the stack of cones. The second side is substantially parallel to the surface of the cone. Optionally, the second side may project beyond the cone to space the cone from an interior surface of the housing. In some embodiments there is no plug or other impediment preventing the flow of liquid or suspended particles from the stacked conical surfaces toward the central opening.

The settler devices of this disclosure may include a housing enclosing:

1) a first stack of two or more stacked cones, each having a central opening, and, 2) an optional second stack of two or more stacked cones, each having a central opening, joined at or near their bottom with conical surfaces tapering down to a central opening at the bottom of the housing.

The stacked cones (in both the first and optional second stack of two or more stacked cones) may comprise at least three projections supporting each cone above the next successive cone in the stack. The projections are preferably placed at a substantially constant distance and are formed at a generally equal size to hold each successive cone in the stack at about an equal spacing between all of the cones in the stacks. In one embodiment, there are at least three projections for each cone to properly support each successive cone, but each cone may comprise more than three projections, as needed to adequately or properly support the cone. For example, each cone may comprise four projections, or may comprise eight projections, to support the next successive cone in the stack.

The projections, or "vertical supports," may represent an impediment to settled particles or cells sliding down the surface of a cone towards the central opening or the gap around the inner circumference of the housing between the housing and the cones. These projections are attached to one surface of a cone, but these projections need not attach to another cone in a stack of cones. Thus, these projections need not, and in most embodiments do not, attach two or more cones in a stack to one another.

There is preferably a substantially constant spacing between each successive conical surface created by the projections supporting each successive cone in a stack of cones. The spacing between successive cones may be varied between about 1 mm to about 2.5 cm.

This arrangement of settling surfaces, provided by the successive stacks of cones, each of which is supported by the next successive cone, but is not permanently attached to the next successive cone, is particularly useful for separation applications in which the particle settling device, and the conical surfaces therein, requires regular or continual service, such as disassembly and cleaning of the conical settling surfaces within the settler device.

This arrangement of first and optional second stacks of cones significantly enhances the settling efficiency of particles from a bulk fluid as the bulk fluid moves through the settling device. As the bulk liquid, including particles such as cells, moves through the stacked cones of the settler device of this disclosure, bigger particles (e.g., live and productive cells) settle on the surface of the cones. Cells sliding down the upper or first stack of cones, slide down the conical surfaces to the outer edges of the cones and fall down vertically into the conical section of the housing. Additionally, cells sliding down the lower or second stack of cones, slide down the conical surfaces to the central opening of the cones and fall down vertically towards the central opening of the housing.

These devices can be scaled up or down to suit the separation needs of different industries or applications or sizes as the separation surface is scaled up or down volumetrically in three dimensions, compared to the more typical one- or two-dimensional scaling of previous settling devices.

Scale up of the devices of this disclosure can be performed simply by increasing the diameter of the housing (and correspondingly increasing the diameter of cones stacked inside) and/or increasing the height of the housing (which increases the number of cones in either one or both of the first and second stack of cones). The effective projected area for cell settling increases proportional to the square of the diameter of the housing and increases proportional to the height of internal cylinders. The effective settling area of the compact settling devices of this disclosure scales up proportional to the cube of housing diameter (assuming the height of the internal settler is also increased proportionally) or equivalently, to the volume of housing. This three dimensional or volumetric scale-up of the effective settling area makes the settling device of this disclosure much more compact compared to previous inclined settler devices.

The radial spacing in the annular regions between different cylinders or cones can be between about 1 cm to about 10 cm, with an optimum around about 2.5 cm. A small clearance of between about 1 mm and 1 cm between the inclined settling cones and the internal surface of the next successive cone provides useful space for settled particles (for example cells) to slide down the surface of the cones and exit the cones on the side, rather than sliding all the way down to the bottom of the cone. The side-exiting cells settle vertically along the inside of each cylinder. When these settling cells reach the conical surface at the bottom of each cylinder, they slide down on the inclined surface on the cone to the central opening at the bottom of the cyclone housing. An advantage of the increasing fluid velocity while going down the inclined conical surface to the central opening is that the increasing number of settled cells sliding down the cone are swept down to the central opening, rather than being allowed to accumulate by the faster liquid velocities.

The angle of inclination for the settling surfaces may or may not be constant, ranging between about 15 degrees to about 75 degrees from the vertical. For use with stickier particles (typically mammalian cells), the angle of inclination may be closer to the vertical (i.e., around 15 degrees from vertical). For use with non-sticky solid catalyst particles, the angle of inclination can be further from vertical (for example, around 75 degrees from vertical). In some embodiments, the conical surfaces have an arcuate longitudinal cross section such that the angle of inclination varies with respect to a longitudinal axis from between about 10 degrees to about 80 degrees, or about 15 degrees to about 75 degrees.

All of the settler devices of this disclosure may include a closure or lid over at least a portion of the housing at an end of the housing opposite the first opening. In all of these embodiments, the closure or lid may also include an outlet or port for removing liquids or entering liquids into the settler device. The opening and the additional ports or outlets in the housing and/or the lid are in liquid communication with the outside and the inside of the housing to allow the passage of liquids into and/or out of the housing of the settler device, and in each instance of such opening or inlet/outlet, these passage ways into and out of the housing may include valves or other mechanisms that can be opened or closed to stop or restrict the flow of liquids into or out of the settler devices of this disclosure.

The particle settling devices of this disclosure may include a housing and at least one vertical tube disposed inside the housing, the at least one vertical tube joined at one end with a conical surface tapering down to a first opening in the cyclone housing. There is at least one additional opening in the housing substantially opposite the first opening.

The angle of inclination for the conical surfaces is about 45 degrees from vertical in one embodiment, or may vary between about 15 degrees from vertical and about 75 degrees from vertical. Optionally, the conical surfaces and/or the top or bottom of the housing, may have a concave or convex shape such that the angle of inclination varies between about 15 degrees from vertical and about 75 degrees from vertical.

The width of an annular ringed channel formed between adjacent vertical tubes is between about 1 mm and about 50 mm. The number of vertical tubes within the settler device may be between about 2 and about 30.

The settler device may include a closure over at least a portion of the housing at an end of the housing opposite the first opening. At least one additional opening in the housing may be configured to open from a side of the housing tangential to at least one vertical tube, in liquid communication with the outside and the inside of the housing.

A liquid harvest outlet may be formed in the closure, in liquid communication with the outside and the inside of the housing.

One aspect of the present disclosure is a settling device operable for use in the production of cell therapy products, biological proteins, polypeptides or hormones, vaccines, viral vectors or gene therapy products. The settling device comprises: (1) a lower conical portion with a port; (2) a cylindrical portion with: (i) a lower end contacting and extending upwardly from the lower conical portion, (ii) an upper end, and (iii) an interior wall; (3) a plurality of cones provided within the settling device, each cone of the plurality of cones including (i) a body with a first opening oriented toward the lower conical portion, (ii) a second opening that is larger than the first opening, and (iii) an exterior edge proximate to the second opening that is spaced from the interior wall; (4) an upper portion connected to the upper end of the cylindrical portion; and (5) an outer conduit extending from the upper portion and downwardly in an annual space between the interior wall of the cylindrical portion and the exterior edges of the cones. In one embodiment, the plurality of cones are approximately centered around a longitudinal axis of the settling device.

The port of the lower conical portion may be approximately concentrically aligned with the longitudinal axis. Optionally, the settling device has only one port through the lower conical portion.

In one embodiment the outer conduit is oriented approximately parallel to the longitudinal axis.

The outer conduit may comprise a lumen and an orifice to withdraw fluid from the settling device. When present, the orifice is positioned between the upper and lower ends of the cylindrical portion to withdrawn fluid from a predetermined level within the settling device.

Additionally, or alternatively, a sensor may be associated with the outer conduit to measure a condition within the settling device. In one embodiment, the sensor is operable to measure at least one of pH, dissolved oxygen (DO), dissolved CO2, glucose, lactate, glutamine, ammonia, and temperature. The sensor may be positioned between the upper and lower ends of the cylindrical portion.

In one embodiment, the sensor is a fluorescent probe. A reader (or meter) to receive light from the fluorescent probe may be positioned in the outer conduit. Optionally, the outer conduit is transparent or translucent such that light from the fluorescent probe can pass therethrough.

The reader can transmit data from the fluorescent probe to a control system. In one embodiment, the reader includes an optical fiber or a wire to transmit data to the control system. Additionally, or alternatively, the reader may use a wireless means to transmit the data to the control system.

Optionally, the settler device includes a plurality of outer conduits extending into the annular space. In one embodiment, a first one of the outer conduits has a first length and a second one of the outer conduits has a second length that is different than the first length. In this manner, the first outer conduit can sample a condition or withdraw fluid at a first height of the cylindrical portion and a second outer conduit can sample a condition or withdraw fluid at a second height of the cylindrical portion that is different than the first height.

In one embodiment the upper portion has a shape that is conical. The conical upper portion includes a first end and a second end. The first end has a first diameter and the second end has a second diameter that is larger than the first diameter.

In one embodiment, the first end is oriented toward the lower conical portion. Optionally, the first end of the upper portion is positioned between a first opening and a second opening of an uppermost cone of the plurality of cones.

The settling device optionally includes a second conduit extending from the first end of the upper portion. The second conduit extends downwardly through a first opening of the uppermost cone of the plurality of cones and into a central column defined by the first openings of the plurality of cones.

In one embodiment, the second conduit has a second length such that a second end of the second conduit is at a second level of the cylindrical portion. Additionally, the outer conduit may have a first length such that a first end of the outer conduit is at a first level of the cylindrical portion that is different than the second level.

In one embodiment, the second conduit includes a sensor to measure a condition of fluid in the central column. The sensor is operable to measure at least one of pH, dissolved oxygen (DO), dissolved CO2, glucose, lactate, glutamine, ammonia, and temperature. The sensor may be positioned between an upper end and a lower end of the central column.

Optionally, the second conduit is transparent or translucent to transmit light from the sensor to a reader positioned within the second conduit.

Additionally, or alternatively, the second conduit has a lumen and an orifice to withdraw fluid from the central column.

Optionally, the settler device includes a plurality of second conduits extending into central column. In one embodiment, each of the plurality of second conduits has a different length such that each of the second conduits can sample a condition or withdraw fluid a different level of the central column.

In one embodiment the settling device further comprises a first distributor element that is positioned within the settling device. The first distributor element is operable to introduce fluid into or withdraw fluid from the settling device.

The first distributor element may comprise a first ring extending around an exterior surface of a lowest cone of the plurality of cones. Optionally, the first ring contacts and supports the lowest cone. Alternatively, the first ring is spaced from the lowest cone.

In one embodiment, the first ring is positioned below a second opening of the lowest cone. Optionally, the first ring is positioned between the second opening and a first opening of the lowest cone.

In one embodiment, the first ring is connected to a first tube extending upwardly in the annual space and to the upper portion. The first tube may contact outer edges of one or more of the plurality of cones. Alternatively, the first tube is spaced from the outer edges. The first ring optionally has from two to five of the first tubes.

The first ring includes a plurality of apertures for a fluid to flow into the settling device. In one embodiment, the apertures of the first ring are sized for a gas to flow therethrough. Optionally, one or more of air, $O_2$, $CO_2$ and $N_2$ may be introduced into the settling device through the first distributor element.

Additionally, or alternatively, the settling device may include a second distributor element positioned within the settling device. In one embodiment, the second distributor element is separate from the first distributor element.

The second distributor includes a second ring extending around the exterior surface of the lowest cone. In one embodiment, the second ring is positioned between the first ring and the first opening of the lowest cone.

In one embodiment, the second ring contacts the lowest cone. Alternatively, the second ring is spaced from the lowest cone.

The second ring includes a second tube extending upwardly in the annual space and to the upper portion. The second ring optionally has from two to five of the second tubes.

Alternatively, the first distributor element comprises a body with: (i) a lower surface; (ii) a lower protrusion extending from the lower surface to define a channel between the lower surface of the body and an interior surface of the lower conical portion; (iii) an upper surface; (iv) an upper protrusion extending from the upper surface to define a space between the upper surface of the body and the lowest cone of the plurality of cones; and (v) a plurality of holes extending through the body proximate to a large end of the body.

In one embodiment, an interior surface of each cone of the plurality of cones is convex. The interior surface of each cone may be oriented at an angle of between approximately 5 degrees to about 85 degrees relative to the longitudinal axis.

Additionally, or alternatively, a longitudinal cross-section of a body of a cone forms a line with an arcuate shape. In one embodiment, the line has a first radius of curvature proximate to the first opening and a second radius of curvature proximate to the second opening, the second radius of curvature being different than the first radius of curvature.

Another aspect of the present disclosure in a method of settling particles in a suspension, comprising: (1) introducing a liquid suspension of particles into a settling device which includes: (i) a lower conical portion with a port; (ii) a cylindrical portion with a lower end contacting and extending upwardly from the lower conical portion, an upper end, and an interior wall; (iii) a plurality of cones provided within the settling device, each cone of the plurality of cones including a body with a first opening oriented toward the lower conical portion, a second opening that is larger than the first opening, and an exterior edge proximate to the second opening that is spaced from the interior wall; (iv) an upper portion connected to the upper end of the cylindrical portion; (v) a first conduit extending from the upper portion and including an orifice positioned within a central column defined by the first openings of the plurality of cones; (vi) an outer conduit extending from the upper portion and downwardly in an annual space between the interior wall of the cylindrical portion and the exterior edges of the cones; and (vii) a sensor associated with the outer conduit; (2) measuring one or more of pH, dissolved oxygen (DO), dissolved $CO_2$, glucose, lactate, glutamine, ammonia and temperature in the annual space with the sensor associated with the outer conduit; (3) collecting a clarified liquid through the orifice of the first conduit; and (4) collecting a concentrated liquid suspension from the port of the lower conical portion.

In one embodiment, the liquid suspension comprises at least one of a recombinant cell suspension, an alcoholic fermentation, a suspension of solid catalyst particles, a municipal waste-water, industrial waste-water, mammalian cells, bacterial cells, yeast cells, plant cells, algae cells, plant cells, mammalian cells, murine hybridoma cells, stem cells, CAR-T cells, red blood precursor and mature cells, cardiomyocytes, yeast in beer, and eukaryotic cells.

Additionally, or alternatively, the liquid suspension may comprise one or more of recombinant microbial cells selected from at least one of *Pichia pastoris, Saccharomyces cerevisiae, Kluyveromyces lactis, Aspergillus niger, Escherichia coli,* and *Bacillus subtilis.*

In one embodiment, the liquid suspension may comprise one or more of microcarrier beads, affinity ligands, and surface activated microspherical beads.

Additionally, or alternatively, the clarified liquid collected comprises at least one of biological molecules, organic or inorganic compounds, chemical reactants, chemical reaction products, hydrocarbons (e.g., terpenes, isoprenoids, polyprenoids), polypeptides, proteins (e.g., brazzein, colony stimulating factors), alcohols, fatty acids, hormones (e.g., insulin, growth factors), carbohydrates, glycoproteins (e.g., erythropoietin, monoclonal antibodies), beer, and biodiesel.

The method may further comprise controlling at least one of pH, dissolved oxygen, dissolved $CO_2$, glucose, lactate, glutamine and ammonia within the settling device. In one embodiment, the controlling comprises at least one of: (i) manipulating the flow rates of a gas into the settling device; and (ii) manipulating the flow rates of different liquid media components into the settling device. Optionally, the gas is at least one of air, $O_2$, $CO_2$ and $N_2$. The gas may be introduced through a first distributor element. In one embodiment, the liquid media components are pumped in through a second distributor element.

In one embodiment, introducing a liquid suspension of particles into the settling device comprises pumping the liquid suspension through a distributor element positioned within the settling device. The distributor element may be positioned below a second opening of a lowest cone of the plurality of cones.

The settling device may include a first distributor element positioned within the settling device and which includes: (i) a first ring extending around an exterior surface of a lowest cone of the plurality of cones, the first ring being positioned between a first opening and a second opening of the lowest cone; and (ii) a first tube extending upwardly from the first ring into the annual space and to the upper portion.

Optionally, the settling device includes a second distributor element positioned within the settling device and which includes: (i) a second ring extending around the exterior surface of the lowest cone, the second ring being positioned between the first ring and the first opening of the lowest cone; and (ii) a second tube extending upwardly from the second ring into the annual space and to the upper portion.

In some embodiments, the method further comprises measuring one or more of pH, dissolved oxygen (DO), dissolved $CO_2$, glucose, lactate, glutamine, ammonia and temperature in the central column with a sensor associated with a second conduit extending from the upper portion.

Additionally, or alternatively, the method may include measuring one or more of pH, dissolved oxygen (DO), dissolved $CO_2$, glucose, lactate, glutamine, ammonia and temperature in the central column with a sensor positioned in the central column. In one embodiment, the sensor is associated with the first conduit. Alternatively, the sensor is associated with a third conduit extending from the upper portion into the central column.

In one embodiment, the upper portion has a shape that is conical. The conical upper portion has a first end that has a first diameter and a second end with a second diameter that is larger than the first diameter.

In one embodiment, the first end is oriented toward the lower conical portion. Optionally, the first end of the upper portion is positioned between a first opening and a second opening of an uppermost cone of the plurality of cones.

Another aspect of the present disclosure is a particle settling device that may include, but is not limited to, a housing including one or more of: (1) a first conical portion; (2) a second conical portion; (3) a cylindrical portion located between the first and second conical portions; (4) at least one inlet for introducing a liquid into the housing; (5) a first outlet port; (6) a second outlet port; and (7) a first stack of cones located within the housing. In one embodiment, the first outlet port is associated with the first conical portion and the second outlet port is associated with the second conical portion. Optionally, the liquid introduced into the housing may be a liquid suspension including particles. The particles may be of a plurality of sizes.

In one embodiment, the first outlet port may be for harvesting a clarified liquid. The clarified liquid may include a first subset of particles. The first subset of particles may comprise cell debris, dead cells, and the like. Optionally, the first outlet port may be formed in a closure of the housing. The first outlet port being in liquid communication with the outside and the inside of the housing.

Optionally, in another embodiment, the second outlet port may be for harvesting a concentrated liquid. The concentrated liquid may include a second subset of particles, such as live cells. Typically, particles of the second subset of particles are generally larger than particles of the first subset of particles. Each particle of the second subset of particles generally has a greater mass than the particles of the first subset of particles. The second outlet port is in liquid communication with the outside and the inside of the housing.

The first stack of cones occupies at least a portion of the first conical portion. Optionally, the first stack of cones occupies at least a portion of the cylindrical portion. Optionally, one or more cones of the first stack of cones includes a truncated apex oriented towards the first outlet port. Additionally, or alternatively, at least one cone of the first stack of cones is devoid of the central opening. In another embodiment, each cone of the first stack of cones includes an open base oriented towards the second outlet port. The cones of the first stack of cones are generally centered in the housing, for example, the cones of the first stack of cones may be centered around a substantially central opening formed by the truncated apex of one or more of the cones.

Optionally, the housing may further include a second stack of cones. The second stack of cones may occupy at least a portion of the second conical portion, and may occupy at least a portion of the cylindrical portion. In one embodiment, each cone of the second stack of cones is transverse to the cones of the first stack of cones.

Optionally, an angle of inclination for a surface of a cone in the first stack of cones may vary between about 15 degrees to about 75 degrees from vertical. In one embodiment, the surface of a cone is convex or concave such that a cross-section of the cone surface defines an arcuate line. In another embodiment, the angle of inclination of the cones may be constant at any angle between 15 and 75 degrees from vertical. In one embodiment, the angle of inclination of the cones is about 45 degrees.

In another embodiment, each cone of the second stack of cones includes a truncated apex oriented towards the second outlet port. Each cone of the second stack of cones may also include an open base oriented towards the first outlet port. In one embodiment, the cones of the second stack of cones are generally centered in the housing. In another embodiment, the cones of the second stack of cones are about centered around a substantially central opening formed by the truncated apex of one or more of the cones.

In one embodiment, an angle of inclination for a surface of a cone in the second stack of cones is between about 15 degrees to about 75 degrees from vertical. The angle of inclination of the cones in the second stack of cones may be about 45 degrees.

In one embodiment, the cones of the first stack of cones have a substantially uniform spacing. Additionally, the cones of the second stack of cones may have a substantially uniform spacing. In one embodiment, the cones of the first stack of cones have a different spacing compared to the cones of the second stack of cones.

The at least one inlet is configured as an inlet port in liquid communication with the outside and the inside of the housing. The at least one inlet may be associated with at least one of the first conical portion, the second conical portion, and the cylindrical portion of the housing. In one embodiment, a first inlet of the at least one inlet is associated with the cylindrical portion of the housing. In another embodiment, a second inlet of the at least one inlet is associated with one of the first and second conical portions. In yet another embodiment, the second inlet is associated with the second conical portion. In another embodiment, the at least one inlet is configured to be interconnected to a disposable bioreactor bag. The disposable bioreactor bag may comprise a plastic material.

Another aspect of the present disclosure is a settling device operable for use in the production of cell therapy products, biological proteins, polypeptides or hormones, comprising: (1) an upper portion with a central port and at least one peripheral port; (2) a cylindrical portion; (3) a lower portion with a middle port and at least one outer port; (4) a stack of cones located within the settling device, each cone of the stack of cones including a first opening, a second opening that is larger than the first opening, and an aperture proximate to the second opening, each of the first openings oriented towards one of the upper portion and the lower portion, the stack of cones generally centered around a longitudinal axis of the settling device; (5) an alignment element oriented approximately parallel to the longitudinal axis and extending through the apertures of the cones; and (6) a distributor element positioned below a lowest cone of the stack of cones.

In one embodiment, at least one cone of the stack of cones comprises a plastic and the settling device is disposable.

In another embodiment, an interior surface of each cone of the stack of cones is convex and oriented at an angle of between approximately 5 degrees to about 85 degrees relative to the longitudinal axis Optionally, the interior surface of each cone has a first radius of curvature proximate to the first opening and a second radius of curvature proximate to the second opening, the second radius of curvature being different than the first radius of curvature.

In one embodiment, the second opening of each cone is defined by a large circular edge of the cone, the aperture being spaced from the large circular edge.

In one embodiment, the alignment element comprises a tube extending through a peripheral port of the upper portion.

In another embodiment, the tube comprises a lumen and an orifice to withdraw fluid from the settling device, the orifice positioned to withdrawn fluid from a predetermined level within the settling device.

In one embodiment, an interior surface of the lower portion is convex and tapers along an arcuate path from a maximum diameter proximate to the cylindrical portion to a minimum diameter at a lower end.

In another embodiment, the distributor element comprises a body with: (i) a lower surface; (ii) a lower protrusion extending from the lower surface; (iii) an upper surface; (iv) an upper protrusion extending from the upper surface; and (v) a plurality of holes proximate to a large end of the body.

In one embodiment, the lower surface is positioned above the at least one outer port of the lower portion of the settling device. In another embodiment, the lower protrusion defines a channel between the lower surface of the body and an interior surface of the lower portion of the settling device. Optionally, the upper protrusion defines a space between the upper surface of the body and the lowest cone of the stack of cones.

In one embodiment, the settling device further comprises a pin projecting from the upper surface of the body of the distributor element and extending through the aperture of the lowest cone.

In one embodiment, the alignment element is engaged to the pin. Optionally, the lowest cone is provided in contact with the upper protrusion of the body of the distributor element.

In one embodiment, the first opening of each cone of the stack of cones is oriented toward the upper portion.

Alternatively, in another embodiment, the first opening of each cone of the stack of cones is oriented toward the lower portion.

In another embodiment, the settling device, further comprises a sensor to measure at least one of pH, dissolved oxygen (DO), dissolved $CO_2$, glucose, lactate, glutamine, ammonia, and temperature within the settling device. Optionally, the sensor is associated with the alignment element.

In one embodiment, the distributor element comprises a plurality of slots extending into an interior surface of the lower portion of the settler device, each slot having a top end and a bottom end.

Optionally, the top ends extend above the second opening of the lowest cone and the bottom ends are positioned below the second opening of the lowest cone.

Another aspect of the present disclosure is a settling device which includes, but is not limited to: (1) an upper housing including: a first conical portion; a first cylindrical portion; and at least one port; (2) a lower housing interconnectable to the upper housing and including: a second conical portion; a second cylindrical portion; and at least one port; and (3) a stack of cones located within the settling device, each cone of the stack of cones including a small opening oriented towards the first conical portion and a large opening oriented towards the second conical portion, the first stack of cones generally centered around a longitudinal axis of the settling device. Optionally, the upper housing further comprises a first flange configured to engage a second flange of the lower housing. The upper housing may be permanently joined to the lower housing.

In these devices, a surface of a cone of the first stack of cones is at an angle of between approximately 15 degrees to about 85 degrees relative to the longitudinal axis. Optionally, the first and second conical portions are concave inwardly towards the longitudinal axis. In one embodiment, a longitudinal cross-section of a body of a cone forms a line with an arcuate shape.

Additionally, or alternatively, the first conical portion is concave inwardly towards the longitudinal axis and the second conical portion is concave outwardly away from the longitudinal axis. In one embodiment, the settling device includes a second stack of cones located within the settling device. In another embodiment, each cone of the second stack of cones includes a small opening oriented away from the first conical portion and a large opening oriented towards the first conical portion. Optionally, the cones of the second stack of cones have bodies that are concave outwardly away from the longitudinal axis.

In any of the settler devices of this disclosure, the housing and/or the cones and/or any other components of the device may be composed of a metal or a plastic. The plastic may be one or more of polypropylene, polyethylene, polycarbonate, polystyrene, and the like. In one embodiment, the settling device is formed entirely of plastic. In another embodiment, at least one cone of the stack of cones is composed at least partially of stainless steel. The metal surfaces (especially stainless steel) may be electropolished to provide a smooth surface. Similarly, in any of the settler devices of this disclosure, the housing and/or the cones and/or any other components of the device may be completely or partially coated with one or more of a non-sticky plastic, such as Teflon or silicone.

In any of the settler devices of this disclosure, the housing may further include a fluid jacket associated with one or more of the first conical portion, the second conical portion, and/or the cylindrical portion. In one embodiment, the fluid jacket is associated with the second conical portion and the cylindrical portion. The fluid jacket may include at least one port to receive a fluid of a predetermined temperature. Optionally, the fluid jacket may include a second port to extract fluid from the fluid jacket. Water or other fluids may be directed into the fluid jacket to maintain the cyclone housing and all of its contents within a desired temperature range. Ports may be formed in the outer wall of the cyclone housing to reach the jacket. The ports may function as inlet or outlet ports for the circulation of cooling or heating fluids through the jacket.

In any of the settler devices of this disclosure, one or more sensors may be positioned to monitor physical conditions within the interior of the settler device. Additionally, or alternatively, at least one sensor may be positioned to monitor conditions within a tubing line interconnected to the settler devices of this disclosure. The tubing line may be a return line interconnected to a bottom outlet port of the settler device.

These sensors may be selected to determine one or more of pH, dissolved oxygen (DO), glucose, temperature, $CO_2$ (including dissolved $CO_2$, known as partial $CO_2$), glucose, lactate, glutamine, and ammonia within a housing of the settler device or a tubing line connected to the settler device. The sensors may include one or more probes in contact with a solution within the housing or the tubing line. The probe may be affixed to an interior surface of the settler device or the tubing line. In preferred embodiments, at least one sensor and/or probe is positioned within the lower conical portion of the settler device, and may be spaced from one or more of the side port and the bottom port.

These probe(s) may transmit data without contact to a reader. In this manner, the probe may measure a condition within the settler device and/or the line and transmit data to the reader outside the settler device. One or more of the probes may be a fluorescent probe. One or more of pH, DO, glucose, lactate, glutamine, ammonia, temperature, and $pCO_2$ may be measured by the probe within the settler device. The probe may be affixed to a portion of the housing. The portion of the housing may be operable to transmit light produced by the fluorescent probe. As described herein, a portion of the housing may be transparent or translucent. The reader (or meter) receives light from the fluorescent probe. The reader may also include an optical fiber that collects light transmitted by the fluorescent probe.

Any suitable sensor or probe known to those of skill in the art may be used with the settler devices of the present disclosure. Suitable probes and readers are available from a variety of vendors, including Scientific Bioprocessing, Inc. and PreSens Precision Sensing GmbH. In another configuration, the probe within the settler device can transmit data to the reader outside the settler device by a network connection. For example, the probe can communicate with the reader by WiFi, Bluetooth, or any other wired or wireless communication modality.

In operation of a settler device of this disclosure, data from these sensor(s) may be used to adjust a temperature of fluid within the fluid jacket. In another embodiment, the data from the sensor may be used to adjust or control one or more of pH, temperature, dissolved oxygen concentration, dissolved carbon dioxide, and nutrient concentrations within the particle settling device. For example, flow rates of fluids into or out of the settler device may be altered to adjust or control one or more of pH, temperature, dissolved oxygen concentration, dissolved carbon dioxide, and nutrient concentrations within the settling device. Additionally, or alternatively, the flow rates of at least one of air, $O_2$, $CO_2$, and/or $N_2$ into the settling device may be adjusted to control conditions within the settling device.

Another aspect is a method of settling particles in a suspension, comprising: (1) introducing a liquid suspension of particles into a settling device which includes: (a) an upper portion with a central port and at least one peripheral port; (b) a cylindrical portion; (c) a lower portion with a middle port and at least one outer port; (d) a stack of cones located within the settling device, each cone of the stack of cones including a first opening, a second opening that is larger than the first opening, and an aperture proximate to the second opening, each of the first openings oriented towards one of the upper portion and the lower portion, the stack of cones generally centered around a longitudinal axis of the settling device; (e) an alignment element oriented approximately parallel to the longitudinal axis and extending through the apertures of the cones; and (f) a distributor element positioned below a lowest cone of the stack of cones; (2) collecting a clarified liquid from the central port of the upper portion; and (3) collecting a concentrated liquid suspension from the middle port of the lower portion.

In one embodiment, the liquid suspension comprises at least one of a recombinant cell suspension, an alcoholic fermentation, a suspension of solid catalyst particles, a municipal waste-water, industrial waste-water, mammalian cells, bacterial cells, yeast cells, plant cells, algae cells, plant cells, mammalian cells, murine hybridoma cells, stem cells, CAR-T cells, red blood precursor and mature cells, cardiomyocytes, yeast in beer, and eukaryotic cells.

In another embodiment, the liquid suspension comprises at least one of: (a) recombinant microbial cells selected from at least one of *Pichia pastoris, Saccharomyces cerevisiae, Kluyveromyces lactis, Aspergillus niger, Escherichia coli,* and *Bacillus subtilis*; and (b) one or more of microcarrier beads, affinity ligands, and surface activated microspherical beads.

Optionally, introducing a liquid suspension comprises directing the liquid suspension through the at least one outer port of the lower portion at a first rate.

In one embodiment, the concentrated liquid suspension is collected from the middle port at a second rate that is less than the first rate such that the clarified liquid flows out of the central port of the upper portion.

In one embodiment, the clarified liquid collected comprises at least one of biological molecules, organic or inorganic compounds, chemical reactants, chemical reaction products, hydrocarbons (e.g., terpenes, isoprenoids, polyprenoids), polypeptides, proteins (e.g., brazzein, colony stimulating factors), alcohols, fatty acids, hormones (e.g., insulin, growth factors), carbohydrates, glycoproteins (e.g., erythropoietin, monoclonal antibodies), beer, and biodiesel.

The method optionally further comprises withdrawing liquid from the settling device through an orifice of the alignment element.

In one embodiment, the method includes measuring at least one of pH, dissolved oxygen, dissolved $CO_2$, glucose, lactate, glutamine, ammonia and temperature within the settling device by a sensor associated with the alignment element.

In another embodiment, introducing a liquid suspension of particles into the settling device comprises pumping the liquid suspension through the at least one outer port of the lower portion and through a plurality of holes formed in a body of the distributor element.

In one embodiment, the body of the distributor element comprises: (i) a lower surface with a lower protrusion in contact with an interior surface of the lower portion of the settling device; and (ii) an upper surface with an upper protrusion in contact with the lowest cone of the stack of cones.

One aspect of the present disclosure is a settler device for concentrating fluids and harvesting cells including: mesenchymal stem cells (MSCs), induced pluripotent stem cells (iPSCs), chimeric antibody receptor-T lymphocytes (CAR-T cells) and other stem cell or their products, such as organoids or exosomes, and cultured meat or fish cells.

The settler device is configured to: (i) reduce shear stress to cells within the settler device, decreasing damage and death of cells; (ii) selectively remove any previously generated dead cells and/or cell debris; and (iii) separate single live cells from larger microcarrier beads or cell aggregates (e.g., organoids) or subcellular products (e.g., extracellular vesicles or exosomes). By reducing shear stress and damage to cells, the settler devices of the present disclosure provide a higher percentage of viable cell therapy products, with higher therapeutic value, for the treatment of various cancers and other diseases compared to other settler devices.

The settler device can gently separate desired cells or particles from the spent culture media, from the microcarrier beads, and from dead cells and cell debris.

The settler device can recover about 95% of secreted antibody in the clarified supernatant. In one embodiment, the settler device can reduce the turbidity of the supernatant to below 200 NTUs from the starting cell culture broth turbidities of around 2,000 NTU, as required for successful downstream depth filtration as a secondary or final clarification step.

Another aspect of the present disclosure is a setter device which includes single use, disposable sensors for glucose, temperature, pH and dissolved oxygen. The glucose, temperature, pH, dissolved oxygen, dissolved $CO_2$, lactate, glutamine and ammonia within the settler device are controlled by manipulating input nutrient media and gas mixture sparged into the settler device. For example, by manipulating the flow rates of at least one of air, $O_2$, $CO_2$ and $N_2$ introduced into the settling device through a distributor or by manipulating the flow rates of different liquid media components pumped in through the distributor.

The preceding is a simplified summary of the disclosure intended to provide an understanding of some aspects of the settler devices of this disclosure. This Summary is neither an extensive nor exhaustive overview of the invention and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below. As will be appreciated, other embodiments are possible using, alone or in combination, one or more of the features set forth above or described herein. For example, it is contemplated that various features and devices shown and/or described with respect to one embodiment may be combined with or substituted for features or devices of other embodiments regardless of whether or not such a combination or substitution is specifically shown or described herein. Additional aspects of the present invention will become more readily apparent from the Detailed Description, particularly when taken together with the drawings.

BRIEF DESCRIPTION OF FIGURES

FIG. 1 is a front perspective view of a settler device of this disclosure;

FIG. 2 is a partial sectional front perspective view of the settler device of FIG. 1 illustrating a stack of convex cones within the settler device;

FIG. 3 is another partial sectional front perspective view of the settler device of FIG. 2;

FIG. 5A is a perspective view of a housing of the settler device of FIG. 1;

FIG. 5B is a top plan view of the housing of FIG. 5A;

FIG. 5C is a side elevation view of the housing of FIG. 5A;

FIG. 9A is a top plan view of a cone of the settler device of FIG. 1;

FIG. 9B is a bottom plan view of the cone of the settler device of FIG. 1;

FIG. 9C is a side elevation view of the cone of the settler device of FIG. 1;

FIG. 9D is a cross-sectional side elevation view of the cone of the settler device taken along line 9D-9D of FIG. 9A;

FIG. 10 is a front perspective view of a settler device of yet another configuration of this disclosure;

FIG. 11 is a partial sectional front elevation view of the settler device of FIG. 10;

FIG. 12 is another partial sectional front perspective view of the settler device of FIG. 10, illustrating an upper stack of cones and a lower stack of cones within the settler device;

FIGS. 14 and 15 are views of the lower cones of the settler device of FIG. 10;

FIG. 16 is a front perspective view of a settler device of another configuration of this disclosure with internal elements of the settler device illustrated in phantom lines;

FIG. 17 is a cross-sectional front elevation view of the settler device of FIG. 16;

FIGS. 27A-27C are views of a settler device similar to the settler device of FIGS. 1-9 and including an aspirator positioned within the settler device and interconnected to a second upper port;

FIGS. 28A-28C illustrate another settler device of the present disclosure and which includes a flange or joint of another embodiment;

FIGS. 29B-29C are front elevation views of the settler device of FIG. 29A illustrating the aspirator in a first position and a second position respectively;

FIGS. 30B-30C are front elevation views of the settler device of FIG. 30A illustrating the aspirator in a first position and a second position respectively;

FIG. 39 is a perspective cross-sectional view of the distributor, aspirators, and cones of the settler device of FIG. 37 with the housing removed for clarity;

FIG. 40 is a front perspective view of the distributor, aspirators, and cones of the settler device of FIG. 37 with the housing removed for clarity;

FIG. 41 is a front perspective view of the settler device of FIG. 37 with the housing shown;

FIG. 42 is a cross-sectional perspective view of the settler device of FIG. 37 and further illustrating transmission lines inserted into ports of the top section, the lines connected to sensors positioned at different depths within the housing;

FIG. 43 is a cross-sectional front elevation view of the settler device of FIG. 42;

FIG. 44 is a cross-sectional front elevation view of the settler device of FIG. 43 showing the transmission lines and sensors at various depths within the housing and with the cones removed for clarity;

FIG. 45 is a perspective view of the settler device of FIG. 44 with a cylindrical portion of the housing removed for clarity;

FIG. 46 is a perspective view of the transmission lines positioned in tubes with the sensors, the tubes arranged vertically proximate to the large openings of cones of a stack of cones;

FIG. 47 is a perspective view of two cones of another embodiment, the cones concentrically arranged and including aligned notches extending to a circumference of large ends of the cones and further illustrating projections formed in the cones for separating adjacent cones;

FIG. 48 is a perspective view of the cones of FIG. 47 supported by aspirators that extend through the notches and further illustrating a lower end of the aspirators engaged by posts extending from a distributor of another embodiment of the present disclosure;

FIG. 49 is another perspective view similar to FIG. 47 and showing a stack of cones supported by the aspirators and the distributor;

FIG. 50 is a perspective view of two cones of yet another embodiment of the present disclosure, the cones concentrically arranged and including aligned apertures spaced away from a circumference of large end of the cones and further illustrating projections formed in the cones for separating adjacent cones;

FIG. 51 is a perspective view of the cones of FIG. 50 supported by aspirators that extend through the apertures and further illustrating a lower end of the aspirators engaged by posts extending from a distributor of the present disclosure;

FIG. 52 is a cross-sectional perspective view of a settler device of an embodiment of the present disclosure with the cones, aspirators, and distributor of FIG. 51 and further illustrating a spacing between two cones proximate to the upper portion of the housing;

FIG. 53 is a cross-sectional front elevation view of the settler device of FIG. 52;

FIG. 54 is a front perspective view of a stack of cones comprising the cones of the embodiment of FIG. 50 aligned by the aspirators engaged with the posts of the distributor;

FIG. 55 is a cross-sectional view of the stack of cones of FIG. 54 positioned within a settler device of the present disclosure;

FIG. 56 is a front elevation view of the settler device of FIG. 55;

FIG. 57 is a front perspective view of the settler device of FIG. 55;

FIG. 58 is a top plan view of a top portion of a settler device of the present disclosure and illustrating indicia associated with ports, the indicia related to a depth to which an aspirator inserted through a port will extend within a housing of the settler device;

FIG. 65 is a cross-sectional perspective view of a housing of a settler device of another embodiment of the present disclosure, the housing including integral slots to distribute gases around an interior surface of the housing;

FIG. 66 is a cross-sectional front elevation view of the housing of FIG. 65;

FIG. 67 is another cross-sectional perspective view of the housing of FIG. 65 and further illustrating a cone positioned within the housing;

FIG. 68 is a cross-sectional front elevation view of the housing and cone of FIG. 67 and illustrating an upper portion or large end of the cone supported by an inner surface of the housing such that the large opening is proximate to the integral slots of the housing;

FIG. 69 is an exploded perspective view of a settler device and illustrating a bottom portion, a cylindrical portion and an upper portion or lid of the housing;

FIGS. 70-71 are perspective views of the settler device of FIG. 69 and further illustrating an optional second cylindrical section;

FIG. 72 is a perspective view of a settler device positioned on a stand of the present disclosure and further illustrating transmission lines extending from the stand, the transmission lines associated with sensors supported by the stand;

FIG. 73 is a front elevation view of the settler device and stand of FIG. 72;

FIG. 74 is a right side elevation view of the settler device and stand of FIG. 72;

FIG. 75 is a right side perspective view of the settler device and stand of FIG. 72;

FIG. 76 is a right side perspective view of the stand of FIG. 72;

FIG. 77 is a front perspective view of the stand of FIG. 72;

FIG. 78 is another perspective view of the stand of FIG. 72 with additional supports of the present disclosure;

FIG. 79 is a perspective view of a stand of another embodiment of the present disclosure and illustrating transmission lines extending from the settler device;

FIG. 81 is a cross-sectional front perspective view of the settler device of FIG. 80;

FIG. 82 is a cross-section front perspective view of an upper conical portion of the settler device of FIG. 80 and illustrating conduits extends through ports formed through a first end and a second end of the upper conical portion;

DETAILED DESCRIPTION

Figure 4:
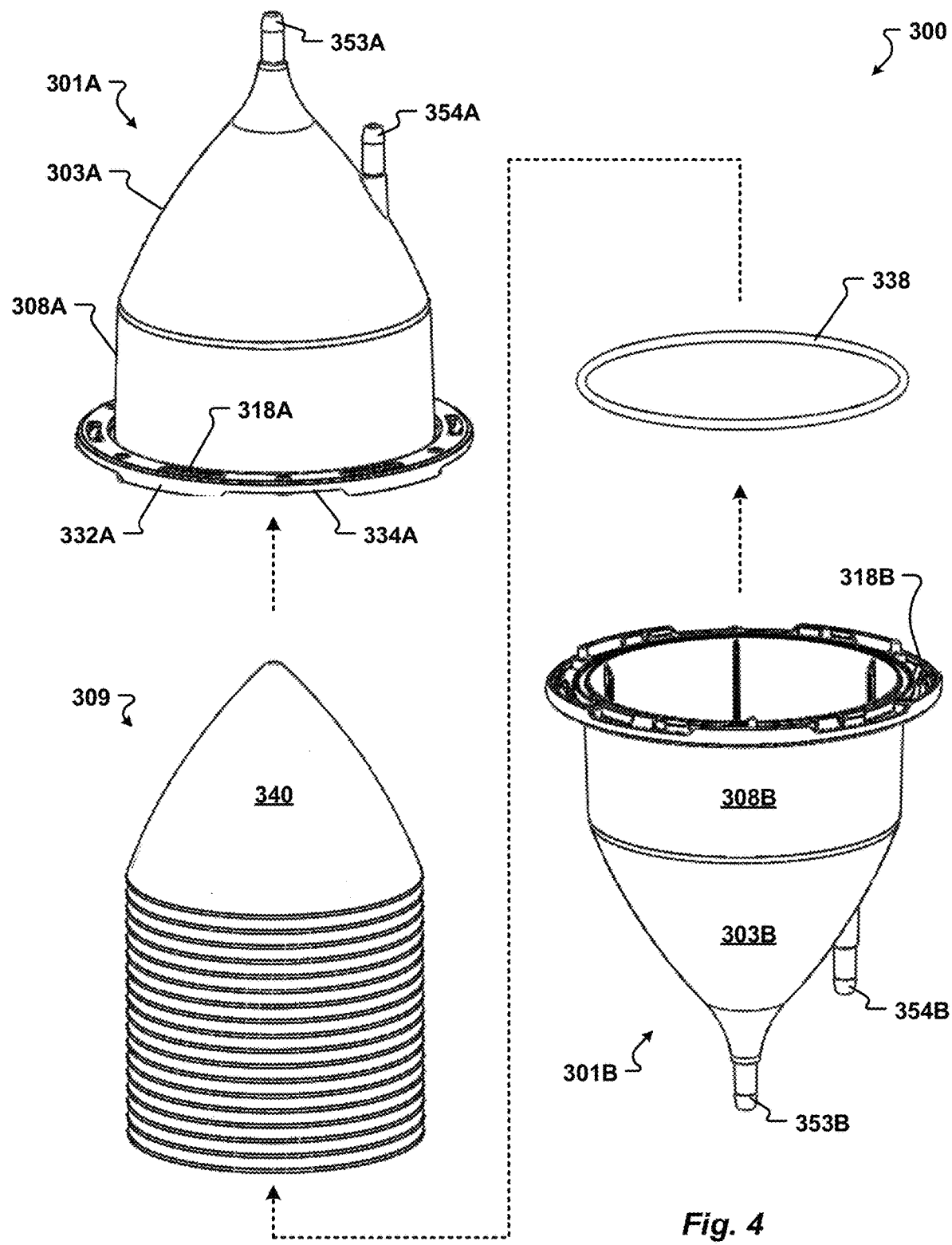
FIG. 4 is an exploded front perspective view of the settler device of FIG. 1.
Figure 6:
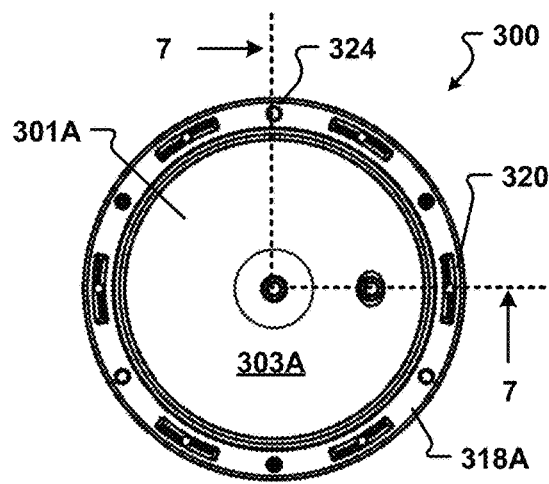
FIG. 6 is a top plan view of the settler device of FIG. 1.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

The transitional term "comprising" is synonymous with "including," "containing," or "characterized by," is inclusive or open-ended and does not exclude additional, unrecited elements or method steps.

Unless otherwise indicated, all numbers expressing quantities, dimensions, conditions, ratios, ranges, and so forth used in the specification and claims are to be understood as being modified in all instances by the term "about" or "approximately". Accordingly, unless otherwise indicated, all numbers expressing quantities, dimensions, conditions, ratios, ranges, and so forth used in the specification and claims may be increased or decreased by approximately 5% to achieve satisfactory results. Additionally, where the meaning of the terms "about" or "approximately" as used herein would not otherwise be apparent to one of ordinary skill in the art, the terms "about" and "approximately" should be interpreted as meaning within plus or minus 5% of the stated value.

All ranges described herein may be reduced to any sub-range or portion of the range, or to any value within the range without deviating from the invention. For example, the range "5 to 55" includes, but is not limited to, the sub-ranges "5 to 20" as well as "17 to 54."

The transitional phrase "consisting of" excludes any element, step, or ingredient not specified in the claim, but does not exclude additional components or steps that are unrelated to the disclosure such as impurities ordinarily associated therewith.

The transitional phrase "consisting essentially of" limits the scope of a claim to the specified materials or steps and those that do not materially affect the basic and novel characteristic(s) of the claimed invention.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

Referring now to FIG. 1, a configuration of a settler device 300 of the present disclosure, useful for settling particles or cells, is illustrated. The settler device 300 generally includes an upper housing 301A and a lower housing 301B. In one embodiment, the upper and lower housings 301A, 301B are substantially identical. Accordingly, in one embodiment, the housings 301A, 301B are generally interchangeable.

Referring now to FIGS. 2-9, the housings 301A, 301B generally include a conical portion 303A, 303B, a cylindrical portion 308A, 308B, a first port 353A, 353B, and a second port 354A, 354B.

Optionally, the first port 353 is generally aligned concentrically with a longitudinal axis of the housing 301. The first port 353 can be used as an inlet as well as an outlet. In exemplary embodiments, the second port 354 extends through the conical portion 303. The second port 354 can also be used to introduce or remove liquids, gases, and solids from the settler device 300. Optionally, the second port 354 can be aligned generally parallel to the longitudinal axis 350 of the cell settler device. In exemplary embodiments, the second port 354 may extend through the cylindrical portion 308. Other configurations of the first and second ports 353, 354 are contemplated. The housing 301 may also have more than two ports. The ports 353, 354 are configured to interconnect to a tubing line.

Such tubing line may be interconnected to any of the compact cell settler devices of the present disclosure. The line may have a diameter or otherwise be configured to interconnect to any port of embodiments of the present disclosure. The line may optionally include at least one sensor positioned within a hollow interior. The sensors may be in contact with fluid and/or particles within the line. Optionally, the sensors may be arranged on an interior surface of the line, although other configurations are contemplated. The sensors may be operable to monitor one or more of pH, DO, glucose, temperature, and $CO_2$ (including dissolved or partial $CO_2$) in the line. Optionally, one or more of the sensors may comprise a fluorescent probe which emits light that varies based on a condition sensed by the probe. The light may be collected by a reader or meter. Optionally, the light may be collected by an optional fiber cable and transmitted to the meter. The meter is operable to report or display levels of at least one of pH, DO, glucose, temperature, and $CO_2$ sensed by the fluorescent probes. The tubing line may comprise a material that is transparent or at least translucent. Thus, light generated by a sensor may pass through the line. Alternatively, at least a portion of a line is transparent or translucent, similar to a window. Accordingly, light generated by a sensor may be transmitted through window portion and collected by the meter.

Cones 309 can be positioned within the settler device 300. As illustrated in FIGS. 2 and 3, the cones 309 may be arranged in a stack with an open apex 342 oriented toward the first port 353A of the upper housing 301A and a base or large opening 346 oriented towards the first port 353A of the lower housing 301B. In exemplary embodiments, between three and twenty-five cones 309 are arranged in a stack within the settler device 300. However, the housings 301 can be sized to receive any number of cones 309 when the settler device 300 is assembled as illustrated in FIG. 4.

Elements of the settler device 300, such as the housings 301 and the cones 309, can be fabricated of a single-use, disposable plastic. Alternatively, one or more of the housings 301 and the cones 309 can be manufactured of a metal, such as a stainless-steel alloy, or glass. Surfaces of the cones 309, and interior surfaces of the housings 301, may be completely or partially coated with one or more of a non-stick plastic, teflon, silicone and similar materials known to those of skill in the art. Additionally, or alternatively, the surfaces (especially when formed of stainless steel) may be electropolished to provide a smooth surface. These settler devices can be easily scaled to any desired size.

The housings 301 may optionally include a fluid jacket (not illustrated). The fluid jacket can operate such that water or other fluids may be directed into the fluid jacket through one or more ports to maintain the housings 301 and contents within the settler device 300 within a desired temperature range.

Referring now to FIGS. 5A-5C, a plurality of spacers 315 may project inwardly from an interior surface of the housings 301. The spacers 315 are configured to prevent the stack of cones 309 residing within the settler device 300 from resting against the interior surface of the housings 301A, 301B. Optionally, the spacers 315 can be approximately parallel to the longitudinal axis 350 of the settler device 300. Other configurations of the spacers 315 are contemplated. The spacers 315 have a substantially thin cross-section to prevent or minimize interference with the movement or flow of liquid and suspended particles within the settler device 300.

Figure 7:
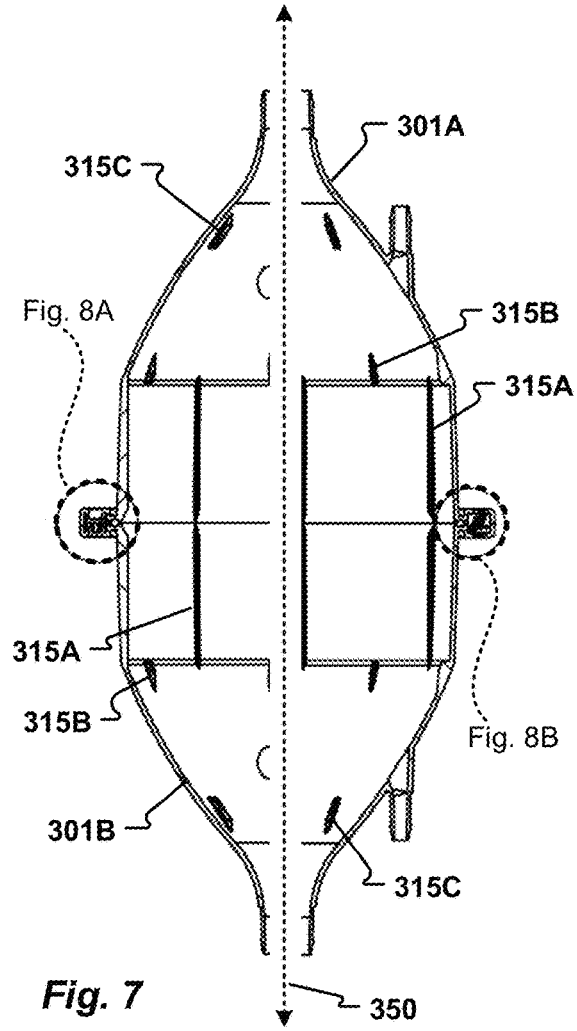
FIG. 7 is a cross-sectional front elevation view of the settler device taken along line 7-7 of FIG. 6 with the stack of cones removed for clarity.

Referring now to FIG. 7, the spacers 315 may include a plurality of first spacers 315A, second spacers 315B, and third spacers 315C. As generally illustrated, in one embodiment, each of the first spacers 315A extends along at least a portion of an interior surface of the cylindrical portion 308. The second spacers 315B extend from an interior surface of the conical portion 303 proximate to the cylindrical portion 308. The third spacers 315C can be separated from the second spacers 315B. Specifically, in one embodiment, the third spacers 315C are arranged closer to the first port 353 than to the cylindrical portion 303.

In one embodiment, the upper housing 301A and the lower housing 301B are fixedly joined. For example, the upper and lower housings 301 can be glued, heat welded, or sonically welded together.

Alternatively, and referring again to FIG. 1, optionally a flange 318 can extend from the generally cylindrical portion 308 of the housings 301. In exemplary embodiments, the flange extends approximately perpendicular to the longitudinal axis 350. The optional flange 318A is configured to interconnect the upper housing 301A to a flange 318B of the lower housing 301B. The flanges 318A, 318B can optionally include projections 320 which are best seen in FIG. 5A. In exemplary embodiments, a catch or hook 322 is formed at a free end of each projection 320.

At least one protrusion 324 can also be formed on the flange 318. The protrusion 324 may have a shape that is generally cylindrical. The protrusion 324 is adapted to be received in a corresponding recess 326 of another flange. Additionally, or alternatively, the flange 318 can include features 332, 334 adapted to align the upper and lower housings 301A, 301B. In exemplary embodiments, the features comprise tabs 332 and associated depressions 334. As illustrated in FIG. 1, when the upper and lower housing 301A, 301B are aligned, the tabs 332 fit into the depressions 334 of an opposing flange.

Figure 8A:
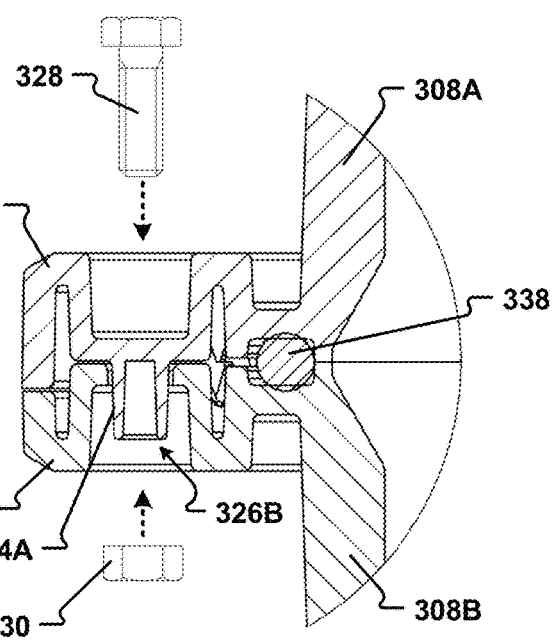
FIG. 8A is a detailed cross-sectional front elevation view of a portion of FIG. 7.
Figure 8B:
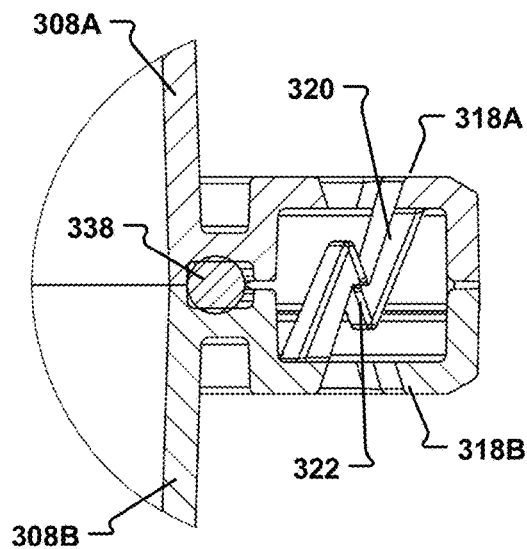
FIG. 8B is another detailed cross-sectional front elevation view of a portion of FIG. 7.

Optionally, the flange protrusion 324 and recess 326 may include bores. The bores of the protrusion and recess are configured to align when a protrusion 324 of an upper housing 301A is received in a recess 326 of a lower housing 301B (as illustrated in FIG. 8A). In this manner, a fixture 328, such as a bolt, can pass through the aligned bores. A nut 330 can then be interconnected to the fixture 328 to releasably lock the housings 301A, 301B together. As generally illustrated in FIG. 8B, the projections 320 of the flange 318 are configured to interlock when an upper housing 301A is aligned with a lower housing 301B. Specifically, in one embodiment, the hooks 322 of the projections 320 releasably interlock.

A groove 336 can be formed in the optional flange 318. The groove 336 is configured to retain a washer or a gasket 338 positioned between the upper and lower housings 301A, 301B as generally illustrated in FIGS. 8A and 8B.

In one embodiment, the conical portion 303 of the housings 301 is not linear. More specifically, the conical portion 303 tapers along an arcuate path from a maximum diameter proximate to the cylindrical portion 308 to a minimum diameter proximate to the first port 353. More specifically, and referring now to FIGS. 5C and 7, a longitudinal cross-section of the conical portion 303 of the housing 301 defines a line with an arcuate shape between the cylindrical portion 308 and the first port 353. In one embodiment, the conical portion 303 is concave inwardly towards a center of the settler device 300. In another embodiment, the conical portion 303 can have a constant radius of curvature. Optionally, in another embodiment, the conical portion 303 can have two or more radii of curvature. For example, the conical portion 303 may have a first radius of curvature proximate to the cylindrical portion 308 and a second radius of curvature proximate to the first port 353. Center points of the first and second radii of curvature are positioned within an interior of housing. Optionally, the slope of the conical portion 308 may vary between approximately 15° and approximately 85° relative to the longitudinal axis 350. In one embodiment, the conical portion 303 includes a convex portion proximate to the first port 353. The convex portion has a radius of curvature with a center point which is outside of the housing.

Referring now to FIGS. 9A-9D, the cones 309 generally include a body 340 having an apex 342 with a small opening 344 and a base with a large opening 346. Optionally, each of the cones is separately formed. In exemplary embodiments, the cones are of substantially the same size and shape.

In some embodiments, the body 340 may not be linear between the small and large openings 344, 346. As illustrated in FIG. 9D, a longitudinal cross-section of the body 340 forms a line with an arcuate shape. The arcuate shape of each cone 309 may be approximately the same as the conical portion 303 of the housing 301.

In some embodiments, the body 340 is concave inwardly toward the longitudinal axis 350. Thus, a line drawn from a point at the large opening 346 to a point at the small opening 344 is within an interior of the body.

Optionally, the body 340 has a constant radius of curvature. Alternatively, the body can have two or more radii of curvature. Thus, the body may have a first radius of curvature proximate to the small opening 344 and a second radius of curvature proximate to the large opening 346. Center points of the first and second radii of curvature are positioned within an interior of cone 309. In this manner, a portion of the body 340 proximate to the small opening 344 can have a slope that is different than a slope of the body proximate to the large opening. For example, proximate to the small opening 344, the body may be aligned at an angle of at least approximately 40° relative to the longitudinal axis 350. In contrast, near the large opening 346, the body can be closer to vertical (or closer to longitudinal axis). More specifically, the body may be sloped at an angle of less than approximately 45° relative to the longitudinal axis at a point proximate to the large opening 346. Optionally, the slope of the body 340 may vary between approximately 5° and approximately 85° relative to the longitudinal axis.

As shown in FIGS. 9B, 9D, each cone 309 can include projections 313 configured to contact an adjacent cone to hold each successive cone 309 in a stack of cones at substantially an equal spacing. In one embodiment, the projections 313 extend inwardly from an interior surface of the body 340. The projections 313 are configured to contact an exterior surface of a body 340 of an adjacent cone. Alternatively, the projections 313 can extend from an exterior surface of the body 340.

The projections 313 may be sized to provide any desired spacing between adjacent cones. Optionally, the projections 313 are configured to separate adjacent cones by a distance between approximately 1 mm to approximately 2.5 cm. In exemplary embodiments, each cone 309 includes at least three projections 313.

Referring now to FIGS. 2 and 3, when the cones 309 are positioned within the upper housing 301A, the body 340 of the bottom cone 309A is supported by the second spacers 315B of the lower housing 301B. At least the conical portion 303 of the lower housing 301B and portions of the cylindrical portions 308A, 308B may be empty of cones. Accordingly, cells in culture can be retained in the settler device 300.

During operation of the settler device 300 of the embodiments depicted in FIGS. 1-9D, serum-free or animal protein-free cell culture medium may be pumped into the settler device 300 through one or more of the first and second ports 353, 354 of the lower housing 301B. The cell culture medium can be pumped continuously or periodically into the settler device 300. Specifically, the settler device 300 can operate in batch or continuous mode operation.

A controlled mixture of air, $O_2$, $CO_2$, and $N_2$ may also be pumped into the settler device 300 to control the pH and DO of the culture supernatant inside the settler device 300. Optionally, one or more of the second ports 354A, 354B and the lower housing 301B first port 353B can be used for sampling bioreactor contents, for example to check cell viability, and continuous measurement of liquid pH and DO for inputs into a computer-controlled multi-gas mass flow controller.

At the end of in vitro cell expansion, the concentrated settled cells collecting at the bottom of the settler device 300 within lower housing 301B can be harvested from first port 353B of the lower housing. Clarified culture fluid containing any metabolic waste products, such as ammonia and lactate, or gasses, along with any not-yet settled smaller dead cells and cell debris, may be removed through the first port 353A of the upper housing 301A.

Optionally, the settler device 300 can be used as a stand-alone bioreactor/cell sorter combination. Growth media may be added to the cell settler device through one or more of the first and second ports 353, 354. Accordingly, the settler device 300 may be used without a perfusion bioreactor.

In one embodiment, sensors may be positioned within the settler device 300. Optionally, the sensors may be arranged on an interior surface of one or more of the housings 301A, 301B. At least a portion of the housings 301 may comprise a plastic. In exemplary embodiments, the entire housing may be composed of plastic. In exemplary embodiments, the plastic is transparent or at least translucent. Optionally, at least a portion of the housing 301 is transparent or translucent. For example, a transparent or translucent material may be interconnected to an aperture in the housing 301 similar to a window. The transparent portion may comprise glass, plastic, or any other suitable material. The transparent portion may be formed of a material which is transparent to light of a predetermined range or ranges of wavelengths.

When present, the sensors are positioned to be in contact with media within the settler device 300. The sensors may be operable to monitor one or more of pH, DO, glucose, temperature, and $CO_2$ (including dissolved or partial $CO_2$) in the settler device 300.

Optionally, one or more of the sensors may comprise a fluorescent probe operable to emit light that varies based on a condition sensed by the fluorescent probe. Fluorescent probes may be arranged in a variety of different positions within the settler device 300. More specifically, fluorescent probes can be arranged to measure different conditions, or changes of conditions, at different areas within the cell settler device. Optionally, at least one fluorescent probe is affixed to an interior surface of the conical portion 303B of the lower housing 301B.

Light emitted by the fluorescent probes passes through the surface of housing 301 (or a transparent portion of the housing) and may be collected by a reader or meter. As described herein, the meter is operable to report or display levels of at least one of pH, DO, glucose, temperature, and $CO_2$ sensed by the fluorescent probes within the settler device 300. Optionally, light emitted by a fluorescent probe may be collected by an optional fiber cable and transmitted to the meter.

Referring now to FIGS. 10-15, another configuration of a settler device 400 of this disclosure, useful for settling cells or particles, is illustrated. The settler device 400 generally includes an upper housing 301 and a lower housing 401. The upper housing 301 includes a first stack of cones 309 and the lower housing 401 includes a second stack of cones 409. The upper housing 301 and cones 309 are the same as, or similar to, the housings 301 and cones 309 described in conjunction with FIGS. 1-9D.

The lower housing 401 generally includes a conical portion 403, a cylindrical portion 408, a first port 453 and a second port 454. The ports 453, 454 are configured to interconnect to a tubing line.

In one embodiment, the lower housing 401 is fixedly joined to the upper housing 301. For example, the lower housing and upper housing can be welded (including heat welding), glued together, or joined by another means known to those of skill in the art.

Alternatively, the lower housing 401 can optionally include a flange 418. The optional flange 418 is configured to releasably interconnect to an optional flange 318 of housing 301. Accordingly, the flange 418 may include hooked projections, protrusions, recesses, tabs, and depression that function similar to features of the flange 318. Optionally, spacers 415 may extend inwardly from the cylindrical portion 408.

Figure 13:
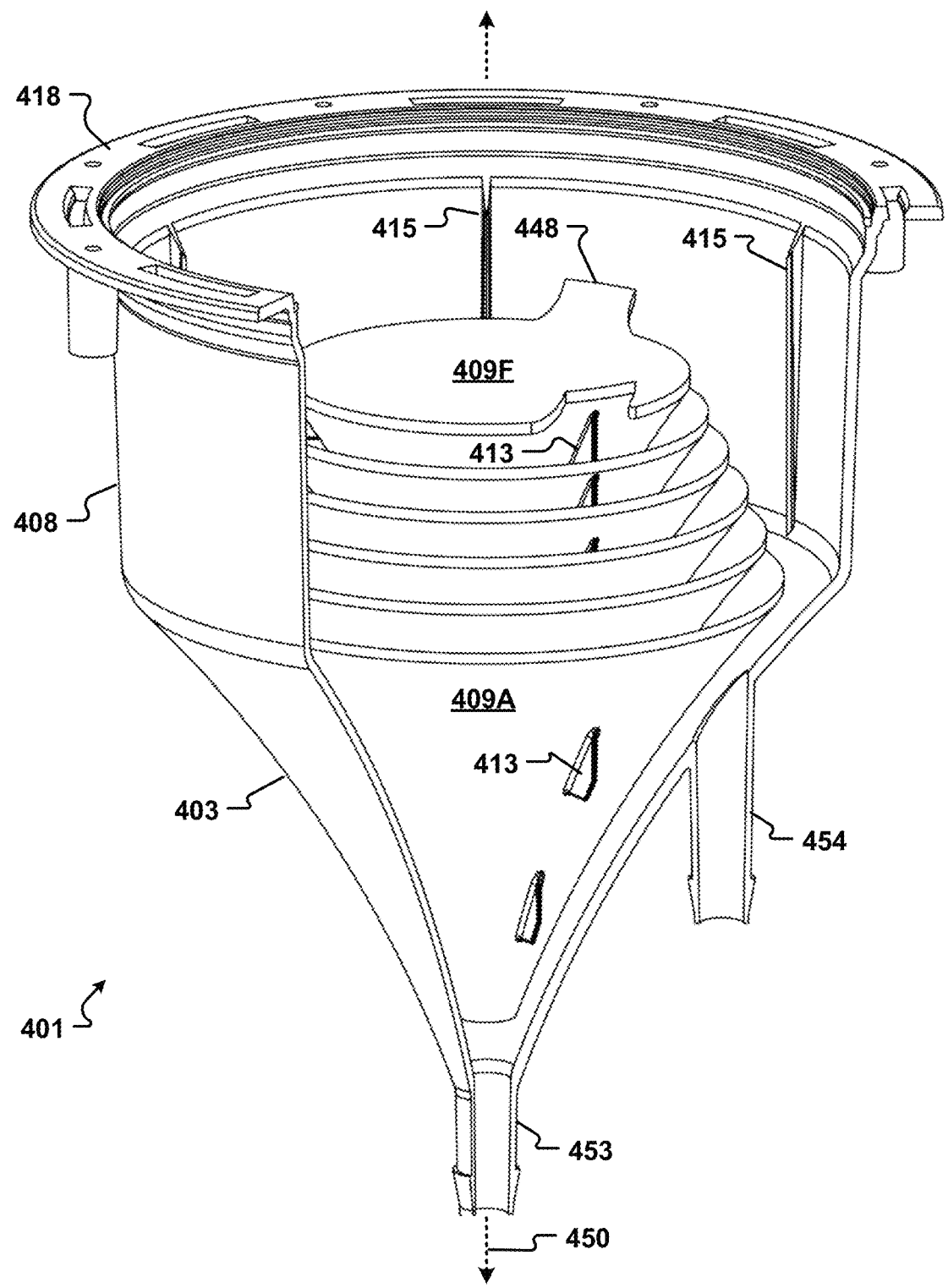
FIG. 13 is a partial cross-sectional perspective view of a lower housing of the settler device of FIG. 10 and showing the lower stack of cones.

Referring now to FIG. 13, the conical portion 403 of the housing 401 is convex inwardly towards the longitudinal axis 450. Specifically, a straight line drawn from a point of the conical portion proximate to the first port 453 to a point where the conical portion intersects the cylindrical portion 408 will lie outside of the housing 401.

The conical portion 403 can have a constant radius of curvature. Alternatively, the conical portion 403 can have two or more radii of curvature. For example, the conical portion 403 may have a first radius of curvature proximate to the cylindrical portion 408 and a second radius of curvature proximate to the first port 453. Center points of the first and second radii of curvature are positioned outside of the housing 401. In one embodiment, the conical portion 403 is sloped at an angle of less than approximately 45° relative to the longitudinal axis 450 at a point proximate to the first port 453. Optionally, at a point proximate to the cylindrical portion 408, the conical portion has a slope greater than approximately 45° to the longitudinal axis. In another embodiment, the slope of the conical portion 403 may vary between approximately 15° and approximately 85° relative to the longitudinal axis.

In exemplary embodiments, sensors may be positioned within the settler device 400. The sensors can be arranged on an interior surface of one or more of the housings 301, 401. The sensors may be arranged to be in contact with media within the settler device 400. The sensors are operable to monitor one or more of pH, DO, glucose, temperature, and $CO_2$ (including dissolved or partial $CO_2$) in the settler device 400. The sensors may be the same as other sensors described herein. Accordingly, one or more of the sensors may comprise a fluorescent probe operable to emit light that varies based on a condition sensed by the fluorescent probe. The light may be transmitted through a transparent portion of the housings 301, 401 or through a window in the housings.

As illustrated in FIGS. 12 and 13, cones 409 are stacked in the lower housing 401. The cones 409 are oriented with a small opening 444 positioned proximate to the first port 453. The body 440 of each cone 409 has a shape that generally corresponds to the shape of the housing conical portion 403. Specifically, the cone body 440 can have an arcuate shape corresponding to at least a portion of the conical portion of the housing. In exemplary embodiments, the cone bodies are convex inwardly towards the longitudinal axis 450. Optionally, the cone bodies have a constant radius of curvature. Alternatively, the cone bodies may have two or more radii of curvature. In one embodiment, the slope of the bodies can vary between approximately 5° and approximately 85° relative to the longitudinal axis.

Projections 413 may be formed on the cone body 440 such that adjacent cones are separated by a predetermined distance. In one embodiment, the projections 413 extend inwardly from an interior surface of the cone body. Additionally, or alternatively, projections 413 can optionally be formed on an exterior surface of the cone body. When the cones are stacked together, the projections 413 contact an interior surface of a lower cone such that adjacent cones are separated by the predetermined distance. The projections 413 of the lowermost cone 409A will contact an interior surface of the conical portion 403 when the cones are positioned in the housing 401. An uppermost cone 409E may optionally include projections 448 which extend beyond the large opening 446. As shown in FIG. 12, the projections 448 of the uppermost cone 409E can contact an interior surface of the lowermost cone 309A of the upper stack of cones 309. Contact between the projections 448 and the cone 309A prevents unintended or inadvertent movement of the stack of cones 409.

As illustrated in FIGS. 14 and 15, in some embodiments, the cones 409 have different diameters. A lowermost cone 409A may have a diameter that is larger than other cones in the stack. Each cone 409B-409E may have a successively smaller diameter with the uppermost cone 409E having the smallest diameter. In one embodiment, six cones 409A-409E may be stacked in the lower housing 401. In another embodiment, a stack of cones 409 in the lower housing may include from four to ten cones.

The settler device 400, including the housings 301, 401 and the cones 309, 409, can be formed of the same materials as other embodiments described herein. In exemplary embodiments, one or more of the housings and cones are fabricated of a single-use, disposable plastic. Alternatively, one or more of the housings and the cones are manufactured of a metal, such as a stainless-steel alloy, or a glass. Surfaces of the cones 309, 409, and interior surfaces of the housings 301, 401 may be completely or partially coated with one or more of a non-stick plastic, teflon, silicone and similar materials known to those of skill in the art. Surfaces of the settler device 400 (especially when formed of stainless steel) may be electropolished to provide a smooth surface. The settler device 400 can be scaled to any desired size.

The settler device 400 may operate in the same or similar manner as settler device 300. Specifically, serum-free or animal protein-free cell culture medium may be pumped into the settler device 400 through one or more of the first and second ports 453, 454 of the lower housing 401. The cell culture medium can also be pumped continuously or periodically into the settler device 400. Specifically, the settler device 400 can operate in batch or continuous operation.

A controlled mixture of air, $O_2$, $CO_2$, and $N_2$ may also be pumped into the settler device 400 to control the pH and DO of the culture supernatant inside the cell settler device. Optionally, one or more of the second ports 354, 454 and the lower housing 301 first port 353 can be used for sampling bioreactor contents, for example to check cell viability, and continuous measurement of liquid pH and DO for inputs into a computer-controlled, multi-gas mass flow controller.

At the end of in vitro cell expansion, the concentrated settled cells collecting at the bottom of the settler device 400 can be harvested from first port 453 of the lower housing 401. Clarified culture fluid containing any metabolic waste products, such as ammonia and lactate, or gasses, along with any not-yet settled smaller dead cells and cell debris, may be removed through the first port 353 of the upper housing 301.

Optionally, the settler device 400 can be used as a stand-alone bioreactor/cell sorter combination. Growth media may be added to the cell settler device through one or more of the first and second ports 353, 354, 453, 454. Accordingly, the settler device 300 may be used without a perfusion bioreactor.

Referring now to FIGS. 16-21, another configuration of a settler device 500 for particles or cells of the present disclosure is illustrated. The settler device 500 includes elements that are the same as, or similar to, settler devices 300, 400 of the present disclosure. More specifically, the settler device 500 generally includes an upper conical portion 503A, a cylindrical portion 508, and a lower conical portion 503B which define a generally hollow interior. In one embodiment, the upper and lower conical portions 503A, 503B are substantially identical. At least one stack of cones 509 is positioned within the settler device 500.

The conical portions 503A, 503B generally include a first port 553 and optionally a second port 554. Optionally, the first port 553 is aligned substantially concentrically with a longitudinal axis 550 of the settler device 500. The first port 553 can be used as an inlet as well as an outlet.

The second port 554 can also be used to introduce or remove liquids, gases, and solids from the hollow interior of the settler device 500. In exemplary embodiments, the second port 554 extends through the conical portion 503. Optionally, the second port 554 can be aligned generally parallel to the longitudinal axis 550 of the cell settler device. In other embodiments, the second port 554 may extend through the cylindrical portion 508. In one embodiment, the second port 554 can be oriented transverse or perpendicular to the longitudinal axis 550. Other configurations of the first and second ports 553, 554 are contemplated. The settler device 500 may also have more than four ports.

The ports 553, 554 are configured to interconnect to a tubing line. Such tubing line may be interconnected to any of the compact cell settler devices of the present disclosure. The tubing line may have a diameter or otherwise be configured to interconnect to any port of embodiments of the present disclosure. The line may optionally include at least one sensor positioned within a hollow interior. The sensors may be in contact with fluid and/or particles within the line. Optionally, the sensors may be arranged on an interior surface of the line, although other configurations are contemplated. The sensors may be operable to monitor one or more of pH, DO, glucose, temperature, and $CO_2$ (including dissolved or partial $CO_2$) in the line.

Optionally, one or more of the sensors may comprise a fluorescent probe which emits light that varies based on a condition sensed by the probe. The light may be collected by a reader or meter. The light can optionally be collected by an optional fiber cable and transmitted to the meter. The meter is operable to report or display levels of at least one of pH, DO, glucose, temperature, and $CO_2$ sensed by the fluorescent probes. The line may comprise a material that is transparent or at least translucent. Thus, light generated by a sensor may pass through the line. Alternatively, at least a portion of a line is transparent or translucent, similar to a window. Accordingly, light generated by a sensor may be transmitted through window portion and collected by meter.

Figure 20B:
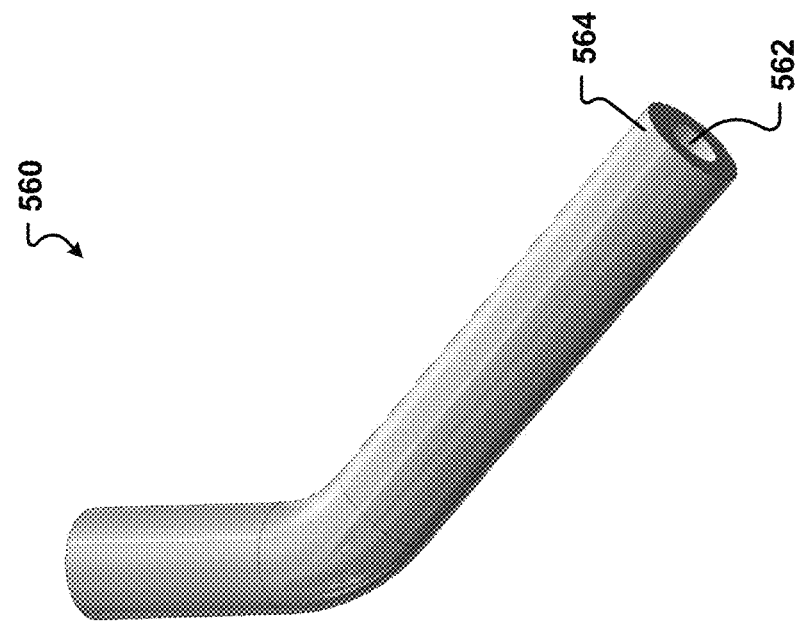
FIGS. 20A and 20B are perspective views of an optional conduit for use with settler devices of the present disclosure.
Figure 20A:
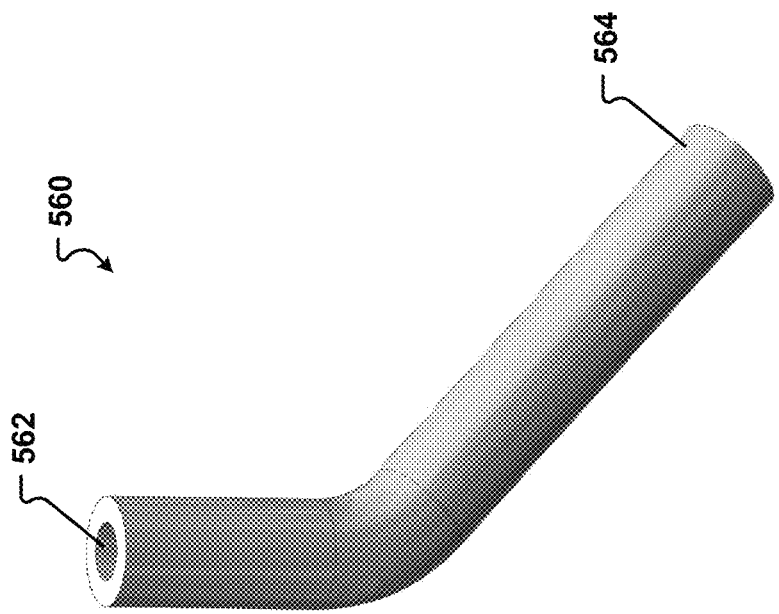

A conduit 560 can optionally be interconnected to at least one of the second ports 554 within the interior of the settler device 500. One embodiment of a conduit 560 of the present disclosure is generally illustrated in FIGS. 20A, 20B. A lumen 562 extends through the conduit. In one embodiment, the conduit 560 is not linear. More specifically, the conduit 560 can be bent. In this manner, the conduit is configured to extend inwardly within the settler device 500 with a free end 564 of the conduit positioned proximate to the longitudinal axis 550 as generally illustrated in FIG. 17. Accordingly, the lumen 562 through the conduit 560 can be positioned to inject or withdraw fluid from a medial portion of the settler device 500, such as from within an interior of a cone 509. In this manner, withdrawing fluid from the settler device 500 through the conduit 560 can facilitate the flow of fluid upwardly within the settler device such that cells or particles within the fluid settle onto the cones and migrate toward the lower conical portion 503B.

Figure 21A:
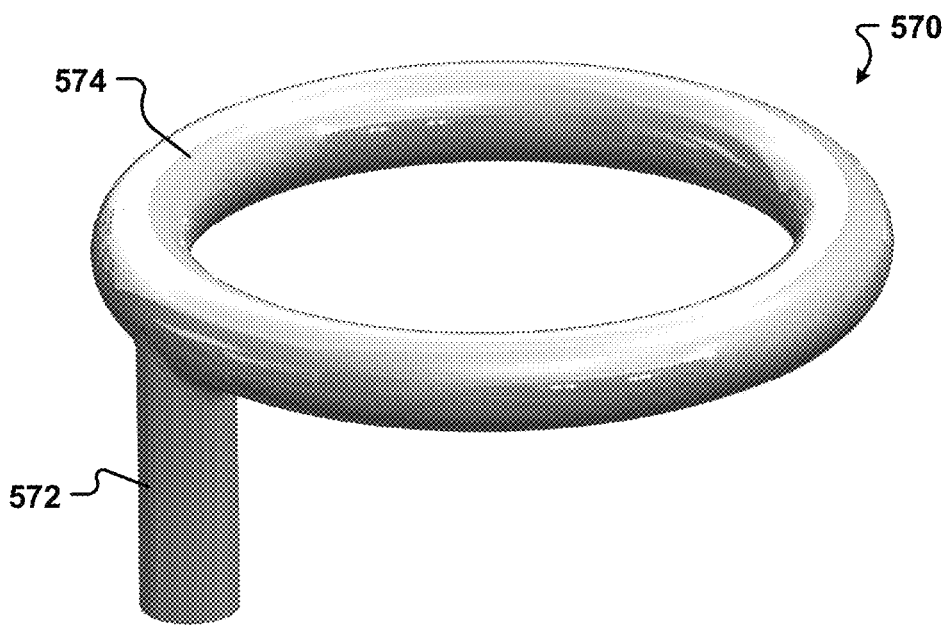
FIGS. 21A and 21B are perspective views that generally illustrate a diffuser of an embodiment of the present disclosure that is configured for use with settler devices.
Figure 21B:
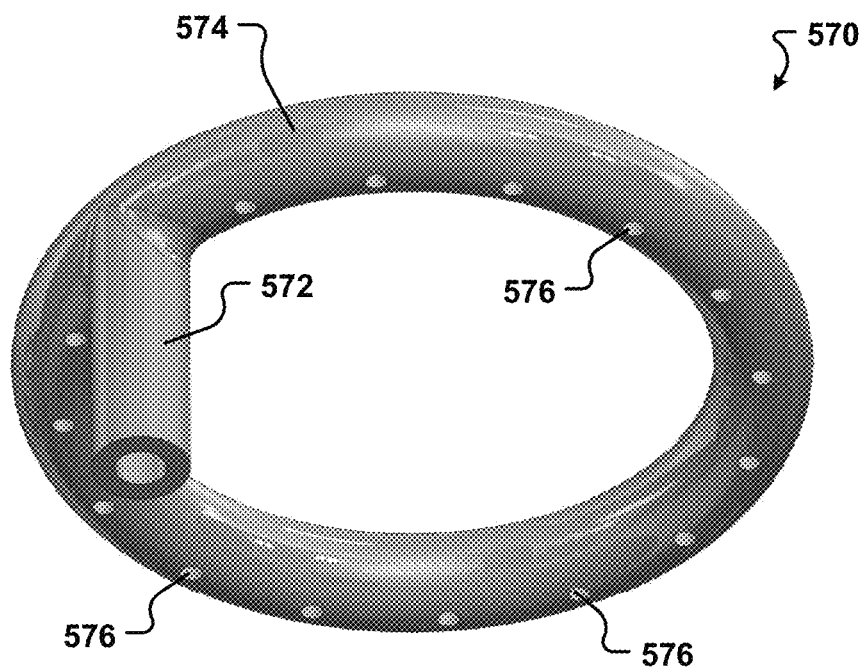

The settler device 500 can also include a diffuser 570 as generally illustrated in FIGS. 21A, 21B positioned within the hollow interior. The diffuser 570 can be associated with one of the second ports, such as the lower second port 554B. Fluid may be injected or withdrawn from the settler device 500 through the diffuser without disturbing particles or cells that have settled proximate to the lower conical portion 503B. When fluid is injected into the settler device 500 through the diffuser the fluid, which may contain cells or particles, is evenly distributed throughout the lower conical portion 503B of the settler.

Referring now to FIGS. 21A, 21B, the diffuser may comprise a torus or ring 574 extending from a stem 572. The stem 572 may be generally linear and configured to be oriented parallel to the longitudinal axis 550. The ring 574 can be configured to extend around the longitudinal axis 550 when the diffuser 570 is interconnected to the settler device 500. In one embodiment the ring 574 is adapted to be substantially concentric with the longitudinal axis.

An aperture 576 is formed through the ring 574 to facilitate transport of fluid, cells or particles through the diffuser. In one embodiment, the aperture 576 is formed on a side of the ring connected to the stem 572. In this manner, the aperture 576 can be oriented toward the lower first port 553B when the diffuser is interconnected to the lower second port 554. The aperture 576 can be configured as a single channel or groove. The groove may extend substantially continuously around the ring.

Alternatively, the ring can comprise a plurality of individual apertures 576. In one embodiment, the apertures are oriented axially to eject fluid generally parallel to the longitudinal axis. The apertures 576 may all be oriented in the same direction. Alternatively, some of the apertures can face different or opposite directions. Optionally, one or more of the apertures 576 can be oriented transverse to the longitudinal axis 550. Additionally, or alternatively, some of the apertures may be oriented radially or axially.

Referring again to FIG. 17, the cones 509 can be positioned within the settler device 500 and oriented to face one or more of the upper conical portion 503A and the lower conical portion 503B. In one embodiment, the settler device includes one stack of cones with a small end or apex 542 of the cones 509B oriented toward the lower first port 553B of the lower conical portion 503B. In this embodiment, a base or large opening 546 of the cones is oriented towards the upper first port 553A of the upper conical portion 503A. In exemplary embodiments, between three and twenty-five cones 509 are arranged in a stack within the settler device 500. In another embodiment, the stack includes from 6 to 14 cones, or 10 cones. However, the settler device 500 can be sized to receive any number of cones 509 when the settler device 500 is assembled as illustrated in FIGS. 16-17. At least a portion of the lower conical portion 503B may be empty of cones. More specifically, a lowermost cone 509 can be spaced a predetermined distance from an interior surface of the lower conical portion 503B. Accordingly, cells in culture can be retained in the settler device 500, for example, proximate to the lower first port 553B.

When the cones 509B are oriented with their apexes 542 proximate to the lower first port 553B, a body 540 of the bottom cone 509 can be supported by the diffuser 570. More specifically, as generally illustrated in FIG. 17, the bottom cone 509 may extend through the diffuser ring 574 such that the cone body 540 contacts the diffuser ring. The bottom cone can optionally be joined or welded to the diffuser ring. In this manner, the diffuser 570 is operable to position the bottom cone 509 a predetermined distance from the interior surface of the lower conical portion 503B.

Referring again to FIG. 17, optionally a flange 518 can extend from a large end of the conical portions 503 of the settler device. The flange 518 can have an interior diameter that is about equal to, but greater than, and exterior diameter of the cylindrical portion 508. In one embodiment, when the settler device is assembled, the flange 518 extends outside an exterior surface of the cylindrical portion 508 and approximately parallel to the longitudinal axis 550. The optional flange 518 is configured to interconnect an associated conical portion 503 to the cylindrical portion 508. For example, a conical portion 503 can be welded or otherwise fixed to the cylindrical portion 508 proximate to the flange 518.

Additionally, or alternatively, the flange 518 can include features adapted to align an associated conical portion 503 with the cylindrical portion 508. In an exemplary embodiment, the features comprise projections configured to engage corresponding recesses in the cylindrical portion.

The flange can be configured to retain a washer or a gasket positioned between the conical portion and the cylindrical portion. The gasket can be the same as, or similar to, gasket 338 generally illustrated in FIGS. 8A and 8B.

In one embodiment, one or more of the conical portions 503 of the settler device 500 are not linear. More specifically, the conical portions 503 can taper along an arcuate path from a maximum diameter proximate to the cylindrical portion 508 to a minimum diameter proximate to the first port 553. More specifically, and referring again to FIG. 17, a longitudinal cross-section of each of the conical portions 503 defines a line with an arcuate shape between the cylindrical portion 508 and the first port 553. In one embodiment, the conical portions 503 are concave inwardly towards a center of the settler device 500. In another embodiment, the conical portions 503 can have a constant radius of curvature. Optionally, in another embodiment, one or more of the conical portions 503 can have two or more radii of curvature. For example, a conical portion 503 may have a first radius of curvature proximate to the cylindrical portion 508 and a second radius of curvature proximate to an associated first port 553. Center points of the first and second radii of curvature are positioned within an interior of the settler device 500. Optionally, the slope of a conical portion 508 may vary between approximately 5° and approximately 85° relative to the longitudinal axis 550. In one embodiment, a conical portion 503 can include a convex portion proximate to the first port 553. The convex portion has a radius of curvature with a center point which is outside of the settler device 500.

Figure 19B:
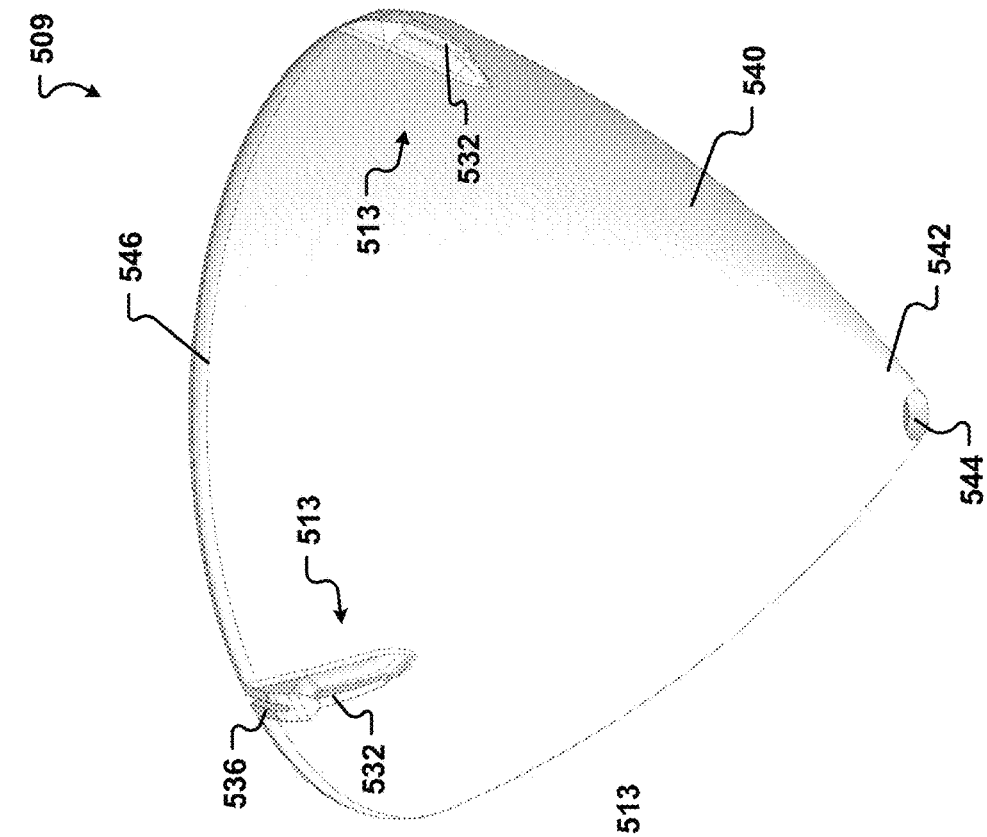
FIGS. 19A and 19B are perspective views of cones of one embodiment of the present disclosure configured for use with the settler device of FIG. 16.
Figure 19A:
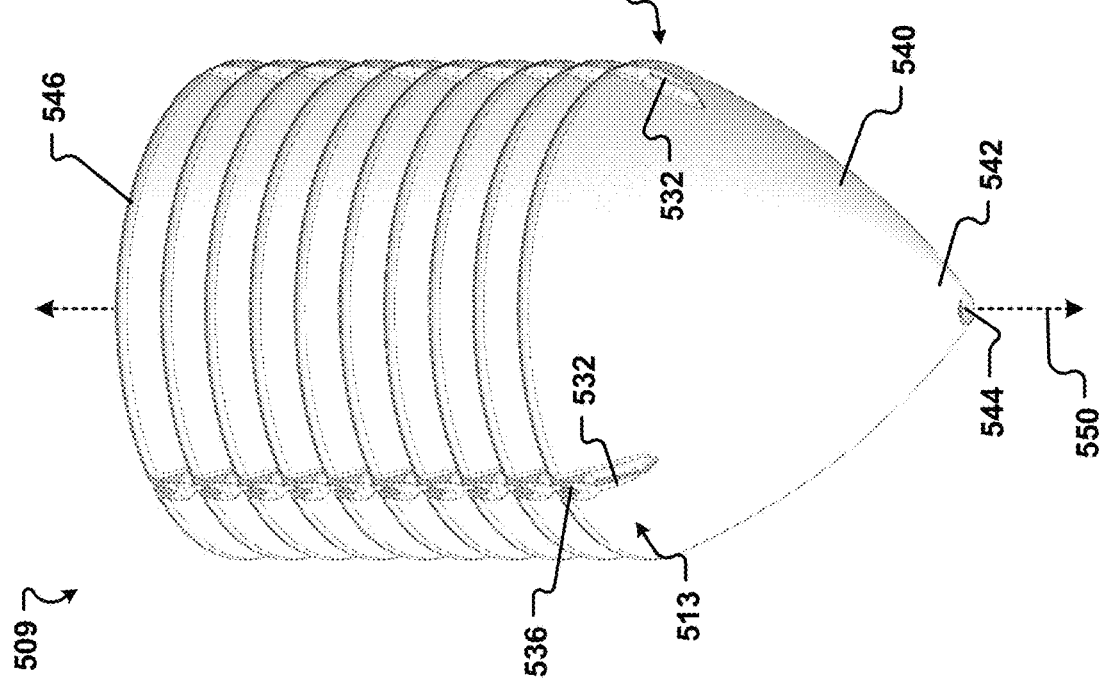

Referring now to FIGS. 19A and 19B, the cones 509 generally include a body 540 having an apex 542 with a small opening 544 and a base with a large opening 546. Optionally, each of the cones is separately formed. In exemplary embodiments, the cones are of substantially the same size and shape.

In some embodiments, the body 540 may not be linear between the small and large openings 544, 546. As generally illustrated in FIG. 17, a longitudinal cross-section of the body 540 will form a line with an arcuate shape. The arcuate shape of each cone 509 may be approximately the same as one or more of the conical portions 503 of the settler device 500.

In some embodiments, the body 540 is concave inwardly toward the longitudinal axis 550. Thus, a straight line drawn from a point at the large opening 546 to a point at the small opening 544 is within an interior of the body.

Optionally, the body 540 has a constant radius of curvature. Alternatively, the body can have two or more radii of curvature. Thus, the body may have a first radius of curvature proximate to the small opening 544 and a second radius of curvature proximate to the large opening 546. Center points of the first and second radii of curvature are positioned within an interior of cone 509. In this manner, a portion of the body 540 proximate to the small opening 544 can have a slope that is different than a slope of the body proximate to the large opening. For example, proximate to the small opening 544, the body may be aligned at an angle of at least approximately 40° relative to the longitudinal axis 550. In contrast, near the large opening 546, the body can be closer to vertical (or closer to longitudinal axis). More specifically, the body may be sloped at an angle of less than approximately 45° relative to the longitudinal axis at a point proximate to the large opening 546. Optionally, the slope of the body 540 may vary between approximately 5° and approximately 85° relative to the longitudinal axis.

As shown in FIGS. 19A, 19B each cone 509 can include projections 513 configured to contact an adjacent cone to hold each successive cone 509 in a stack of cones at substantially an equal spacing. In one embodiment, the projections 513 extend outwardly from an exterior surface of the body 540. The projections 513 are configured to contact an interior surface of a body 540 of an adjacent cone. Alternatively, the projections 513 can extend from an interior surface of the body 340. In some embodiments, the projections 513 are oriented generally parallel to the longitudinal axis 550.

The projections 513 may be sized to provide any desired spacing between adjacent cones. Optionally, the projections 513 are configured to separate adjacent cones by a distance between approximately 1 mm to approximately 2.5 cm. In exemplary embodiments, each cone 509 includes at least three projections 513.

The projections 513 can optionally be configured to fix a first cone relative to a second cone. More specifically, the projection 513 can include a flange 532 and a groove 536. The groove 536 of a first cone can receive a flange 532 of a second adjacent cone as generally illustrated in FIG. 19A.

Figure 18:
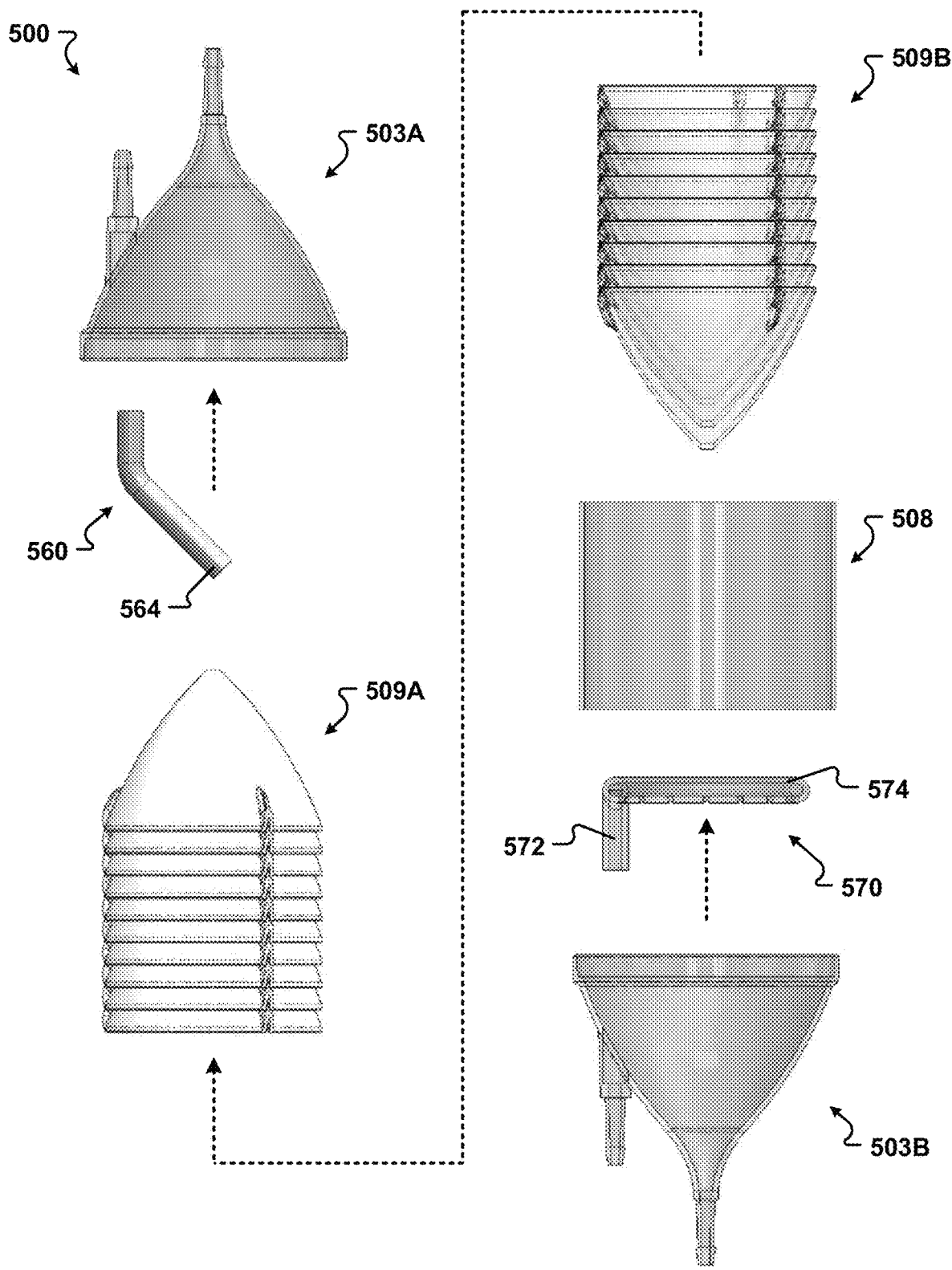
FIG. 18 an exploded front perspective view of the settler device of FIG. 16, illustrating an optional second set of cones adapted to be positioned within the settler device.

Referring now to FIG. 18, the settler device 500 can optionally include a second stack of cones 509A. Cones 509A of the second stack of cones may be the same as the cones 509B. Alternatively, the cones 509A may be of a different size or shape than the cones 509B. In one embodiment, the cones 509A of the second stack of cones may each be of a different size. For example, an uppermost one of the cones 509A can have a diameter that is greater than a lower one of cones. Similarly, a lowermost one of the cones 509A can have a diameter that is less than the other cones of the second stack of cones.

Optionally, one or more spacers (not illustrated) may project inwardly from an interior surface of the settling device 500. The spacers are configured to prevent the stack of cones 509 residing within the settler device 500 from resting against the interior surface of the conical portions 503 or the cylindrical portion 508. Optionally, the spacers can be approximately parallel to the longitudinal axis 550 of the settler device 300. The spacers may have a substantially thin cross-section to prevent or minimize interference with the movement or flow of liquid and suspended particles within the settler device 500. Although not illustrated in FIGS. 16-18, the spacers can be the same as, or similar to, the spacers 315 illustrated in FIGS. 5A, 5B, and 7 and described herein. All embodiments of settling devices 500, 600 and 800 described herein may include similar spacers.

Elements of the settler device 500, such as the conical portions 503, the cylindrical portion 508, and the cones 509, can be fabricated of a single-use, disposable plastic. Alternatively, one or more of the conical portions 503, the cylindrical portion 508, and the cones 509 can be manufactured of a metal, such as a stainless-steel alloy, or glass. Surfaces of the cones 509, and interior surfaces of the conical portions 503 and the cylindrical portion 508 can be completely or partially coated with one or more of a non-stick plastic, teflon, silicone and similar materials known to those of skill in the art. Additionally, or alternatively, the surfaces (especially when formed of stainless steel) may be electropolished to provide a smooth surface. These settler devices can be easily scaled to any desired size.

In one embodiment, the conical portions are fixedly joined to the cylindrical portion, for example, by a weld (such as a sonic weld or heat weld), an adhesive, or a glue. Optionally, one or more of the cones can by joined to an interior surface of the settler device. For example, in one embodiment, a portion of an uppermost cone 509 in the stack of cones can contact, and be fixed to, an interior surface of the upper conical portion 503A as generally illustrated in FIG. 17. In one embodiment, the cones can be joined together to form the stack of cones.

The settler device 500 can optionally include a fluid jacket (not illustrated). The fluid jacket can be associated with one or more of the conical portions 503 and the cylindrical portion 508. Water or other fluids may be directed into the fluid jacket through one or more ports to maintain the settler device 500 and its contents, including fluid therein, within a desired temperature range.

During operation of the settler device 500 of the embodiments depicted in FIGS. 16-18, serum-free or animal protein-free cell culture medium may be pumped into the settler device 300 through one or more of the first and second ports 553B, 554B of the lower conical portion 503B. The cell culture medium can be pumped continuously or periodically into the settler device 500. Specifically, the settler device 500 can operate in batch or continuous operation.

A controlled mixture of air, $O_2$, $CO_2$, and $N_2$ may also be pumped into the settler device 500 to control the pH and DO of the culture supernatant inside the settler device 500. Optionally, one or more of the second ports 554A, 554B and the lower conical portion 503B, and first port 553B, can be used for sampling bioreactor contents, for example to check cell viability, and continuous measurement of liquid pH and DO for inputs into a computer-controlled multi-gas mass flow controller.

At the end of in vitro cell expansion, the concentrated settled cells collecting at the bottom of the settler device 500 within the lower conical portion 503B can be harvested from first port 553B of the settler device 500. Clarified culture fluid containing any metabolic waste products, such as ammonia and lactate, or gasses, along with any not-yet settled smaller dead cells and cell debris, may be removed through the first port 553A of the upper conical portion 503A.

Optionally, the settler device 500 can be used as a stand-alone bioreactor/cell sorter combination. Growth media may be added to the cell settler device through one or more of the first and second ports 553, 554. Accordingly, the settler device 500 may be used without a connection to a perfusion bioreactor.

In one embodiment, sensors may be positioned within the settler device 500. Optionally, the sensors may be arranged on an interior surface of one or more of the conical portions 503 and the cylindrical portion 508. In exemplary embodiments, at least a portion of the settler device 500 may comprise a plastic. In exemplary embodiments, the entire housing may be composed of plastic. In exemplary embodiments, the plastic is transparent or at least translucent. Optionally, at least a portion of the settler device 500 is transparent or translucent. For example, a transparent or translucent material may be interconnected to an aperture in the settler device 500, similar to a window. The transparent portion may comprise glass, plastic, or any other suitable material. The transparent portion may be formed of a material which is transparent to light of a predetermined range or ranges of wavelengths.

When present, the sensors are positioned to be in contact with media within the settler device 500. The sensors may be operable to monitor one or more of pH, DO, glucose, temperature, and $CO_2$ (including dissolved or partial $CO_2$) in the settler device 500.

Optionally, one or more of the sensors may comprise a fluorescent probe operable to emit light that varies based on a condition sensed by the fluorescent probe. Fluorescent probes may be arranged in a variety of different positions within the settler device 500. More specifically, fluorescent probes can be arranged to measure different conditions, or changes of conditions, at different areas within the cell settler device. Optionally, at least one fluorescent probe is affixed to an interior surface of the lower conical portion 503B of the settler device.

Light emitted by the fluorescent probes passes through the surface of settler device (or a transparent portion of the settler device) and may be collected by a reader or meter. As described herein, the meter is operable to report or display levels of at least one of pH, DO, glucose, temperature, and $CO_2$ sensed by the fluorescent probes within the settler device 500. Optionally, light emitted by a fluorescent probe may be collected by an optional fiber cable and transmitted to the meter.

Figure 22:
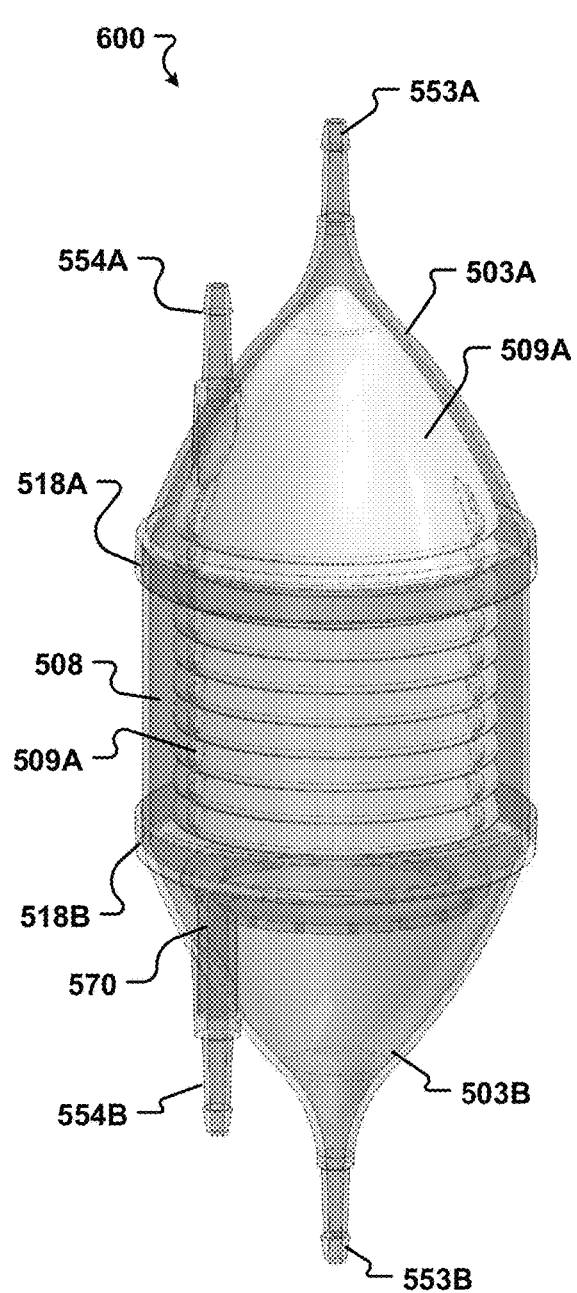
FIG. 22 is a front perspective view of another settler device of the present disclosure and illustrating some internal elements of the settler device in phantom lines.
Figure 23:
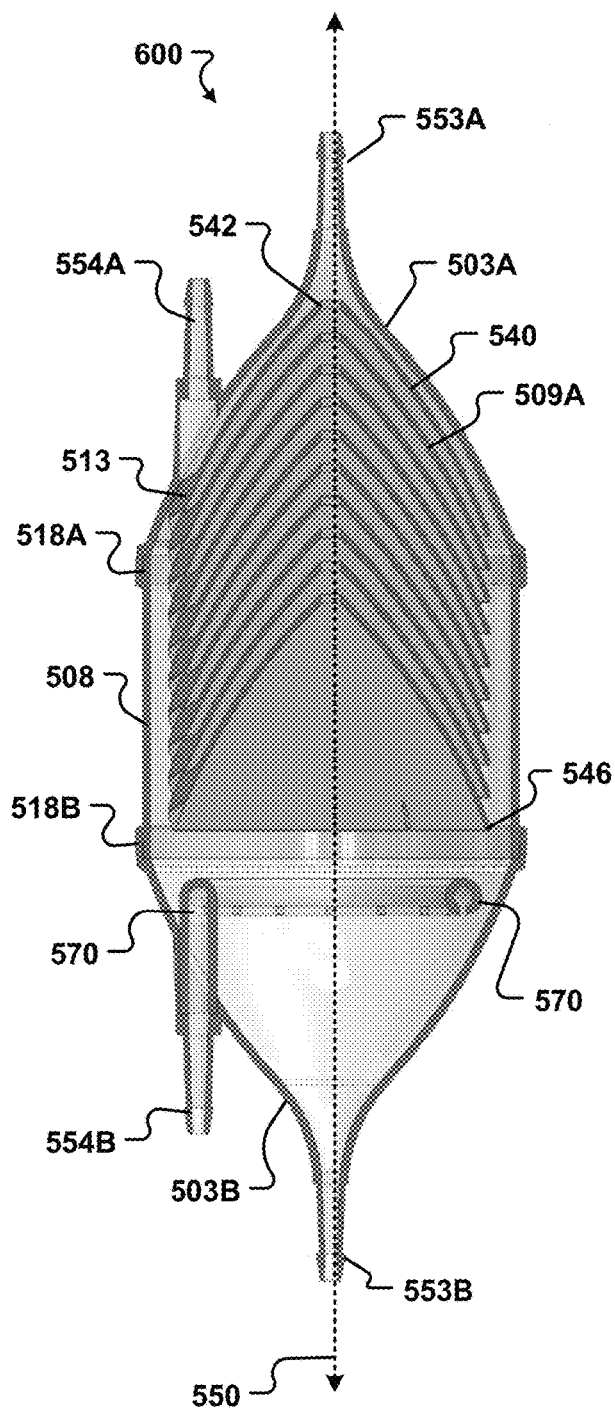
FIG. 23 is a cross-sectional front elevation view of the settler device of FIG. 22.

Referring now to FIGS. 22-23, another settler device 600 of the present disclosure is generally illustrated. The settler device 600 is similar to the settler device 500 and includes many of the same features. For example, the settler device 600 generally includes an upper conical portion 503A, a cylindrical portion 508, and a lower conical portion 503B that define a generally hollow interior. A diffuser 570 can be positioned within the hollow interior in fluid communication with a lower second port 553B.

A stack of cones 509A can be positioned within the settler device 600. Notably, the cones 509A are oriented with their apex 542 proximate to the upper conical portion 503A and a first upper port 553A.

The cones 509A may be fixed to an interior surface of the upper conical portion 503A. More specifically, in one embodiment, the cones include projections 513 as described herein. The projections 513 of an upper cone 509A can be fixed or welded to an interior surface of the upper conical portion 503A as generally illustrated in FIG. 23.

Optionally, a second stack of cones (not illustrated) can be positioned within the settler device 600. Cones of the second stack of cones can be oriented with their apexes proximate to the lower conical portion 503B. In one embodiment, the cones of the second stack of cones are the same as, or similar to, the cones 509A. Alternatively, the cones of the second stack of cones can be of a different size or shape than the cones 509A. In one embodiment, the second cones can have successively increasing diameters like the cones 409 illustrated in FIGS. 14 and 15.

In each of the embodiments of this disclosure, the angle of inclination of the surfaces of the conical surfaces of the stacked cones can be between about 30 degrees and about 60 degrees from the vertical. In certain embodiments, the angle of inclination for the surfaces of the conical surfaces or stacked cones is about 45 degrees from the vertical. In still another embodiment, the angle of inclination ranges between about 15 degrees and about 75 degrees. As described above, for the separation of stickier particles (typically mammalian cells), the angle of inclination is preferably closer to the vertical (i.e., about 30 degrees from the vertical). For less-sticky solid particles (for example, catalyst particles), the angle of inclination can be further from the vertical (preferably, about 60 degrees from vertical).

The material of construction of any of the settler devices 300, 400, 500, 600 and 800 of this disclosure, including the housing, the cones, and/or any additional components of the settler device, can be stainless steel (especially stainless steel 316), or similar materials used for applications in microbial or mammalian cell culture, as well as other metals used for applications in chemical process industries, such as catalyst separation and recycle. The stainless-steel surfaces may be partially or completely electropolished to provide smooth surfaces that cells or particles may slide down after settling out of liquid suspension. Some or all of the surfaces of the settler device of this disclosure may be coated with a non-stick plastic or silicone, such as dimethyldichlorosilane. Alternatively, or additionally, the material construction of any of these settler devices of this disclosure may be non-metals, including plastics, such as single-use disposable plastics. While metal settling devices of the disclosure can be constructed via standard plate rolling and welding of steel angular plates to the bottom of the spiral plate, a plastic settler device of this disclosure, or individual parts thereof, may be more easily fabricated continuously as a single piece using, for example, injection molding or three-dimensional printing technologies.

The thickness of the material constructing the cones placed within the housing of any of the settler devices of this disclosure is preferably as thin as necessary to maintain the rigidity of shape and to minimize the weight of the concentric stack of cones to be supported inside the housing. The radius and height of these devices can be scaled up independently as much as needed for the large-scale processes as may be calculated from predictive equations such as provided for inclined plate settlers (Batt et al. 1990, supra).

An important factor causing particle separation in the settler devices of this disclosure is the enhanced sedimentation on the inclined surfaces, which has been successfully demonstrated by Boycott (Nature, 104:532, 1920) with blood cells and on inclined rectangular surfaces as successfully demonstrated by Batt et al. (1990, supra) with hybridoma cells producing monoclonal antibodies. Additional factors enhancing the cell/particle separation are the centrifugal force on the cells/particles during their travel up the annular regions between successive cylinders and the settling due to gravity on the settling surfaces.

While lamellar plates have been used to scale up inclined plate settlers by each dimension independently, i.e. increasing the length, or the width or the number of plates stacked on top of each plate, the spiral conical settling zone can be scaled up in three dimensions simultaneously by simply increasing the horizontal radius of this device. As the horizontal radius of the device increases, the number of vertical and conical surfaces can be proportionally increased by keeping a constant distance (or channel width) between the successive spirals. The particle separation efficiency is directly proportional to the total projected horizontal area of the inclined settling surfaces. With an increase in device radius, the projected horizontal area increases proportional to the square of the radius, resulting in a three-dimensional scale up in the total projected area (i.e., proportional to the cube of radius) by simply increasing the radius.

The settler device 600 can operate in a manner similar to other settler devices of the present disclosure. For example, the settler device 600 can be used and operated as described in conjunction with the settler devices 300, 400, 500.

Methods of Use and Operation of Processes

Exemplary methods of using the settling devices of this disclosure are now described. A particle containing liquid (including, for example, cell culture liquid, waste-water or reaction fluid containing solid catalyst particles, etc.) is introduced into a settler device of this disclosure though a port. Approximately 50%-99% of the entering liquid (typically about 90%) is removed through a port at the bottom of the settler device, while the remaining 1%-50% (typically about 10%) of the liquid is removed through a port at the top of the device. A pump (such as a peristaltic pump) may be used to suck liquid out of the top port, while the concentrated liquid exiting the bottom may be allowed to exit the bottom outlet of the cyclone housing due to gravity, without the need for a pump. Alternately, the liquid containing the settled cells or particles, may be pumped out from a bottom port of the conical settler at about 50%-99% of entering liquid flow rate, and the remaining clarified liquid (1%-50%) may exit via a top port. Optionally, fluid exiting the port may be pumped out into a harvest line.

Most of the entering cells (or particles) are pushed against the walls of the settler device assembly through centrifugal forces upon entry, settle down the conical portion through a gentle vortex motion initially, getting faster as the liquid and particles/cells go down and exit via the bottom port. Cells or particles which have not settled will move up through the stacks of cones. As the liquid moves slowly up through the stacks of cones, bigger particles (e.g., live cells) will settle on the surfaces of the cones and either slide down the cones or fall down the small spacing provided between the cones and the outer walls of the cyclone housing. These settled particles fall down vertically along the outer cylindrical walls until they reach the bottom conical section of the assembly and proceed to slide down the conical section to the bottom port.

By increasing the liquid inlet flow rate through port, it is possible to reduce the residence time of liquid inside the inclined settling zones such that smaller particles (for example dead cells and cellular debris) will not have settled by the time the liquid reaches the top of the settling zone, and therefore these smaller particles exit the settling device via the top port. This feature provides a simple method to remove smaller particles (such as dead cells and cellular debris) selectively via the top port into a harvest stream, while larger particles (such as live and productive cells) are returned from the bottom port to another vessel (such as a bioreactor).

Thus, in these methods, the step of introducing a liquid suspension into these settler devices may include directing a liquid suspension from a plastic bioreactor bag into the particle settling device.

Liquid may be directed into, or drawn out of, any ports or openings in the settling device by one or more pumps (for example a peristaltic pump) in liquid communication with the port or opening. Such pumps, or other means causing the liquid to flow into or out of the settler devices, may operate continuously or intermittently. If operated intermittently, during the period when the pump is off, settling of particles or cells occurs while the surrounding fluid is still. This allows those particles or cells that have already settled to slide down the inclined conical surfaces unhindered by the upward flow of liquid. Intermittent operation has the advantage that it can improve the speed at which the cells slide downwardly, thereby improving cell viability and productivity. In a specific embodiment, a pump is used to direct a liquid suspension of cells from a bioreactor or fermentation media into the settler devices of the present disclosure.

One parameter that may be adjusted in these methods of using the settler devices of this disclosure is the liquid flow rate into and out of the settler devices. The liquid flow rate will depend entirely on the particular application of the device and the rate can be varied in order to protect the particles being settled and separated from the clarified liquid. Specifically, the flow rate may need to be adjusted to protect the viability of living cells that may be separated in the settler devices of this disclosure and returned to a cell culture, but the flow rate should also be adjusted to prevent substantial cell or particle build up in the settler devices or clogging of the conduits that transfer liquid into and out of the settler devices.

In these methods, the clarified liquid collected from the settler device may include at least one of biological molecules, organic or inorganic compounds, chemical reactants, and chemical reaction products. The clarified liquid collected from the settler device may include at least one of hydrocarbons, polypeptides, proteins, alcohols, fatty acids, hormones, carbohydrates, antibodies, isoprenoids, biodiesel, and beer. In examples of these methods, the clarified liquid collected from the settler device includes at least one of insulin or its analogs, monoclonal antibodies, growth factors, sub-unit vaccines, viruses, virus-like particles, colony stimulating factors and erythropoietin (EPO).

Each publication or patent cited herein is incorporated herein by reference in its entirety. The settling devices of the present disclosure now being generally described will be more readily understood by reference to the following examples, which are included merely for the purposes of illustration of certain aspects of the embodiments of the present disclosure. The examples are not intended to limit the disclosure, as one of skill in the art would recognize from the above teachings and the following examples that other techniques and methods can satisfy the claims and can be employed without departing from the scope of the present disclosure.

EXAMPLES

Example 1

Yeast or Other Microbial Cells Secreting Protein Products

Recombinant microbial cells, such as yeast or fungal (*Pichia pastoris, Saccharomyces cerevisiae, Kluyveromyces lactis, Aspergillus niger*, etc.) or bacterial (*Escherichia coli, Bacillus subtilis*, etc.) cells, which have been engineered to secrete heterologous proteins (for example, insulin or brazzein) or naturally secreting enzymes (e.g. *A. niger, B. subtilis*, etc.) can be grown in bioreactors attached to the compact settler devices of this disclosure, to recycle live and productive cells back to the bioreactor, which will thereby achieve high cell densities and high productivities. Fresh nutrient media is continuously supplied to the live and productive cells inside the high cell density bioreactors and the secreted proteins or enzymes are continuously harvested in the clarified outlet from the top port (or top-side outlets 353A, 354A, 553A, 554A), while the concentrated live and productive cells are returned back to the bioreactor. As dead cells and a small fraction of live cells are continuously removed from the bioreactor via the harvest outlet, cell growth and protein production can be maintained indefinitely, without any real need for terminating the bioreactor operation. In operations using yeast *Pichia* cells with the conical settler devices of this disclosure, the perfusion bioreactor has been operated for over a month. As the microbial cells grow in suspension culture and the cell retention device can be scaled up to any desired size, a settler of this disclosure can be attached to suspension bioreactors of sizes varying from lab scale (<1 liter) to industrial scale (>50,000 liters) or any size therebetween to achieve high cell density perfusion cultures.

In one specific example, a perfusion bioreactor culture of yeast *Pichia pastoris* cells is described. Yeast *Pichia pastoris* cells were grown in a 5-liter, computer-controlled bioreactor, initially in batch mode to grow the cells from the inoculum for the first 50 hours, then in fed-batch mode to fill up the attached 12-liter cell settler slowly for the next 100 hours, and then in continuous perfusion mode with a compact cell settler of this disclosure to remove the smaller dead cells and recycle the larger live cells back into the bioreactor. A typical schematic of the attachment of a compact cell/particle settler of this disclosure to any modular bioreactor is depicted in FIG. 24.

Figure 24:
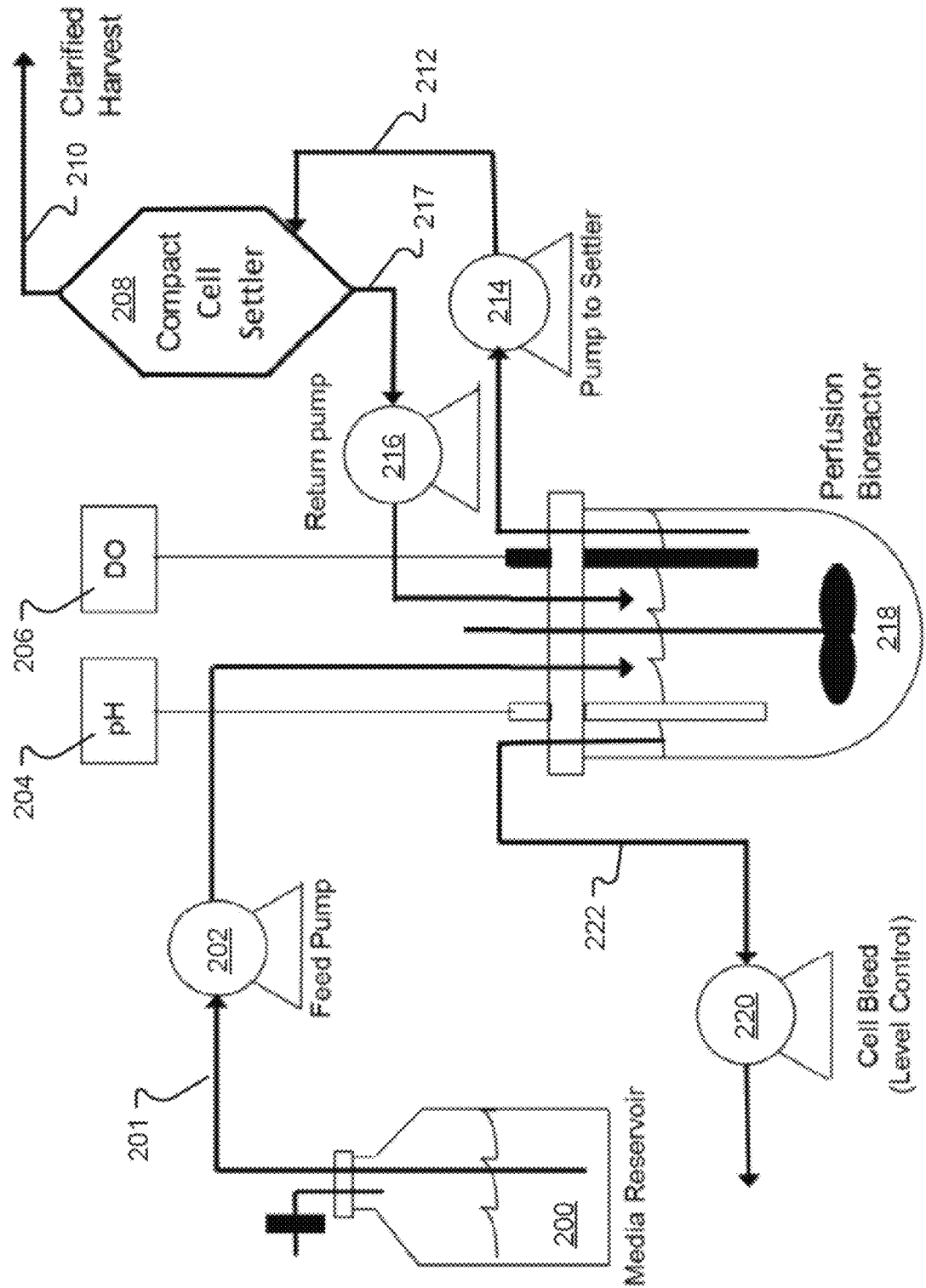
FIG. 24 is a schematic representation of the attachment of a compact cell/particle settler device of this disclosure to a modular bioreactor.

Referring to FIG. 24, the yeast *Pichia pastoris* cells were grown in a perfusion bioreactor (218). Growth media was added to the bioreactor (218) from media reservoir (200) via a first pump (202) interconnected to input line (201). Dissolved oxygen content and pH were continuously monitored in the bioreactor (218) by dissolved oxygen monitor (206) and pH monitor (204). Yeast cell culture from the bioreactor (218) was delivered to a 12-liter compact cell settler (208) of the present disclosure via a second pump (214) interconnect to line (212). Effluent from the compact cell settler (208), which contained smaller dead cells, was evacuated by effluent line (210). Larger live cells were recycled from the cell settler (208) back to the bioreactor (218) via third pump (216) and return line (217). Media and cell culture levels in the bioreactor (218) were controlled by removing excess cell culture via fourth pump (220) and removal line (222) to be captured or discarded.

Figure 25:
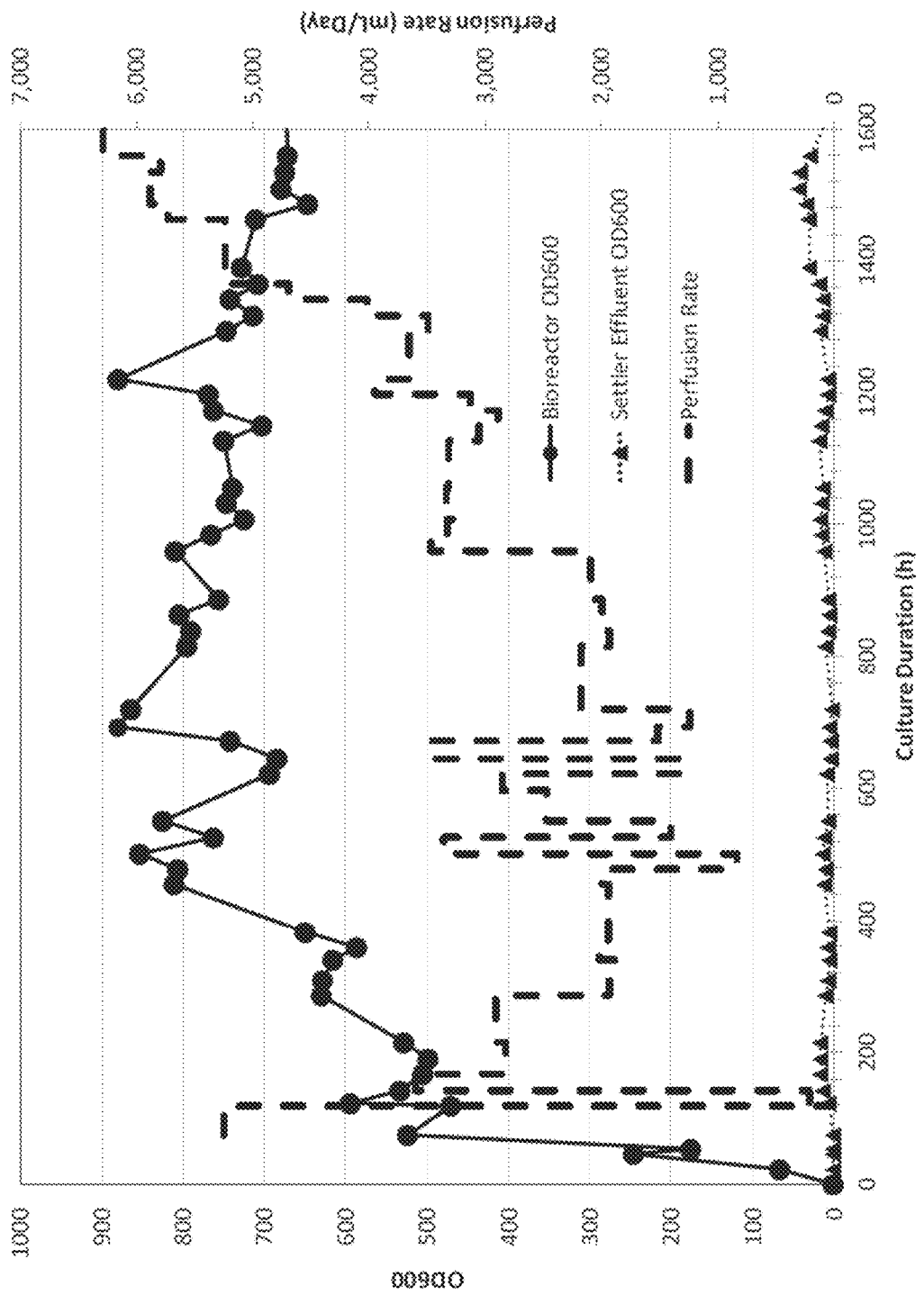
FIG. 25 is a graph which shows results of perfusion bioreactor culture of yeast *P. pastoris* cells, with a fully packed compact cell settler as the cell retention device and set up as depicted in FIG. 24.

Results obtained with this perfusion bioreactor set up with a compact cell/particle settler of this disclosure are shown in FIG. 25. The circles show the optical density of bioreactor samples, measured at 600 nm, building up during the initial batch and fed-batch culture period of about 150 hours, followed by continuous perfusion operation up to 1600 hours or longer than 2 months. The settler effluent or harvest rate is adjusted by manipulating either settler inlet pump setting and/or settler recycle pump setting. The cell concentration (as measured by OD at 600 nm) and the size distribution are determined by the harvest flow rate and cell size distribution of the cells entering from the bioreactor and other factors such as the recycle ratio from the settler. The effluent stream contains very little cells, as measured by the very low OD's in the range from 0 to 30, even as the perfusion rate is gradually increased from 2000 ml/day to over 6,000 ml/day. These results demonstrate that very high cell density was obtained and maintained in the bioreactor due to the recycle of most of the live cells back to the bioreactor and selective removal of smaller dead cells and cell debris. Even at these increasing perfusion rates, the bioreactor can be operated indefinitely at high cell density without any reason to terminate the bioreactor, such as clogged membranes in competing membrane-based cell retention devices.

Figure 26:
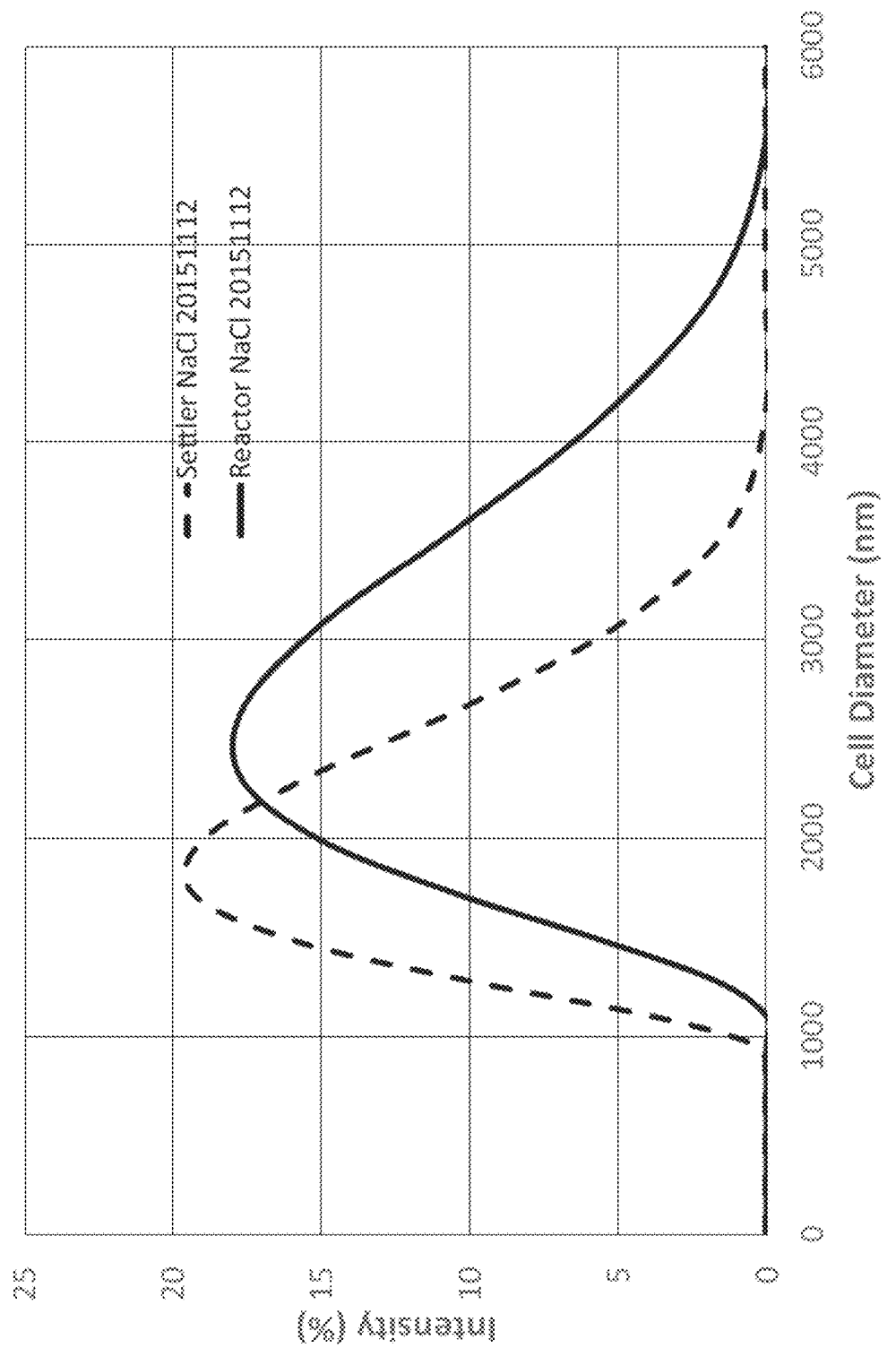
FIG. 26 shows particle size analysis of samples taken from the bioreactor and settler effluent from the apparatus set up as depicted in FIG. 24.

Samples from the bioreactor and settler effluent taken at the same time point were analyzed with a particle size analyzer. The normalized cell size distribution results shown in FIG. 26 clearly indicate that the settler effluent contains a significantly smaller cell size distribution compared to that found for the cells in the bioreactor. These results demonstrate that the settler removed the smaller dead cells and any cell debris preferentially in the effluent, while the larger live cells are preferentially returned to the bioreactor. Thus, the bioreactor is continuously cleaned by selective removal of dead cells and cell debris by the settler effluent and consequently there is no accumulation of dead cells and cell debris within the bioreactor, as happens routinely with all other cell retention devices.

The bioreactor and settler effluent samples from an early time point during the perfusion culture were collected and centrifuged in small 2 ml vials. Cells pelleted from effluent from the settler device (208) and cells pelleted from within the bioreactor (218) showed that he pelleted cells from the bioreactor occupy almost 50% of the wet packed cell volume in the vial, while the pelleted cells in the settler effluent occupy only about 5% of the wet packed cell volume. These results again confirm that only a very small fraction of the intact smaller cells from the bioreactor are removed in settler effluent while most of the larger intact cells are preferentially returned to the bioreactor.

Total protein concentrations in the bioreactor and settler effluent during this 2-month long perfusion operation were measured and showed that after the initial batch and fed-batch operation, i.e., during the prolonged perfusion operation, total protein content in the effluent sample from the settler device (208) is consistently greater than the total protein content in the sample from the bioreactor (218). These results suggest very strongly that there is no protein sieving inside the settler (208), as is commonly observed with membrane-based cell retention devices such as ATF in perfusion cultures of mammalian cells. Further, these results suggest that there is some additional protein production in the settler (208), causing the effluent protein concentrations to be consistently higher than those in the bioreactor (218) at the same time.

The total accumulated protein in the harvest stream from the continuous perfusion bioreactor configuration illustrated in FIG. 24 can be compared with protein can be harvested in the cell-free supernatant of a single fed-batch bioreactor (218) performed over 158 hours or almost 6 days, and repeated again and again over the same culture duration of say 1600 hours. While fed-batch cultures typically have a long downtime to harvest or empty the bioreactor, clean the internal surfaces, sterilize in situ with steam, cool, refill the bioreactor with sterile medium, inoculate the bioreactor with fresh cells and then allow the cells to grow to high enough cell density to see significant increase in the protein titer, the continuous perfusion bioreactor continues to operate uninterrupted at high cell density and high production rate throughout the culture operation. Consequently, the total accumulated protein in the continuously harvested product stream is increasing, at a significantly faster rate as the perfusion rate is increased, and accumulates to 160 g, 5× higher protein amount than can be harvested in the cell-free supernatants from 8 repeated fed-batch culture operations in the same 5-liter bioreactor.

Example 2

Removing Yeast Cells from Beer

In large-scale brewing operations, yeast cells are removed from the product beer by filtration devices, which regularly get clogged, or centrifugation devices, which are expensive high-speed mechanical devices. Previously, hydrocyclones were unsuccessfully tested for this application (Yuan et al., 1996; Cilliers and Harrison, 1997). These devices can be readily replaced by the settler devices of this disclosure to clarify beer from the top outlets and remove the concentrated yeast cell suspension from the bottom outlet. Due to the increased residence time and enhanced sedimentation in the conical settler zones of this disclosure, the inventor has achieved successful separation of yeast cells from cell culture liquid, harvesting the culture supernatant containing only about 5% of the cells entering the settler device in its first operation. As the device can be scaled up or down to increase or decrease its cell separation efficiency, it is feasible to obtain completely cell-free beer from the harvest port, if desired. Thus, the devices of this disclosure may be particularly useful in brewing beer, as well as clarifying beer, and in continuous brewing arrangements.

Example 3

Clarifying or Removing Cells from Mammalian Cell Culture Broth

Similar to example 2 above, clarification of mammalian cells from cell culture broth at the end of a fed-batch bioreactor culture is a necessary first step in the harvest of the secreted product, such as antibodies or therapeutic glycoproteins, to be followed by a series of other downstream processing operations. Currently, centrifugation and depth filtration are used as the common unit operations to remove mammalian cells and cell debris from the cell culture broth. However, periodic removal of accumulated cells from the continuous centrifugation process results in repeated cloudburst of cells into the clarified cell culture supernatant. The settler devices of the present disclosure produce a continuously clarified (cell-free or significantly depleted in cells) supernatant as the mammalian cells are easily settled inside the device. These compact settler devices offer a more consistent removal of cells from the cell culture broth, potentially replacing the need for any centrifugation and reducing the amount of membrane area needed in a secondary depth filter operation to completely eliminate any remaining cells and all cell debris. The clarification can be in batch operations or in continuous operations in perfusion bioreactors as described below.

Example 4

Mammalian Cell Perfusion Cultures

Enhanced sedimentation of murine hybridoma and recombinant mammalian cells in inclined settlers have already been demonstrated successfully (Batt et al., 1990 and Searles et al., 1994) and scaled up in lamellar settlers (Thompson and Wilson, U.S. Pat. No. 5,817,505). While the lamellar settlers are scaled up in three dimensions independently, a conical settler device of this disclosure can be scaled up in three dimensions simultaneously by simply increasing its radius, as discussed above. Thus, the settlers of this disclosure are more compact, contain much more inclined surfaces for settling on a smaller footprint, and are more easily scalable cell retention devices with proven applications in mammalian cell cultures secreting glycoproteins, such as monoclonal antibodies, and other therapeutic proteins. The clarified harvest output from the top port containing the secreted protein is harvested continuously from the cell retention device, while the concentrated cells from the bottom outlet are recycled back to the bioreactor, resulting in a high cell density perfusion bioreactor, that can be operated indefinitely, (i.e., over several months of continuous perfusion operation). The continuous high titer harvest from a single, 1000-liter, high cell density perfusion bioreactor can be more than the accumulated production from a large (>20,000 liter) fed-batch bioreactor on an annual basis.

Recombinant Chinese hamster ovary cells, which are used commonly in the overexpression and secretion of therapeutic glycoproteins, are cultured in a 1-liter controlled bioreactor attached with a 4" compact cell settler as shown schematically in FIG. 24. Viable cell densities in the bioreactor, settler top effluent, and settler bottom return to the bioreactor were measured. Soon after the perfusion operation starts at 60 hours, very few live cells are removed from the settler top effluent and increasing amounts of viable cells are being returned to the bioreactor from the settler bottom outlet. Consequently, the bioreactor viable cell density (VCD) is increasing gradually after the perfusion operation begins and more dramatically the viability percentage (diamonds) in the bioreactor increases when the perfusion begins.

Cell size distributions were measured on samples from the bioreactor and settler top effluent on day 5 and a histogram of cell/particle sizes measured by a Beckman-Coulter Multisize Analyzer for the bioreactor sample shows a broad distribution of live cells and possibly doublets in sizes ranging from about 10 microns to about 30 microns with a peak of about 16 microns, a sharp peak of dead cells in sizes between 8 and 9 microns and huge tail of cell debris in the smaller size range smaller than 8 microns. Another histogram of cell/particle sized measured by the same instrument on the sample from the top port effluent of the compact cell settler (208), showed an enhanced peak of dead cells in size between 8 and 9 microns, a tail of cell debris in the sizes smaller than 8 microns and dramatically a total absence of any peak for live cells about 16 microns. These size measurements strongly demonstrate that settler top effluent removes selectively the smaller dead cells and cell debris from the perfusion bioreactor (218), while the larger live cells are continuously returned to the perfusion bioreactor (218). This selective removal of smaller dead cells and cell debris has been demonstrated (Batt et al. 1990 and Searles et al. 1994) with inclined plate settlers. The present disclosure of compact cell settlers again reproduced those successive results in a more compact and more easily scalable design. None of the other cell retention devices available today for mammalian cells exhibit any such selectivity in removing only the smaller dead cells and cell debris.

Example 5

Vaccines, Viruses or Virus-Like Particles or Gene Therapy Vector Production Production of vaccines, such as viruses or virus-like particles (VLPs), or gene therapy vectors, such as adeno-associated viruses (AAV), lenti-viruses, etc. is usually carried out by infection and lysis of live mammalian or insect cells in a batch or fed-batch bioreactor culture. Viruses or virus-like particles are released from the infected cell in a lytic process after large intracellular production of these viruses or virus-like particles. With the large difference in the size (sub-micron or nanometer scale) of these particles compared to the size (about 5-20 microns) of live mammalian and insect cells, the separation of the viruses or virus-like particles from the batch or fed-batch bioreactor culture is very simple. By controlling the continuous harvest or outlet rate of clarified cell culture broth containing mostly viruses or VLPs, along with cell debris, it is also possible to retain a smaller number of the infective particles inside the bioreactor along with the growing live cells to continually infect and produce vaccines in a continuous perfusion bioreactor attached to a settler device of this disclosure for continuous harvest of viruses and VLPs.

Example 6

Solid Catalyst Particle Separation and Recycle

Separation of a solid catalyst particle for recycle into the reactor and reuse in further catalyzing liquid phase chemical reactions, such as Fischer-Tropsch synthesis, has been demonstrated before with lamellar settlers (U.S. Pat. No. 6,720,358, 2001). Many such two-phase chemical reactions, involving solid catalyst particles in liquid or gas phase reactions can be enhanced by the particle settling devices of this disclosure, which presents a more compact particle separation device to accomplish the same solids separation and recycle as demonstrated with lamellar settlers.

Example 7

Plant and Algal Cell Harvesting

Recombinant plant cell cultures secreting valuable products, while not yet commercially viable, are yet another field of potential applications for the settling devices of this disclosure. Inclined settlers have been used in several plant cell culture applications. Such devices can be replaced by the more compact conical spiral settler devices of this disclosure. With the size of plant cells being higher than those of yeast or mammalian cells, the cell separation efficiency will be higher with single plant cells or plant tissue cultures.

A more immediate commercial application of the settler devices of this disclosure may be in the harvesting of algal cells from large scale cultivation ponds to harvest biodiesel products from inside algal cells. Relatively dilute algal cell mass in large (acre sized) shallow ponds converting solar energy into intracellular fat or fatty acid storage can be harvested easily through the conical spiral settler device of this disclosure, and the concentrated algal cells can be harvested from the bottom outlet.

Example 8

Municipal Waste-Water Treatment

Large scale municipal waste-water treatment plants (using activated sludge or consortia of multiple bacterial species for degradation of biological and organic waste in sewage or waste-water) commonly use large settling tanks and more modern versions of these plants use lamellar settlers to remove the clarified water from the sludge. The conical spiral settler devices of this disclosure can be scaled up to the larger sizes required in these plants, while remaining smaller in size than the large settling tanks or lamellar settlers currently used in these treatment plants.

Example 9

Industrial Process Water Clarification

Large scale water treatment plants, cleaning either industrial waste-water or natural sources of turbid water containing suspended solids, use large scale settling tanks or lamellar inclined settlers. These large-scale devices can now be replaced with the more compact conical spiral settler devices of this disclosure to accomplish the same goal of clarifying water for industrial reuse or municipal supply of fresh water.

Example 10

Capture and Purification of Monoclonal Antibodies on Protein a Coated Beads Cell culture supernatants containing monoclonal antibodies can be contacted with protein A coated microspheres or beads (40-200 microns) inside our settler via two different inlets, e.g., beads coming in from a top inlet and the cell culture supernatant coming in via the bottom port to maximize their contacting and capture efficiency. Capture of monoclonal antibodies on protein A beads is very quick, typically under 10 min. of residence time inside the competing affinity chromatography columns. The protein A-coated microspheric beads will settle down fast and can be kept in suspension and well mixed to contact with the cell culture supernatant by pumping it in from the bottom inlet. The depleted cell culture supernatants can be removed continuously from the top outlet of cell settlers of the present disclosure in a batch loading operation. Any beads entrained with upward-flowing liquid will settle on the inclined surfaces and return to the bottom stirred region. After loading close to the maximum binding capacity of the add beads, beads can be washed with the typical washing solution of about 3-5× volume of the settler to remove unbound host cell protein along with dead cell debris which are present in the supernatant via the top outlet.

After completing thorough washing, elution media will be pumped in slowly to remove the bound antibodies into the liquid medium and concentrated antibody solution is removed via the top port, while retaining the beads inside the settler. After elution is completed, equilibration of the beads is conducted by pumping in the equilibration solution from the bottom inlet, while the beads are held in suspension by this incoming solution. After equilibration, next batch of cell culture supernatant is loaded into the settler to repeat the above four-step process, similar to the sequence used in a chromatography column. Some advantages of using the cell settler devices of the present disclosure for monoclonal antibody capture are that: (i) cell culture supernatant can be directly loaded to contact with the protein A beads, without the need for removing dead cells or cell debris commonly present in the supernatant; and (ii) more efficient immediate contacting of all the suspended beads with in the incoming supernatant, rather than the gradual or delayed exposure of monoclonal antibodies to the fixed bed of beads in the later parts of the column. Elimination of currently required unit operations of centrifugation and/or depth filtration to remove dead cells and cell debris will result in significant cost savings, when the affinity column chromatography is replaced with affinity capture of antibodies by protein A beads suspended inside settler devices of embodiments of the present disclosure.

This affinity capture of secreted antibody product by the protein A coated beads, followed by washing, elution and regeneration steps can be carried out in a sequence of batch operations in a single settler or continuously in a sequence of settlers. In operation, the protein A beads will flow from one settler to the next settler in a truly counter-current or cross-flow operation with the cell culture broth or different buffers in each settler of embodiments of the present disclosure.

Example 11

Decanter/Cell Settler for In Situ Extraction of Secreted Organic Products from Cells Production and secretion of several fragrance and flavor compounds are being metabolically engineered into microbial yeast cells, such as *Saccharomyces cerevisiae*. Some of these compounds may be more toxic to the cells and can be extracted readily into an organic liquid to reduce the cellular toxicity as well as to increase the productivity of the yeast cells. Emulsions of organic liquid containing the secreted product and aqueous layer containing the productive microbial cells from the stirred tank bioreactor can be pumped into the inlet port of a compact cell settler device of this disclosure. Inside the quiet zones of the settler, the emulsion is separated easily into the organic layer floating on top and harvested via the top port and aqueous layer containing the live and productive cells settling to the bottom and recycled to the bioreactor via bottom port. Any cellular debris will fractionate into the organic layer and easily removed from the top of settler. Live and productive cells in the aqueous layers are returned to the bioreactor to increase the cell densities and productivity inside the perfusion bioreactor.

Example 12

In Vitro Expansion of Various Mammalian Cells, in a Compact Cell Settler Used as a Stand-Alone Perfusion Bioreactor Currently, the field of in vitro expansion of various mammalian cells such as stem cells and CAR-T cells is expanding rapidly with sterile single-use disposable culture bags as the bioreactors placed on rocking platform for mixing or inside a $CO_2$ incubator for pH control. Such bag bioreactors are increasingly operated in continuous perfusion mode to remove the accumulated waste metabolic by-products, such as ammonia and lactate, using microfiltration membranes as cell retention devices on the bag to maintain high cell viability during the expansion. However, during the prolonged perfusion operation, dead cells and cell debris accumulate in these bags and cannot be removed through the microfiltration membranes on the bag. The cell settler devices of this disclosure can be operated effectively as a stand-alone, air-lift bioreactors, operated in a continuous perfusion to bring in fresh nutrient and remove metabolic waste products, as well as to remove selectively any dead cells and cell debris. The bottom port can be used as an inlet for controlled mixture of multiple gases $CO_2$, $O_2$ and $N_2$ to maintain the desired pH and DO in the bioreactor. The rising air through the central portion entrains or carries up some cell culture liquid, provides a gentle mixing of the nutrients in the bioreactor, and exits at the top outlet, while the liquid is disengaged in the cylindrical portion of settler and is recycled over the conical settlers. The returning cell culture liquid can be sampled for continuous measurements of pH, DO, for inputs into computer controlling the inlet gas mixture and occasional sampling for cell density and viability as desired. After the desired cell expansion, concentrated live cells are collected via the bottom port by switching the gas flow to a cell collection bag. The major advantage of our cell settler/bioreactor is that it provides for a facile removal of dead cells and cell debris along with toxic metabolic waste by-products, resulting in a high cell density of live cells after in vitro expansion for autologous cell therapy.

Example 13

Continuous Separation of Precipitated and Concentrated Therapeutic Proteins

Several therapeutic proteins (e.g., insulin analog glargine and monoclonal antibodies) can be precipitated by adding simple salts (e.g., zinc chloride for glargine, or ammonium sulfate for antibodies), adjusting pH, and other solvents (e.g., m-cresol or other phenolics for glargine and ethanol for antibodies). This precipitation is a low-cost alternative to chromatography in the downstream purification processes for these therapeutic proteins. Currently, these precipitation steps are carried out in the batch mode, followed by centrifugation or decantation to remove the supernatant from the precipitant.

Using the separation devices of the present disclosure, a continuous separation process may be implemented. The protein rich harvest medium (after removing any cells by micro filtration or centrifugation or other methods) is input into a compact cell settler of this disclosure, along with other required chemicals, such as solvents, or salts in a pH-modifying solution, such as NaOH or HCl. The precipitation process will occur inside the settler and the protein-rich precipitant can be continuously removed in the bottom outlet, away from the protein-depleted supernatant, which is removed continuously from the top outlet.

Example 14

Ex Vivo Expansion of Mesenchymal Stromal/Stem Cells (MSCs) on Microcarrier Beads and Purification of Expanded Stem Cells MSCs are capable of ex vivo expansion in the presence of suitable growth medium and are commonly grown attached to surfaces, such as tissue culture flasks, petri dishes, roller bottles, cell cubes, and microcarrier beads. Attached growth on microcarrier beads (size ranging from 100 microns to 500 microns) is very easily scalable as they are suspended in stirred or agitated bioreactors, controlled for optimal growth conditions such as pH, temperature, dissolved oxygen concentration and nutrient concentrations. However, separation of expanded stem cells from the microcarriers is a challenge, requiring enzymatic detachment, washing off excess enzyme quickly, and separating the stem cells from microcarrier beads. These different steps are currently attempted using labor-intensive and contamination-prone batch processing steps. Each of these difficult steps can be accomplished more easily in the bioreactor/cell settler devices of this disclosure which may include sensor probes positioned within the cyclone housing. In one embodiment, the sensor probes comprise fluorescent probes to measure one or more of pH, dissolved oxygen (DO), glucose concentrations, temperature, and $CO_2$ levels within the cyclone housing. More specifically, within these settler devices: (i) the excess enzyme is very easily washed or removed via the top port by feeding in fresh nutrient medium via the bottom port while the slower-setting detached cells and fast-settling, freshly denuded microcarrier beads are held in circulation inside the settler, (ii) bare microcarrier beads (100-500 microns) will settle much faster than the stem cells (10-20 microns) and can be removed from the bottom port while the stem cells are circulated in suspension, and (iii) finally the expanded stem cells can be harvested via the bottom port at the desired concentration for subsequent cell therapy applications.

Example 15

Co-Culture of Stromal Cells on Microcarrier Beads to Secrete the Necessary Growth Factors to Support the In Vitro Expansion or Growth of Other Differentiated Cells, Such as Tlymphocytes or Cardiomyocytes Growth and differentiation of pluripotent stem cells into cardiomyocytes or activated lymphocytes (CAR-T cells) require expensive growth factors to be supplemented to the growth bioreactor. This cost can be reduced by co-culturing the desired cells with engineered mesenchymal stem cells (MSCs) that secrete the desired growth factors into the growth medium. These growth factor secreting cells support the growth of other desired cells, such as CAR-T cells, cardiomyoctyes, etc. This co-culture can be affected inside the bioreactor/cell sorter combination devices of this disclosure, and the cost of production or expansion of such cells is significantly reduced. The expanded cells can be easily removed from the co-culture by feeding in fresh medium at a required flow rate to remove the expanded single cells or cell aggregates, while keeping larger, microcarrier beads inside the bioreactor/cell settler.

Example 16

Fractionation or Sorting of any Mixed-Cell Population, Such as from Bone Marrow, into Several Distinct Sub-Populations with Desirable or Undesirable Characteristics After loading any of the bioreactor/cell settler devices of the present disclosure with some initial bolus of a mixed cell population (such as bone marrow cells), we can feed in fresh nutrient medium at slow, step-wise increasing flow rates, such that the smallest cells (e.g. platelets, red blood cells, etc.) leave via top effluent stream at the lowest flow rates, followed by bigger cell types (lymphocytes, mononuclear cells, etc.) at increasingly higher flow rates, and then by the biggest cell types (such as macrophages, megakaryocytes, etc.) at the highest flow rates. By increasing the nutrient feed and the top effluent flow rates at slowly-increasing step-wise flow rates, relatively pure populations of a single desired cell type are obtained leaving the bioreactor/cell sorter device in a healthy cell culture growth medium so they can be propagated further for subsequent use.

Example 17

In Vitro Production of Universal Red Blood Cells

Novel genetic engineering methods are under development for directed differentiation of hematopoietic stem cells into erythroid cell lineage. Proerythroblast cells, the earliest committed stage in erhthropoiesis, are rather large (12-20 microns), up to three times larger than a normal erythrocyte. Polychromatophilic normoblasts, the subsequent stage in erythroid lineage, is smaller (12-15 microns) than the pro-erythroblast cells. Orthochromatophilic normoblast cells, the nucleated erythroid precursor cells, are still smaller (8-12 microns), followed by the still smaller mature enucleated red blood cells. (Geiler, C., et al., International Journal of Stem Cells, 9:53-59). Based on size fractionation capabilities of the bioreactor/cell sorter devices of this disclosure, all the larger precursor cells are retained, and only the smallest mature enucleated red blood cells are removed from the top effluent of the device, while all the larger precursor cells are continually expanding inside the bioreactor/cell sorter device.

Example 18

Large-Scale Platelet Production

Ex vivo expansion of high-ploidy megakaryocytic cells in controlled bioreactor culture conditions and their shearing off into smaller platelet cells is increasingly understood at a fundamental level (Panuganti, S., et al., Tissue Engineering Part A, 19:998-1014). As this understanding develops further, these necessary culture parameters can be obtained and controlled inside these bioreactor/cell sorter devices for growth and differentiation of megakaryocytic cells, while harvesting only the mature, sheared off smaller platelets via the top outlet from the settler.

Referring now to FIGS. 27A-27C another settler device 300A of the present disclosure is generally illustrated. The settler device 300A is similar to other settler devices described herein and includes many of the same or similar features. More specifically, the settler device 300A is similar to the settler device 300 described in conjunction with FIGS. 1-9.

Notably, the settler device 300A includes an aspirator 360 with a free end 364 positioned within a housing 301 of the settler device. The aspirator 360 is shown with a second end 366 extending out of the housing 301.

The aspirator 360 can extend through one of the ports 353, 354 of the housing 301. In one embodiment, the aspirator 360 extends through the upper peripheral port 354A of an upper portion 303A of the housing. However, the aspirator can extend through the lower second port 354B or either of the first ports 353A, 353B.

The aspirator 360 is configured to add or withdraw fluid from the housing. A lumen 362 extends through the aspirator 360.

The position of the free end 364 of the aspirator 360 can be adjusted by advancing or withdrawing the aspirator relative to the housing. In one embodiment, the free end 364 can be adjusted to be proximate to an upper surface of the fluid within the housing. In this manner, the aspirator can withdraw clarified liquid that has accumulated near the upper surface of the fluid. As fluid is added to the settler device, the free end 364 can be adjusted upwardly. For example, in the embodiment illustrated in FIGS. 27A-27C, the aspirator 360 can be partially withdrawn from the housing to move the free end 364 higher within the housing. Alternatively, the aspirator 360 can be advanced to move the free end 364 lower in the housing.

Optionally, the free end 364 can be positioned within the cylindrical portion 308 of the housing. In one embodiment, the free end 364 is arranged proximate to a large opening 346 of a cone 309 within the housing.

Referring now to FIGS. 28A-28C, still another embodiment of a settler device 300B is generally illustrated. The settler device is similar to other embodiments of the settler devices described herein, including the settler devices of FIGS. 1-9 and 27.

The settler device 300B includes a flange 318 of another embodiment of the present disclosure. The flange 318 is configured to join a top portion 303A to a bottom portion 303B of the housing 301.

The flange generally comprises a top flange 318A extending from the top portion 303A of the housing and a bottom flange 318B extending from the bottom portion 303B of the housing. In one embodiment, the flanges 318A, 318B comprise a ring extending outwardly from each of the top and bottom portions 303. The flanges may be approximately perpendicular to the cylindrical portion 308 of the housing 301.

The flanges 318A, 318B are configured to be joined together. Optionally, the flanges can be joined without a mechanical fastener, such as a bolt or screw. In one embodiment, the flanges 318A, 318B can be welded or glued together. For example, in one embodiment, the flanges 318A, 318B are heat welded or sonically welded together.

As will be appreciated by one of skill in the art, any suitable means of joining the flanges 318A, 318B together can be used with the settler device.

FIGS. 28B and 28C also illustrate that a stack of cones 309 can be positioned in different orientations within the housing 301. FIG. 28B generally illustrates a stack of cones 309A with their small openings 344 facing upwardly toward the upper portion 303A and their large openings 346 facing downwardly toward the lower portion 303B. Alternatively, the cones 309B can be oriented with the large openings 346 facing the upper portion 303A as generally shown in FIG. 28C.

Arranging the cones in the housing with the large openings 346 facing downwardly as described with FIG. 28B is beneficial because particles settling out of the fluid within the housing will flow outwardly toward the exterior of the housing 301. The particles will then flow downwardly between an interior surface of the housing and an outer edge of the large opening 346 of the cones. In some embodiments, the housing 301 is transparent or translucent. Accordingly, the particles can be observed flowing downwardly between the housing and the outer edge of the large openings 346. In this manner, an observer or a sensor can assess the operation of the settler device and judge the effectiveness of a settling operation.

Referring now to FIGS. 29A-29E, still another settler device 600A of the present disclosure is generally illustrated. The settler device 600A generally includes a housing 601 with an upper portion 603A, a lower portion 603B, and a cylindrical portion 608.

The housing is illustrated as being transparent for clarity. In one embodiment, the housing comprises a plastic. Alternatively, the housing 601 may be formed of a metal. The housing 601 may be formed of a translucent or a transparent material.

The upper portion 603A is generally planar or flat. However, in another embodiment, the upper portion 603A may have a conical shape such as generally described with the settler device 300.

The lower portion 603B is conical similar to the lower portions 403 of settling devices 400 of the present disclosure. In one embodiment, the exterior surface of the lower portion 603B is generally concave. Optionally, the lower portion 603B has at least two different radii of curvature. Accordingly, a vertical cross section of the lower portion 603B has an arcuate path.

Cones 609 are positioned within the housing 601. The cones 609 are similar to cones 309, 509 of other embodiments described herein. For example, the cones 609 generally include a small opening 644 opposite to a large opening 646. The cones are stacked within the housing with the openings 644, 646 approximately concentrically aligned with the longitudinal axis 650 of the housing.

The cones 609 have an exterior surface that is generally concave. Accordingly, an interior surface (or a settling surface) of a cone slopes at an angle that varies between the small opening 644 and the large opening 646. The angle of inclination for the settling surfaces of the cones 609 can vary, ranging between about 15 degrees to about 75 degrees from the vertical (or relative to the longitudinal axis 650). In one embodiment, when positioned in a housing, the inner surface proximate to the large opening 646 is oriented closer to a horizontal axis than the inner surface proximate to the small opening 644 which is oriented closer to a vertical axis aligned with the longitudinal axis 650.

In one embodiment, the cones 609 are positioned with the large opening 646 facing the upper portion 603A and the small opening 644 facing the lower portion 603B. Alternatively, the cones can be positioned in the housing with the small opening 644 facing the upper portion 603A.

The settler device 600A includes an aspirator 660 of another embodiment of the present disclosure. The aspirator 660 generally includes a free end 664 positioned within the housing and a second end 666 extending from the housing. The second end 666 extends from a port of the upper portion 603A. In one embodiment, the second end 666 extends from one of a plurality of second ports 654A of the upper end or portion 603A of the housing.

Similar to the aspirators 360 and 560 described herein, the aspirator 660 is adapted to add fluid to or withdraw fluid from the housing. In one embodiment, the aspirator 660 is used to extract a clarified liquid from the housing 601.

Figure 29A:
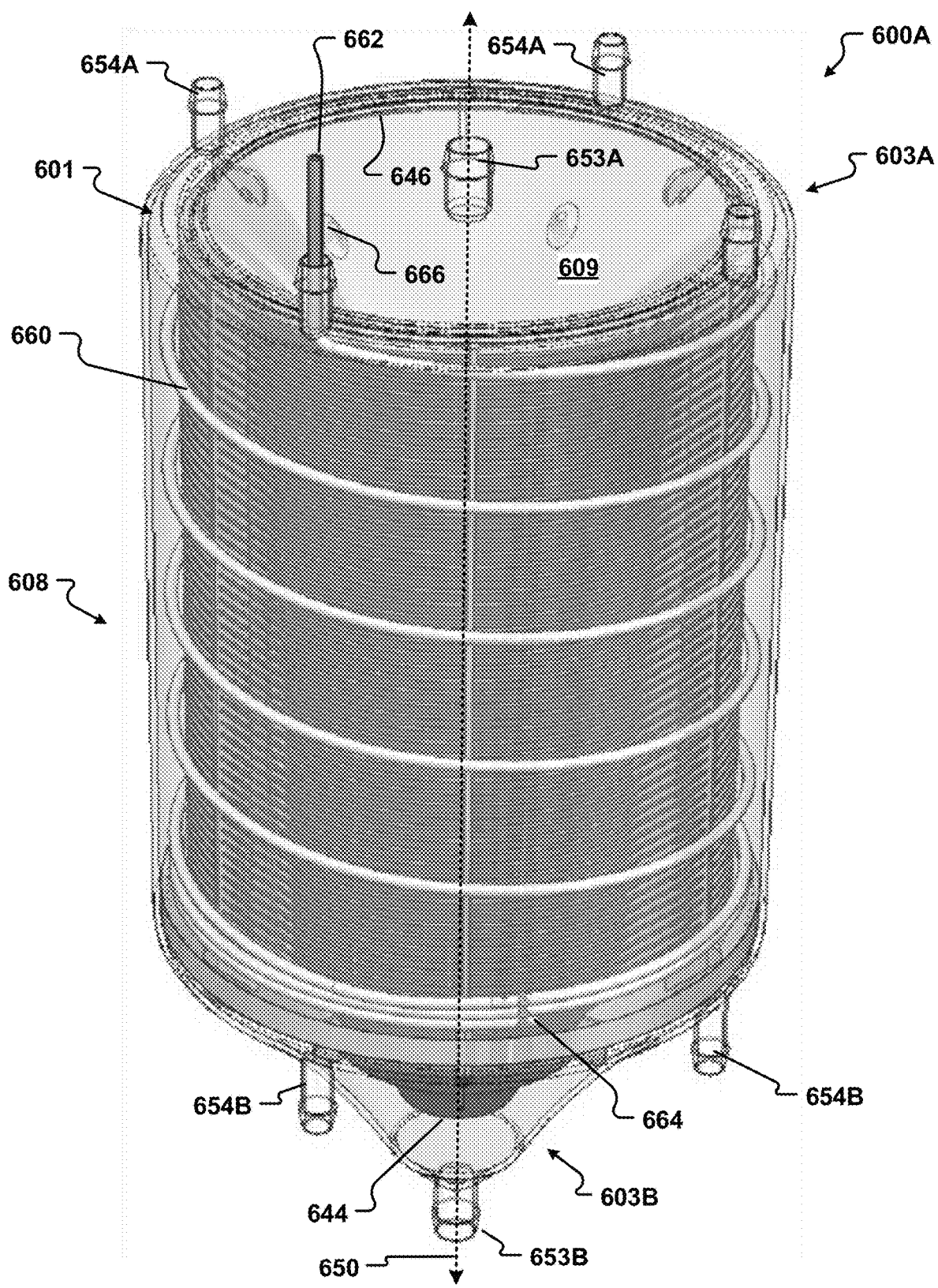
FIG. 29A is a perspective view of another embodiment of a settler device of the present disclosure with a housing shown in transparent lines and which includes a coiled aspirator interconnected to a port extending through an upper portion of the settler device.
Figure 29E:
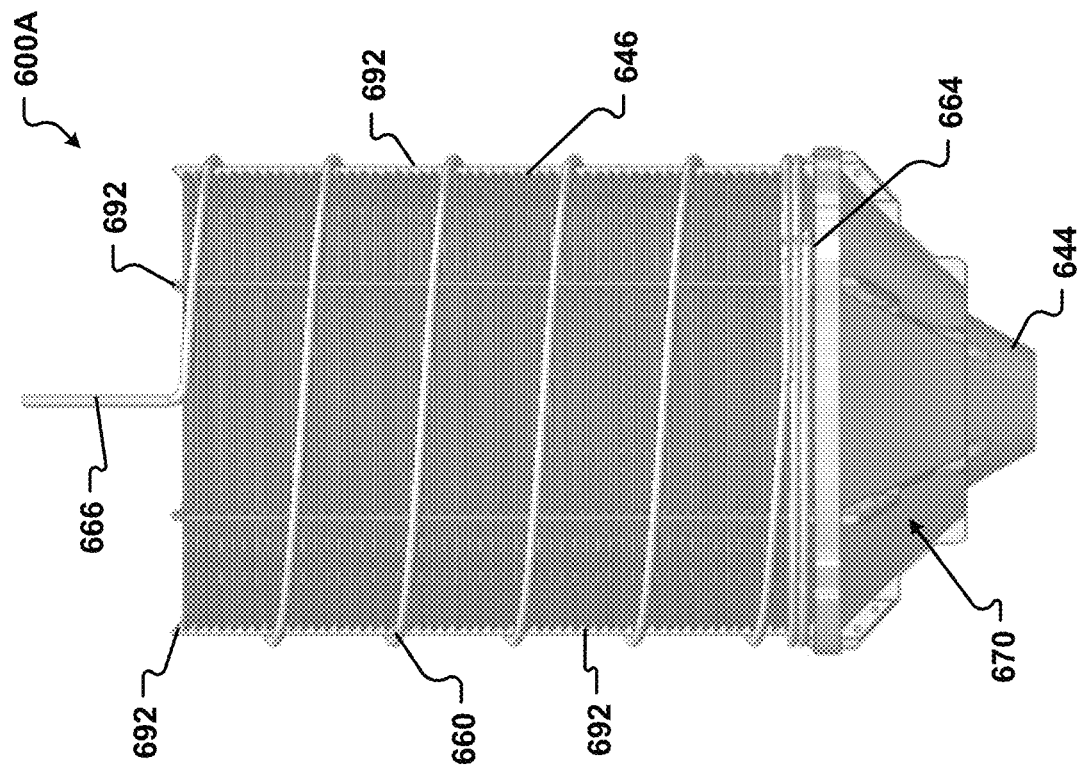
FIGS. 29D-29E are front elevation views of the settler device of FIGS. 29B-29C with the housing removed for clarity.
Figure 29D:
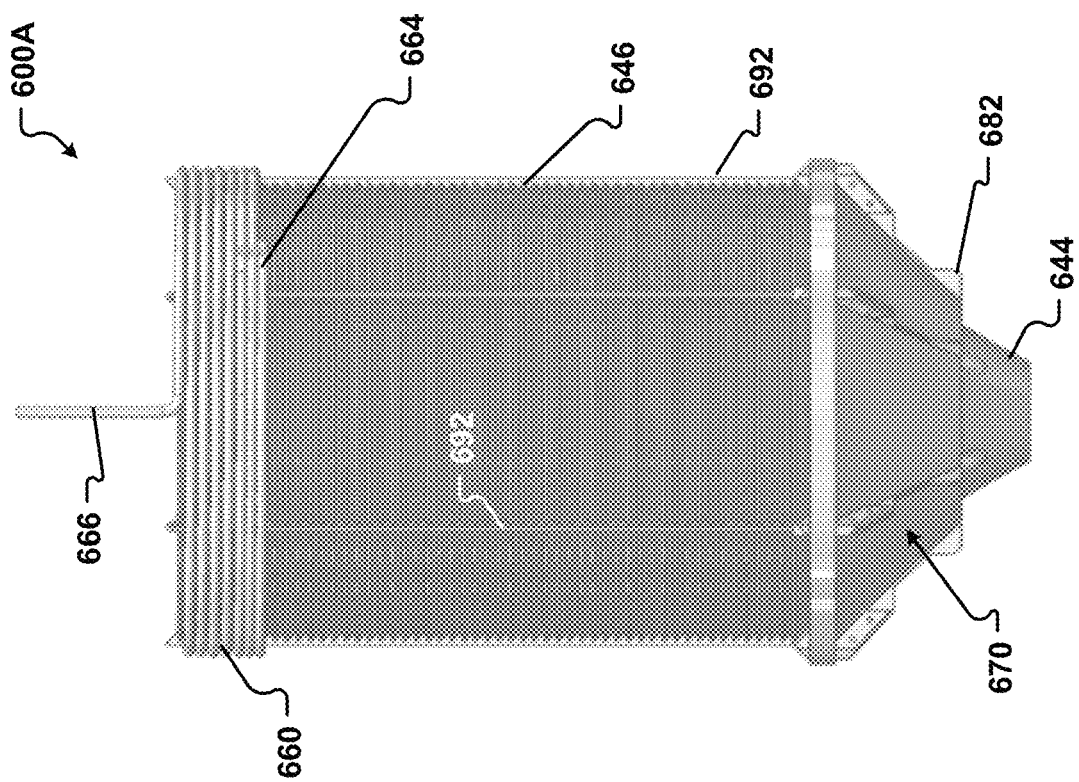
Figure 30A:
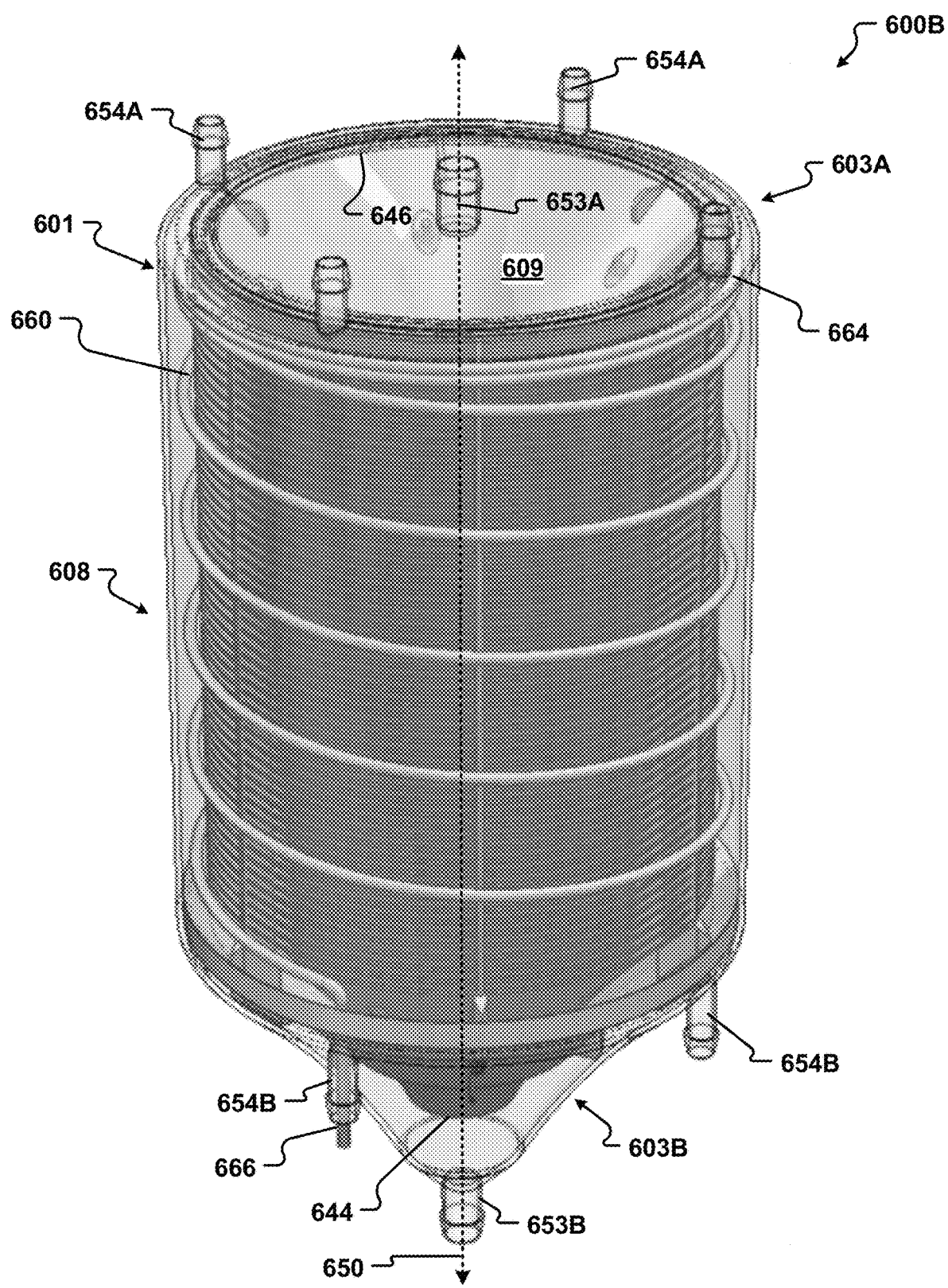
FIG. 30A is a perspective view of another embodiment of a settler device of the present disclosure which is similar to the settler device of FIG. 29A, the settler device including a housing shown in transparent lines and with a coiled aspirator of another embodiment that is interconnected to a port extending through a lower portion of the settler device.
Figure 30E:
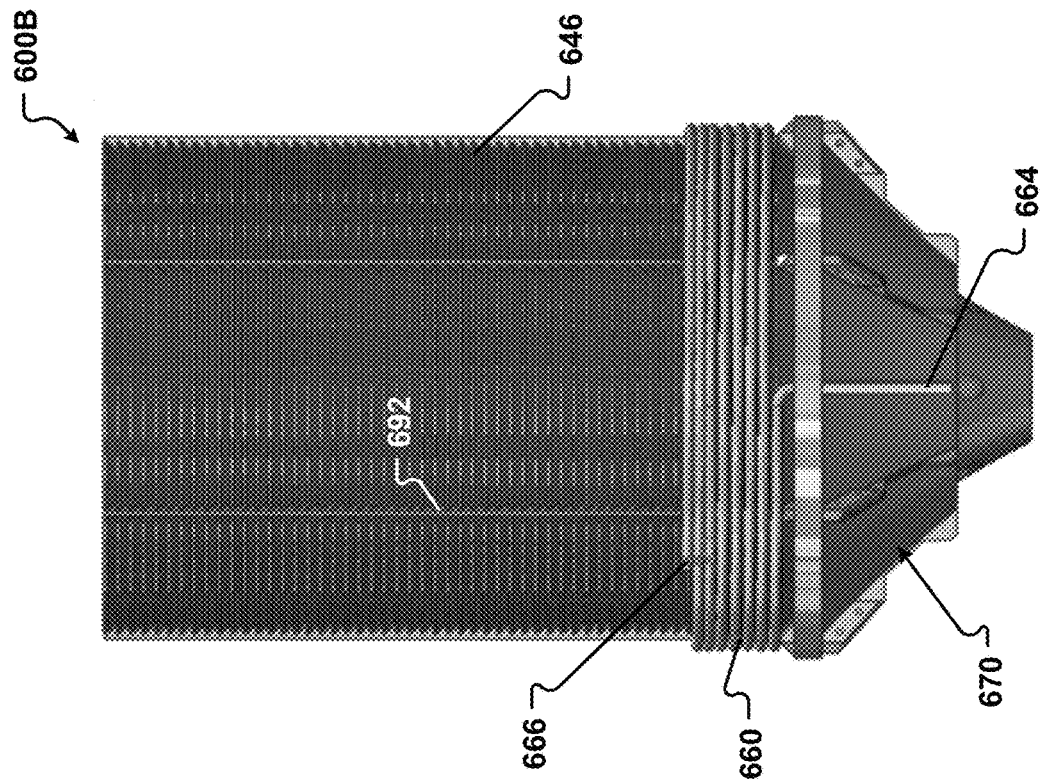
FIGS. 30D-30E are front elevation views of the settler device of FIGS. 30B-30C with the housing removed for clarity.
Figure 30D:
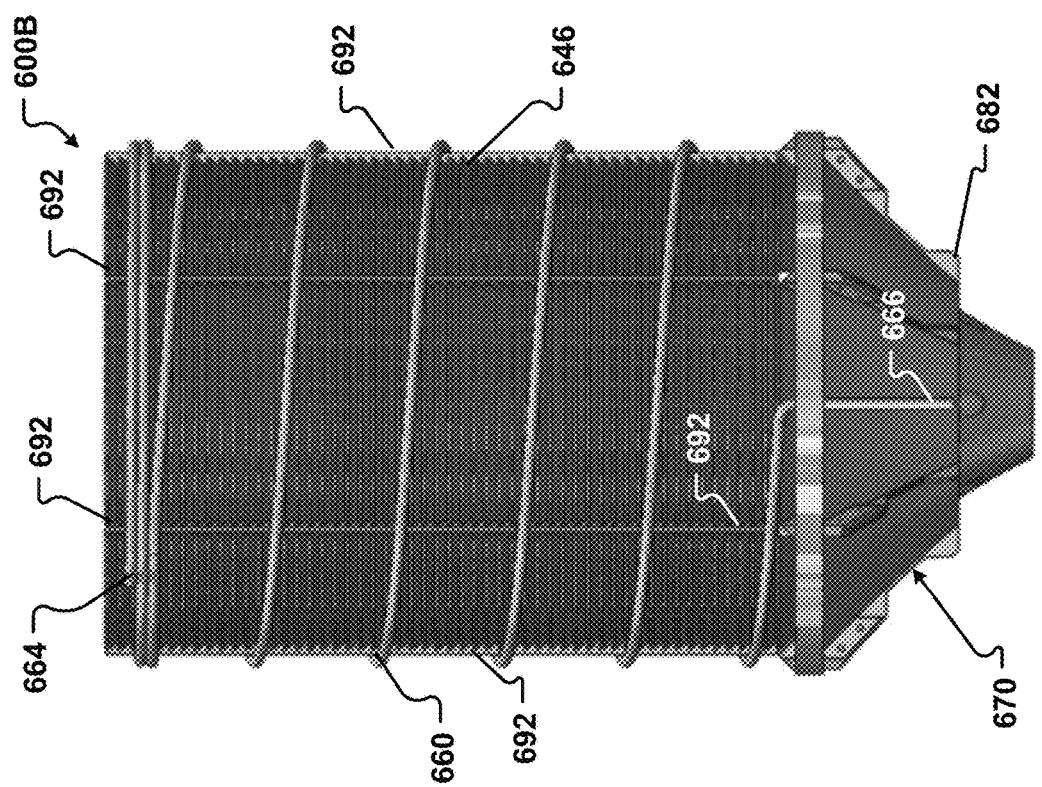

The aspirator 660 spirals or coils around the cones 609 within the housing 601. The coils of the aspirator 660 occupy an annular space 652 (illustrated in FIGS. 29B, 29C) between an outer cone portion proximate to the large openings 646 of the cones 609 and an interior surface of the housing 601. The aspirator 660 is formed of a flexibly material. In one embodiment, the aspirator 660 is formed of a material that is lighter than fluids used in the settler device. Accordingly, the free end 664 of the aspirator 660 optionally floats near an upper surface of the fluid. When the housing 601 is relatively full of fluid, the free end 664 will be proximate to the upper housing portion 603A as generally illustrated in FIGS. 29B, 29D. As the amount of fluid in the housing decreases, the free end 664 can move downwardly. As generally illustrated in FIGS. 29C, 29E, the free end 664 can descend within the housing 301 to be proximate to the lower housing portion 603B.

Optionally, a line can be connected to aspirator 660 at one or more locations. The line is used to adjust the position of the free end 664 within the housing. For example, a first line connected to the aspirator 660 is configured to raise the free end 664 toward the upper portion 603A of the housing. A second line connected to the aspirator 660 is configured to lower the free end 664 toward the lower portion 603B of the housing. In this manner, the free end 664 can be adjusted to withdraw fluid from a desired level within the housing.

The settler device 600A also includes a diffuser or distributor 670 of one embodiment of the present disclosure. The distributor 670 is similar to the diffuser 570 described herein. More specifically, the distributor 670 is configured distribute gases or liquids added to the housing around the interior of the housing 601.

The distributor 670 has a body with a large upper opening and a small lower opening. The distributor body is generally conical with truncated upper and lower ends forming the upper opening and the lower opening. The distributor is configured to support a lowermost cone in the stack of cones.

As generally shown in FIGS. 29B, 29C, the distributor is positioned within the housing in contact with the lower housing portion 603B. Optionally, the distributor 670 includes a protrusion 682 that extends from a lower surface. The protrusion is configured to separate the distributor 670 from an interior surface of the lower housing portion by a predetermined distance.

Referring now to FIGS. 30A-30E, yet another settler device 600B of the present disclosure is generally illustrated, The settler device 600B is similar to the settler device 600A and includes many of the same or similar features. Notably, the second end 666 of the aspirator 660 extends through a port through the lower housing portion 603B. In one embodiment, the second end 666 extends through one of a plurality of the lower second ports 654B. The free end 664 of the aspirator can rise or fall with the level of the fluid of the aspirator similar to the aspirator described in conjunction with settler device 600A.

Referring now to FIGS. 31A-31D, cones 609 of one embodiment of the present disclosure are generally illustrated. The cones 609 are similar to the cones 309, 509 of other embodiments described herein. For example, the cones 609 generally include a small opening 644 opposite to a large opening 646. The cones are configured to be stacked within the housing with the openings 644, 646 approximately concentrically aligned with a longitudinal axis 650 of the housing.

The cones 609 have an exterior surface that is generally concave. Accordingly, an interior surface (or a settling surface) of a cone is generally convex. In one embodiment, the interior settling surface slopes at an angle that varies between the small opening 644 and the large opening 646. The angle of inclination for the settling surfaces of the cones 609 can vary, ranging between about 15 degrees to about 75 degrees from the vertical (or relative to the longitudinal axis 650).

In one embodiment, the cones 609 are positioned in a settler housing 601 with the large opening 646 facing the upper portion 603A and the small opening 644 facing the lower portion 603B. Alternatively, the cones can be positioned in the housing with the small opening facing the upper portion 603A.

Notably, in one embodiment, the cones 609 include a slot 648. The slot 648 extends through the cone from the exterior surface to the interior surface. In one embodiment, the slot extends to a large outer edge of the cone 609 defined by the large opening 646. The slot 648 is oriented approximately parallel to a longitudinal axis 650. The slot is configured to engage a support rail 692 described herein.

Each cone 609 includes at least two slots positioned around the circumference of the large opening 646. In one embodiment, the cones include six slots 648.

The cones 609 also include projections 613 according to an embodiment of the present disclosure. The projections 613 are similar to other projections 313, 413, 513 described herein. The projections 613 generally extend from the interior settling surface upwardly. The projections are formed around the longitudinal axis 650.

Figure 31A:
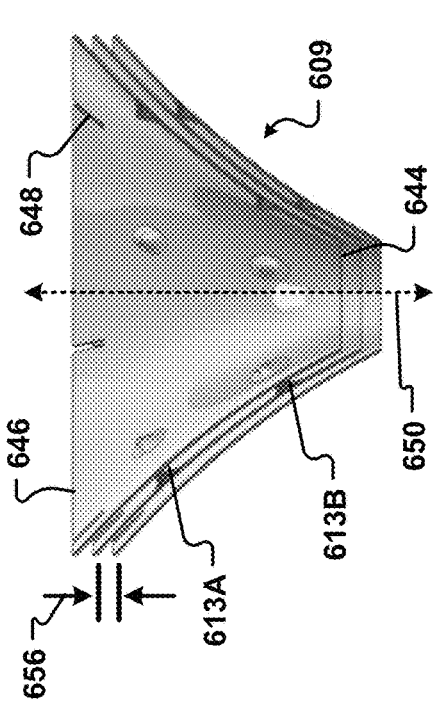
FIGS. 31A-31D illustrate cones of embodiments of the present disclosure configured for use with the settler devices of the present disclosure.
Figure 31B:
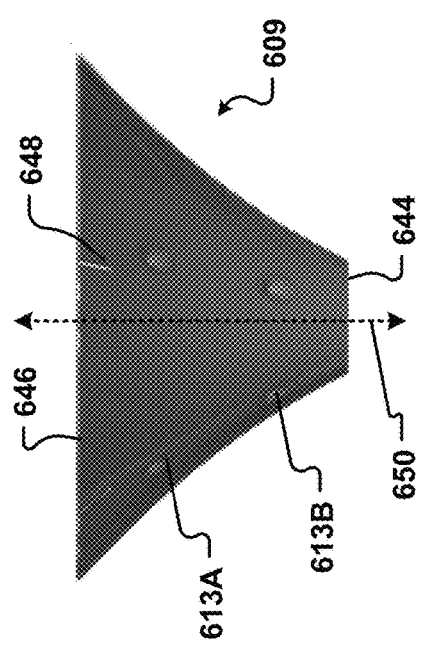
Figure 31C:
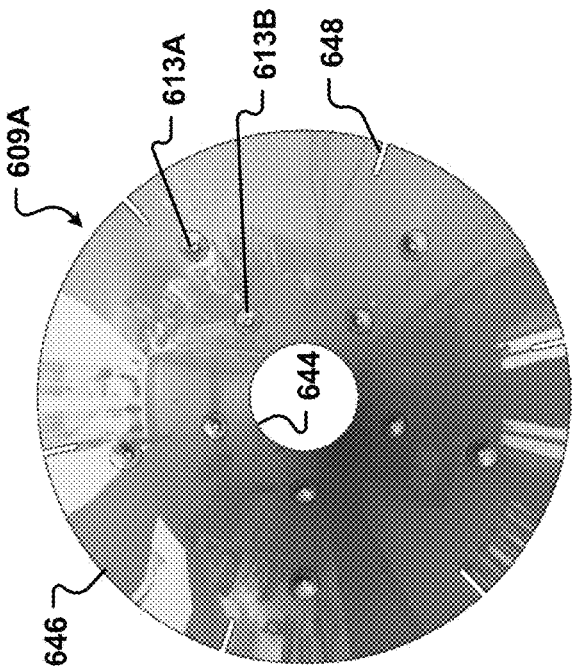
Figure 31D:
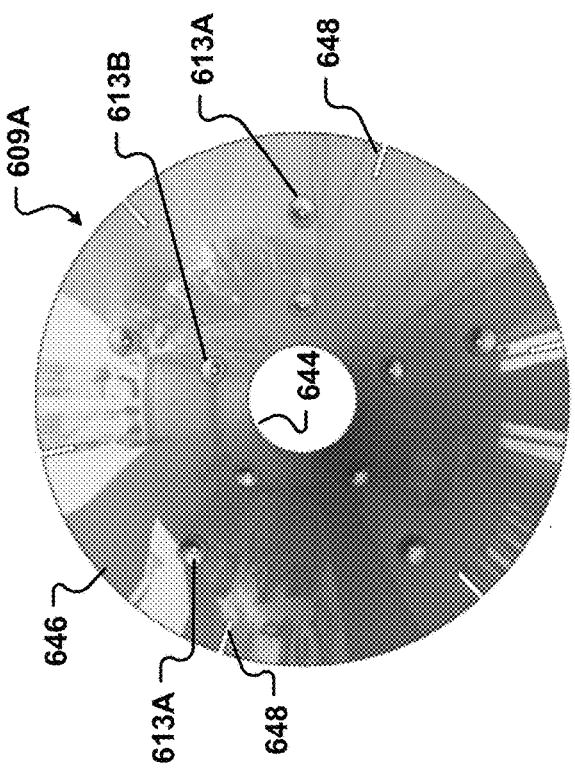

The cones may optionally include one or more rings of projections 613 at different levels within the cones. For example, a first ring of projections 613A may be positioned proximate to the larger opening 646. A second ring of projections 613B is positioned proximate to the small cone opening 644. In one embodiment, the projections 613 of a first cone 609A are offset clockwise or counterclockwise from the projections of a second cone 609B as generally shown in FIGS. 31B, 31C. In this manner, when the cones are stacked with their slots 648 aligned, the projections 613 of the cones will not all be aligned. This is beneficial to ensure uniform spacing between adjacent cones. More specifically, in one embodiment, the projections 613 extend upwardly from the upper surface of the cone and form a corresponding depression in the outer lower surface of the cone. The depressions are generally illustrated in FIGS. 31A, 31D. If the projections 613 of a lower cone aligns with a depression formed by a projection of an upper cone, the upper and lower cone may be closer together than intended, disrupting or preventing the flow of fluid between the cones.

The projections 613 are spaced around the cones 609 to separate an outer lower surface of an upper cone from an inner settling surface of an adjacent lower cone by a predetermined distance 656 as generally illustrated in FIG. 31D. In one embodiment, the predetermined distance 656 between adjacent cones is between approximately 2 mm and approximately 30 mm, or about 5 mm.

Referring now to FIGS. 32A-32E, a distributor 670 according to one embodiment of the present disclosure is generally illustrated. The distributor 670 is similar to the diffuser 570 described herein and operates in a similar manner.

The distributor 670 is configured distribute gases or liquids added to the housing around the interior of the housing 601. The distributor 670 has a body 674 that is generally ring shaped or conical. The body 674 has a large upper opening 678 and a small lower opening 680.

The distributor is configured to support the stack of cones within the housing. Accordingly, in one embodiment a protrusion 682 extends from a lower surface of the body 674. The protrusion is configured to separate the distributor 670 from an interior surface of the lower housing portion of a settling device by a predetermined distance.

The body 674 is also adapted to support a cone 609 positioned above the distributor 670. In one embodiment, an upper protrusion 684 extends upwardly from an inner surface of the body 674. Similar to the cones 609, the distributor 670 optionally includes one or more rings of upper protrusions 684. An upper ring of protrusions 684A is optionally positioned proximate to the large upper opening 678. A lower ring of protrusions 684B is formed proximate to the small lower opening 680.

A slot 690 is formed through the body 674. The slot 690 is oriented approximately parallel to the longitudinal axis 650. In one embodiment, the slot 690 extends through the upper protrusions 684A. The slot 690 is similar to the slot 648 formed through the cones 609. More specifically, the slot 648 is configured to receive a support rail 692 such as generally illustrated in FIG. 32C.

The distributor includes apertures 676 to allow gases or liquids to rise past the distributor. The apertures 676 are spaced around an inner edge of the large opening 678.

In one embodiment, a flange 686 projects downwardly from an upper edge of the body 674. The flange 686 defines a space 688 between the lower surface of the body 674 and the flange to prevent upward movement of a gas introduced into a housing of a settling device. The apertures 676 extend through the distributor body into the space 688 and proximate to an inner surface at an upper edge of the flange 686. In this manner, gas introduced into the housing can accumulate in the space 688 and then pass through the apertures 676 in an even and controlled manner.

Figure 32A:
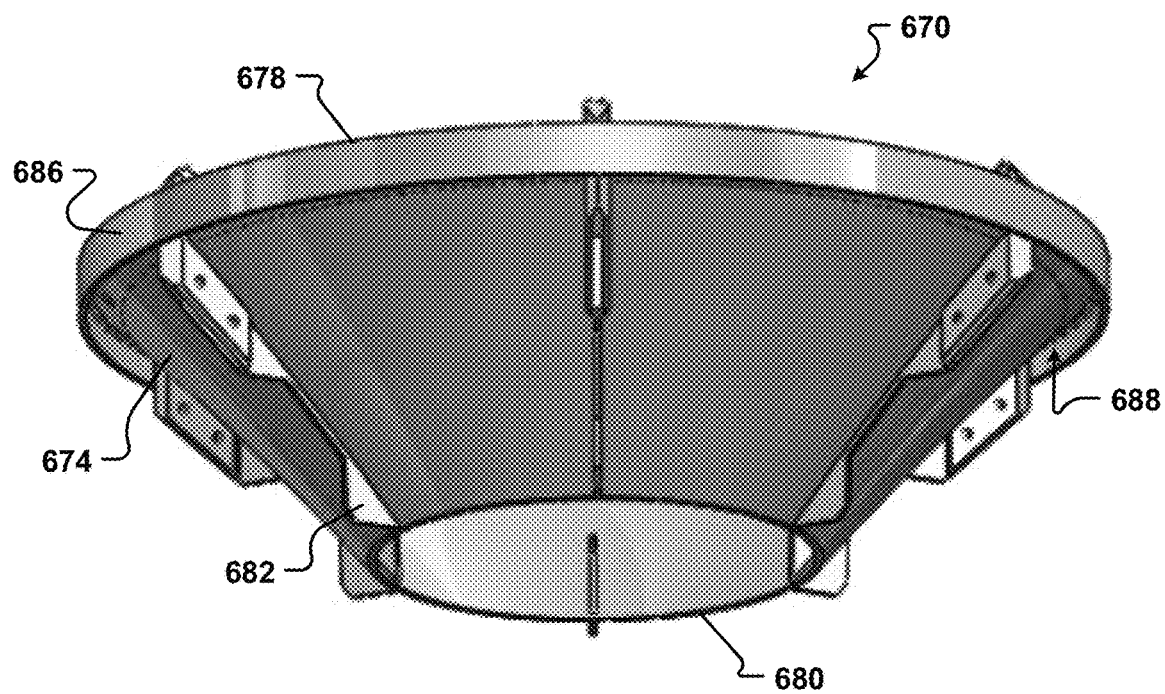
FIGS. 32A-32B are views of a distributor of the present disclosure for use with the settler devices.
Figure 32B:
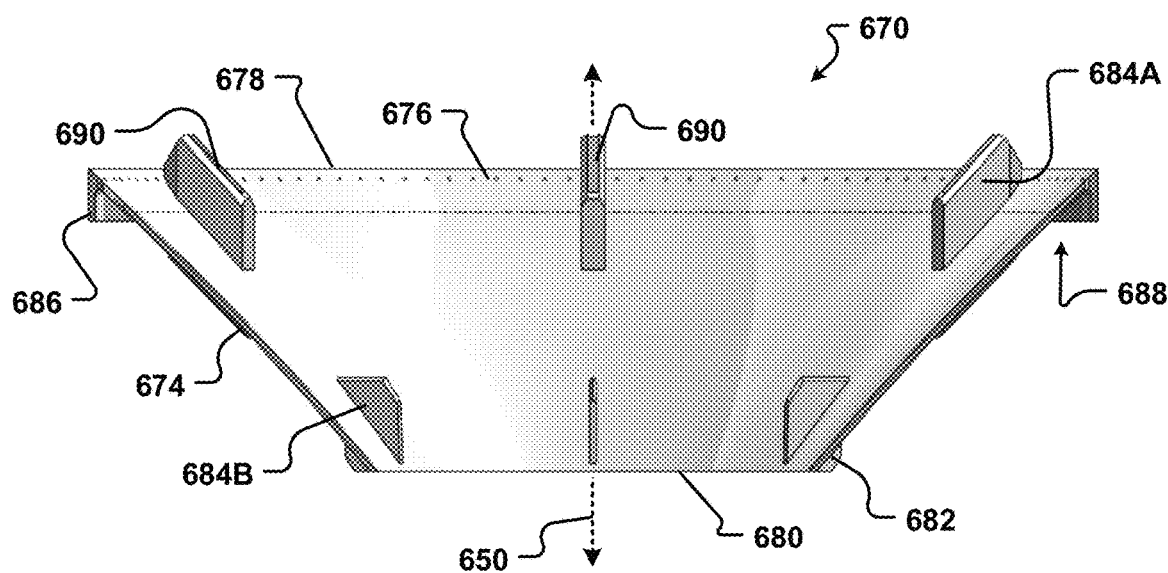
Figure 32E:
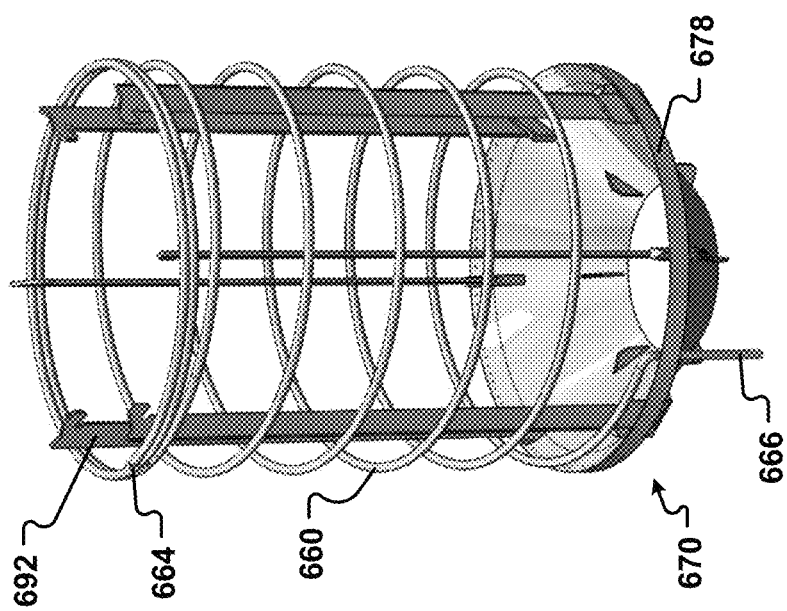
FIG. 32E is another perspective view of the diffuser of FIG. 32C and illustrating a coiled aspirator of the present disclosure spiraled outwardly from the support rails and extending downwardly through an aperture of the distributor.
Figure 32D:
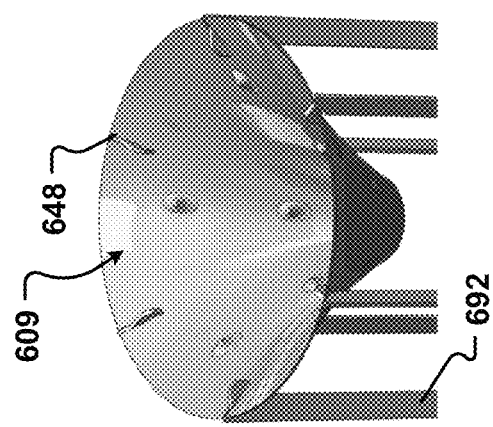
FIG. 32D is a partial perspective view of the support rails of FIG. 32C supporting a cone of the present disclosure.
Figure 32C:
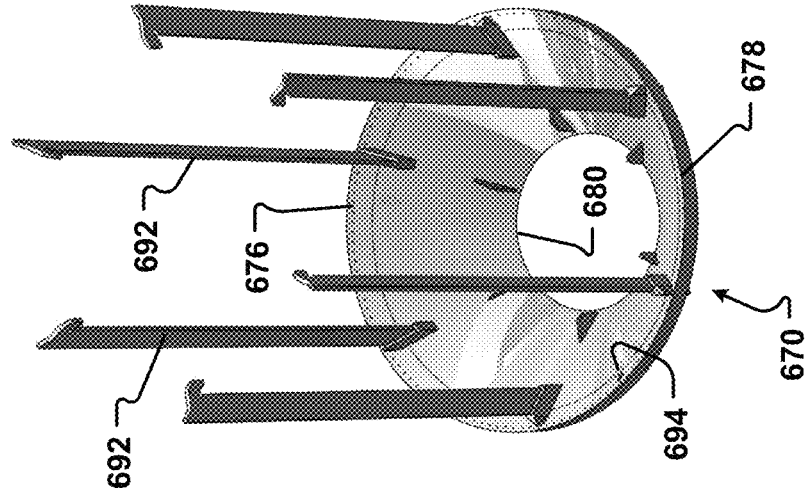
FIG. 32C is a perspective view of the distributor of FIG. 32A and illustrating support rails interconnected to the diffuser.

Referring now to FIG. 32C, support rails 692 are illustrated engaged to slots 690 of the distributor 670. The rails 692 have a predetermined length selected to fit within a housing 601 of a cell settler device 600. As generally shown in FIG. 32D, an upper end of the rails 692 can engage an upper cone 609. Other cones 609 can be positioned between the distributor 670 and the upper cone with the support rails 692 extending through their slots 648. The support rails prevent unintended on inadvertent rotation of the cones 609 about the longitudinal axis 650.

FIG. 32C also illustrates an optional hole or passageway 694 formed through the distributor 670. The passageway 694 is configured for the aspirator 660 to pass therethrough, as generally illustrated in FIG. 32E.

Referring now to FIG. 32E, the support rails 692 also provide a vertical surface for the aspirator 660 to slide against as it moves up and down within the housing. For example, without the support rails 692, a coil of the aspirator 660 could be caught in a gap or space between the outer edges of two cones 609 which would prevent movement of the aspirator 660. In contrast, an inner edge of the aspirator 660 can slide against a vertical, outer edge of the support rails as generally shown in FIG. 29E.

Figure 33:
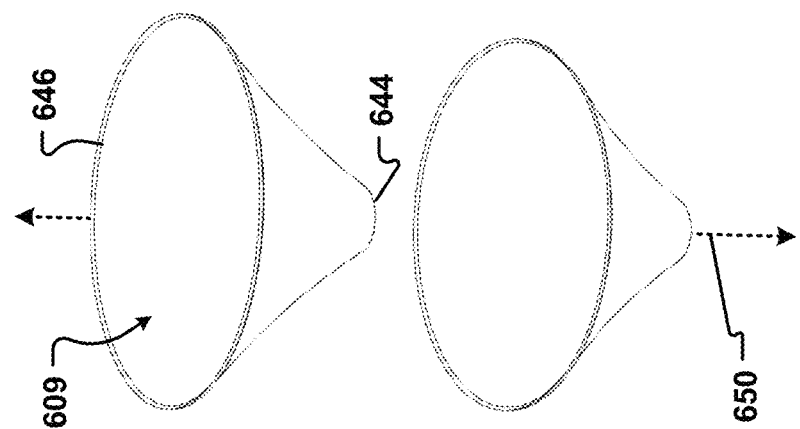
FIG. 33 is a perspective view of two cones of one embodiment of the present disclosure.

Referring now to FIG. 33, two arcuate cones 609 of an embodiment of the present disclosure are generally illustrated. The cones are shown with an apex or small opening 644 facing down. The cones have an angle of inclination increasing from approximately 30° to approximately 80° from the vertical. In one embodiment, the inclination of the cones is between approximately 45° to approximately 70°.

An outer diameter of the arcuate cones 609 may range from approximately 25 mm to approximately 2000 mm proximate to the large opening 646. An inner diameter of the cones 609 may range from approximately 3 mm to approximately 50 mm proximate to the small opening 644. The settling devices 600 of the present disclosure are easily scalable to increasing sizes and volumes to process larger bioreactor volumes.

Figure 34:
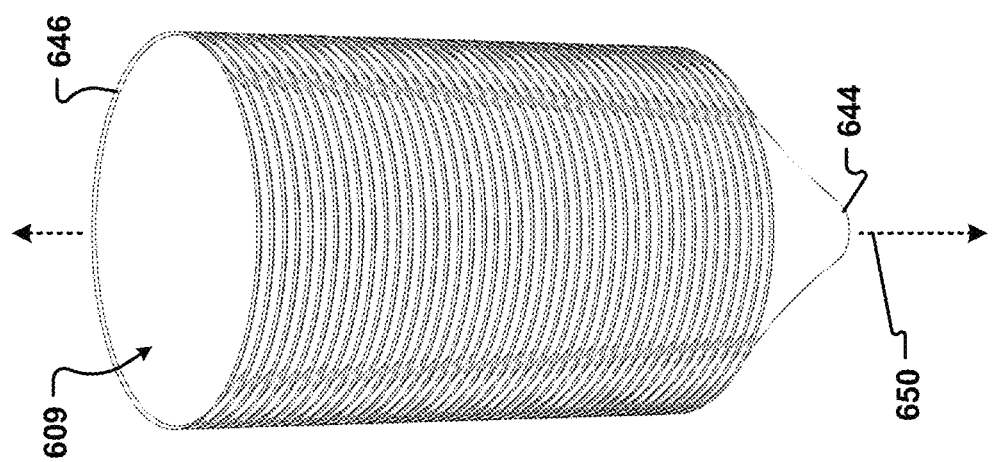
FIG. 34 is a perspective view of the cones of FIG. 33 nestled concentrically in a stack of cones.

Referring now to FIG. 34, a perspective view is provided generally showing cones 609 stacked up vertically with substantially uniform spacing in between each cone. The cones are configured to have a predetermined vertical distance or spacing between each cone. The spacing between adjacent cones is typically from about 3 mm to about 20 mm. In one embodiment, the spacing between adjacent cones is approximately 5 mm.

Figure 35:
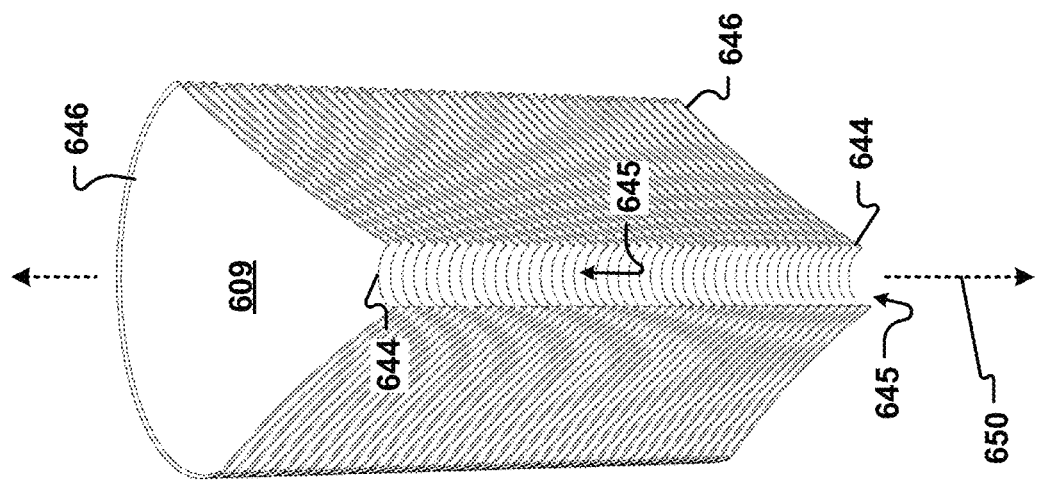
FIG. 35 is a sectional perspective view of the stack of cones of FIG. 34.

FIG. 35 shows the central holes (or small openings 644) are lined up concentrically to form a central channel 645 when the cones are stacked up vertically at a substantially uniform spacing. In one embodiment, the cones are substantially coaxially aligned with a longitudinal axis 650. Accordingly, the central channel 645 is also substantially coaxially aligned with a longitudinal axis 650. The central channel 645 provides a path through which liquid and one or more of settled cells, aggregates, beads, and other particles flow down to the bottom of a settling device 600. The curved interior or settling surfaces of the cones 609 provide a great way to harvest or collect any adherent cells that are growing attached to these surfaces.

In contrast, devices with a stack of flat, horizontal surfaces require manipulation to separate and harvest adherent cells growing on the flat horizontal surfaces. The manipulation required to separate and harvest the cells can damage a large number of the cells and results in inefficiencies.

Any number of cones 609 can be included in a stack of cones within the settler devices of the present disclosure. In one embodiment, a stack of cones includes from 5 cones to approximately 500 of the cones 609.

Figures 36, 37, 38:
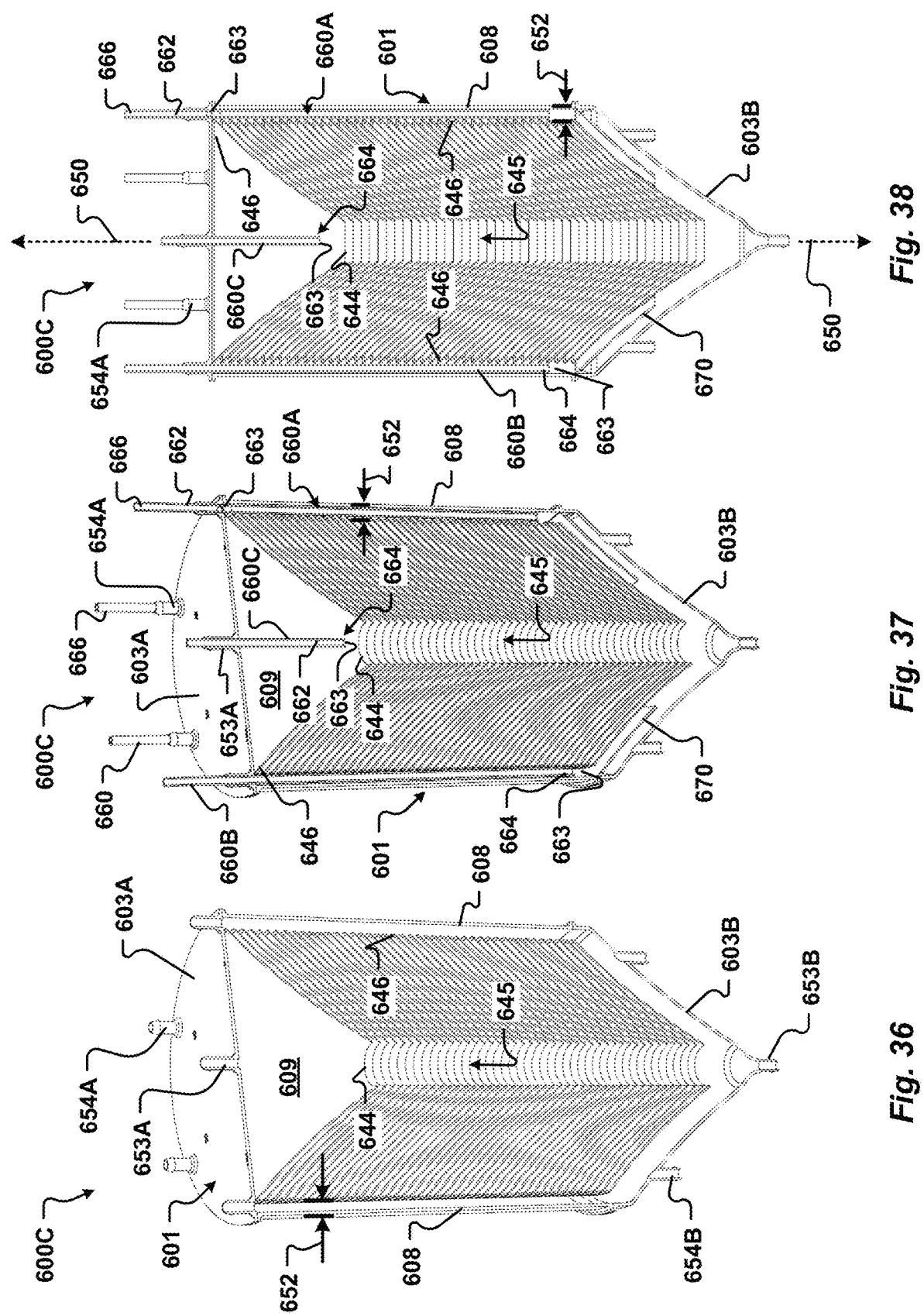
FIG. 36 is a cross-sectional view of a settler device of the present disclosure with the cones of FIG. 34.
FIG. 37 is another cross-sectional view of the settler device of FIG. 36 and further illustrating a distributor and aspirators positioned within a housing of the settler device, the aspirators extending vertically proximate to the large openings of the cones in the stack of cones.
FIG. 38 is a front cross-sectional elevation view of the settler device of FIG. 37.

Referring now to FIG. 36, a cross-sectional view of a settler device 600C of the present disclosure is provided and illustrates the stack of arcuate cones 609 positioned inside the settler housing 601. The housing 601 can be made up of a cylindrical tube 608 of any length, capped at the top and bottom with end-caps 603A, 603B. The upper cap 603A may be the same as, or different from, the bottom cap or portion 603B.

The bottom part or end-cap 603B of the housing can be of an arcuate conical shape. In one embodiment, the bottom end-cap 603B has one central port 653B. Alternatively, the bottom end-cap has a port central 653B and one or more peripheral ports 654 distributed around its conical surface, allowing different fluids (liquids and gases) to be pumped into the settler device. Optionally, one or more of the ports 653B, 654B may be also used for taking out samples of liquid or settled cells or particles. The central port 653B at the bottom is mainly to be used for collecting the settled cells, aggregates, or beads or particles and/or pumping them out of the settler.

The top end cap 603A of the housing 601 may be a flatter plate or a slightly curved cone. The top end cap 603A may include a peripheral port 654A. In some embodiments, the top end cap has several ports 654A around the periphery. In one embodiment, the upper housing portion 603A is generally planar.

Optionally, the settler device includes four or more ports 654A. Aspirator tubes 660 and/or sensors for measuring the culture parameters inside the settler assembly may be inserted into the housing 601 through the ports 654A. The top end cap may also include a central port or opening 653A. The central port 653A may be used to allow clarified liquid containing very few cells or particles to exit the settler device 600C.

Referring now to FIGS. 37-38, several tubes 660 are illustrated after being inserted into the peripheral ports 654A at the upper portion 603A of the housing of FIG. 36. The tubes 660 generally extend downwardly within the housing 601 in an annular space 652 between an interior surface of the housing and an outer portion of the cones 609 proximate to their large openings 646.

The tubes 660 may be aspirators similar to other aspirators described herein. Additionally, or alternatively, the tubes 660 can include sensors. Optionally, four or more tubes 660 can be positioned in the housing 601.

The tubes 660 may also function as supports to hold cones 609 in a predetermined alignment within the housing. For example, the tubes 660 can hold the cones vertically and in a predetermined position within the housing 601. In one embodiment, the tubes 660 help to center the cones on the longitudinal axis 650. Additionally, in some embodiments, the tubes position the cones 609 such that they do not touch the interior surface of the cylindrical wall of the housing such that there is an annular space 652 between the interior surface and the cones.

The tubes 660 may have different lengths. In one embodiment, a tube 660 extends to the lower portion 603B of the housing. Optionally, a tube 660 engages an interior surface of the lower portion. In another embodiment, a tube 660 is interconnected to a distributor 670 positioned in the housing.

In one embodiment, the tubes 660 include sensors. The sensors are positioned by the tubes 660 of different lengths to measure the liquid at different levels within the housing. For example, the sensors can measure culture parameters like pH, DO (dissolved oxygen), dissolved $CO_2$, glucose, lactate, glutamine, ammonia and T (temperature) at these different locations within the housing 601. With this information, a user can adjust or control conditions in the housing 601. More specifically, the user may adjust one or more of pH, DO, T, dissolved $CO_2$, glucose, lactate, glutamine and ammonia by manipulating the flow rates of one or more of air, $O_2$, $CO_2$, $N_2$, into the housing through a port 653, 654 or through a diffuser 670. Additionally, or alternatively, the user may manipulate the rate at which liquid media and/or nutrients are introduced into the housing and withdrawn from the housing.

In one embodiment, the tubes are aspirators 660 which have an internal lumen 662. An orifice 663 is formed in each aspirator to withdraw liquid from the housing. The orifices 663 can be formed at any position along the length of the aspirators. Moreover, different aspirators can have orifices 663 formed at different positions. In this manner, clarified liquid can be withdrawn from different levels or heights of the housing without moving or adjusting the aspirators. In one embodiment, the aspirators 660 are connected to a pump or a vacuum so that the clarified liquid can be aspirated or pumped from the housing and any desired rate.

One example of an orifice 663 is illustrated in the aspirator 660A of FIGS. 37-38. The orifice 663 is positioned proximate to the upper portion 603A of the housing. In this manner, the orifice 663 and aspirator 660A can withdraw clarified liquid from an upper level of the fluid.

In one embodiment, an orifice 663 is formed at a free end 664 of an aspirator 660B.

Optionally, an aspirator 660C is inserted into the housing through the first port 653A of the upper housing portion 603A. The free end of the aspirator includes an orifice 663 to withdraw clarified liquid. In one embodiment, fluid will flow through the aspirator 660C without assistance from a pump or vacuum. For example, in some embodiments, the housing 601 is sealed and can be pressurized such that the pressure within the housing is greater than the pressure outside the housing. The first port 653A may include a valve to open or close the port to selectively allow or prevent fluid from freely flowing through the aspirator 660C.

The aspirator 660C inserted into the first port 653A may or may not extend down into the empty space above the top cone. More specifically, the free end and the orifice 663 can be positioned between the large 646 and small 644 openings of the uppermost cone 609 in the stack of cones. In one embodiment, the aspirator 660C has a length such that the free end 664 extends downwardly below the small opening 644 of the uppermost cone and into the central channel 645 through the cones. During the continuous pumping of liquid from the bottom of the settler device 600C, the clarified liquid at the top can exit the housing through the top port 653A. In one embodiment, the top port 653A is left open, i.e., without any peristaltic or other pumps on the tubing from this port.

A distributor 670 of another embodiment of the present disclosure is positioned below the bottommost cone of the stack of cones. The distributor 670 is similar to other distributors and diffusers described herein. The distributor 670 is configured to divert the liquid down into the bottom portion 603B of the settler device and contains several holes or apertures 676 at the top to direct any air or gas bubbles to go up around the periphery of the cones into the annular space 652 inside the cylindrical housing. These gas bubbles also entrain liquid up in the annular space 652 between the cones and an interior surface of the housing, which allows the liquid to come down on the upper surface (or settling surface) of each of the cones and into the central channel 645 back to the bottom of settler.

FIG. 39 is another cross-sectional view of the arcuate cones, with the tubes 660 and distributor 670 only and without the cylindrical housing or the end caps. In some applications where aspiration is not needed, but control of cell culture parameters, such as pH, dissolved oxygen (DO), temperature (T), etc. is needed, these tubes may be shortened and affixed with fluorescent dye sensors for pH, DO, dissolved $CO_2$, glucose, lactate, glutamine, and ammonia and thermocouples at their sealed bottom end. Optical cables (or transmission lines) for channeling the incident light and fluorescent lights can be threaded through one or more of these hollow tubes, including the peripheral and central tubes. Another shortened aspirator tube can be repurposed as a thermowell to measure the temperature of the culture liquid at the end of that tube.

FIG. 40 shows a perspective view of the whole stack of arcuate cones 609, with the tubes 660 and distributor 670 only and without the cylindrical housing or the end caps.

Holes or orifices 663 may be provided on the tubes or aspirators 660 at different heights so liquid may be aspirated or pumped out through any one of these holes on the tubes at different heights. For example, the aspirator 660A is illustrated with an orifice 663 proximate to a level of the large opening 646 of the uppermost cone 609. Another aspirator 660B has an orifice 663 lower in settler device 600C near the lowest cone 609 and the distributor 670. Optionally, an aspirator 660D may have an orifice 663 proximate to a medial cone in the stack of cones. Other positions and heights of the orifices 663 are contemplated. As will be appreciated by one of skill in the art, by positioning the orifices 663 at different levels within the housing, conditions of liquid at various positions and heights within the housing can be determined by withdrawing fluid from an orifice at a level.

Many more of the small gas or air holes 676 around the top of distributor 670 are shown to allow gas or air to flow through them and up into the annular space 652 around the periphery of the cone stack. One of three or more ribs 682 provided at the bottom of distributor is seen, which spaces the distributor above the bottom conical portion 603B of the settler housing to allow liquid with settled cells or particles to flow down.

FIG. 41 shows the outside view of the housing 601 with the top 603A and bottom 603B end caps and ports. The internal cones, aspirator tubes 660 and inlet liquid/gas distributor are hidden from view by the housing.

In one embodiment, the upper portion or cap 603A includes labels 604 associated with one or more of the ports 653A, 654A. The labels 604 indicate the height of each tube or the culture parameter that can be measured by inserting an optical cable to interrogate an appropriate fluorescent dye sensor at the end of the tube.

FIGS. 42-44 show transmission lines 620 (such as fiber optic cables) inserted into tubes 660A, 660B from two of the peripheral top ports 654A. The ends of these fiber optic cables may be capped with a transparent seal and fluorescent dye sensor 622 affixed on the outside, to be in contact with the fluid inside the settler device 600C. The fluorescent dye sensor can measure amounts or levels of one or more of pH, dissolved $CO_2$, DO, glucose, lactate, glutamine, and ammonia in the fluid. Two opposite tubes 660A, 660B are shown in cross-section and are truncated to two different lengths or heights. In this manner, the same variable (pH dissolved $CO_2$, or DO) can be measured at two different (angular and vertical) locations by fluorescent dye sensors 622.

Referring now to FIG. 44, two of these tubes 660C, 660D may include a temperature sensor 626. Optionally, the temperature sensor 626 is positioned at an end of the tubes 660C, 660D, although the temperature sensor may be located at other positions on the tubes. The temperature sensor 626 may comprise a heat-conductive seal such as a metal disk so that a data line 624 or a thermocouple may be inserted inside these two tubes for measuring temperature (T) in two different locations. Other temperature sensors 626 known to those of skill in the art may be used with the settler device 600C.

In one embodiment, the settler device 600C has six of the peripheral top ports 654A and fiber optic cables 620 are inserted into four tubes 660. Two of the tubes have fluorescent dye sensors 622 to measure pH and two of the tubes have fluorescent dye sensors 622 to measure DO. In addition, two tubes 660 are inserted in the remaining two top ports with thermocouple wires 624 associated with sensors 626 for measuring temperature (T) at two different locations. The cables 620, 624 at the top are connected to an electronic hub or control system for decoding the optical or electrical signals into the process parameters of pH, DO and T.

Any suitable means known to those of skill in the art may be used to connect the sensors 622, 626 to the control system. For example, in one embodiment, the sensors 622, 626 transmit data wirelessly to control system. In one embodiment, the sensors use Wi-Fi, Bluetooth™, NFC, other wireless communications protocol to transmit data to the control system.

FIG. 45 shows the perspective view of all six of the tubes 660 inserted through the six peripheral ports 654A of the settler device 600C by removing the cylindrical section of settler housing and the cone stack. The tubes 660 are truncated at different heights to measure the process parameters at different locations. Tube 660A has a first length and its lower end is not visible in FIG. 45 as it is covered by the top end-cap 603A. In contrast, tube 660B has a second length that is longer than the first length of tube 660A.

FIG. 46 is similar to FIG. 45 and shows the tubes 660 positioned around a stack of cones 609. The upper and lower portions 603A, 603B and the cylindrical portion 608 of the housing are removed for clarity.

FIG. 47 generally illustrates two cones 609 of another embodiment of the present disclosure. The cones 609 are similar to other embodiments of cones (309, 409, 509, 609) described herein and include many of the same or similar features. For example, the cones 609 generally include a large opening 646 and a small opening 644. The cones can be positioned in a settler device of any embodiment of the present disclosure. Optionally, either the large opening 646 or the small opening 644 can be positioned proximate to an upper portion 603A of a housing 601 of a settler device 600. The cones may include all of the features of the cones described in conjunction with FIGS. 31A-31D.

The cones 609 are configured to be positioned proximate to other cones with a predetermined spacing 656. In one embodiment, the desired vertical spacing 656 (illustrated in FIG. 49) between adjacent cones is from about 3 mm to about 20 mm. In another embodiment, the vertical spacing is about 5 mm, between the adjacent cones.

The cones 609 include bumps or projections 613 of desired heights to facilitate the spacing between adjacent cones. The bumps 613 can be built into the plastic or metal cones during their fabrication. In one embodiment, the bumps 613 extend inwardly and project about an interior settling surface 614 of the cones 609. In another embodiment (not illustrated), the bumps 613 extend outwardly from an outer surface 616 of the cones. Optionally, each cone 609 includes a first ring of bumps 613A proximate to the large opening 646. Additionally, or alternatively, each cone 609 includes a second ring of bumps 613B proximate to the small opening 644.

Several slots or notches 648 are cut through each cone 609. The notches 648 are similar to the slots described in conjunction with Figs. FIGS. 31A-31D.

Optionally, each cone has four or more of the notches 648. The notches 648 are adapted to permit the tubes 660 to pass by each cone. In one embodiment, the notches are formed through each cone 609 proximate to the large opening 646 of the cone. Optionally, the notches 648 extend to a circumferential edge of the large opening 646.

The notches 648 of each cone are configured so that the peripheral aspirator tubes 660 are registered or spaced in these notches. In one embodiment, the notches 648 are formed at alternating locations on one or the other side of each bump 613 so that when the vertical tubes 660 are aligned through these notches, the bumps are not aligned above each other, so the cones are positioned at desired spacing by the offset bumps.

FIG. 48 generally illustrates aspirator tubes 660 passing through the notches 648 of the cones 609. Notably, the bumps 613 of the upper cone 609A are offset from the bumps 613 of the lower cone 609B. In this manner, by alternating cones 609A, 609B in a stack of cones, the cones will stack with a predetermined spacing 656 provided by the alternating bumps 613 preventing the cones from stacking closely on each other without any gap.

In one embodiment, a distal end 664 of one or more of the tubes 660 engages the distributor 670. Optionally, the distributor 670 includes posts or pins 696 that project upwardly. The tubes 660 can engage the pins. In this manner, the tubes 660 are registered at the bottom by the pins 696 of the distributor 670 so that the tubes are held vertical during the assembly into the housing.

Holes 663 may be seen on the tubes 660 at different heights so liquid may be aspirated from inside the settler device 600 at any desired height at any time through one of these tubes. For example, tube 660A illustrated in FIG. 49 has an orifice 663 proximate to the large opening 646 of the uppermost cone 609 of the stack of cones.

Upper 684 and lower 682 spacers of the distributor 670 are also illustrated in FIGS. 48-49. The spacers 684, 682 may be bumps, ridges, flanges, or ribs that project from one or more surfaces of the distributor. In one embodiment, the distributor 670 includes three ribs 684 that project upwardly from an upper surface of the distributor. Additionally, or alternatively, three ribs 682 project downwardly from the lower surface of the distributor. The ribs 682, 684 on the distributor provide a predetermined spacing between the distributor and a bottom cone 609 and the interior surface of the lower portion 603B of the housing to allow liquid to flow up through this space into the periphery around the cone stack.

Holes 676 may also be seen around the periphery of the distributor 670 to allow gas bubbles to rise up through the holes 676 and entrain liquid around the periphery of the settler device. This entrained liquid rises upwardly in an annular space 652 between the outer edges of the cones and the interior surface of the housing. The liquid will then return down between the cones into the central channel 645 (shown in FIG. 39, for example) of the cone stack. In this manner, the distributor 670 facilitates circulation of the fluid within the housing 601 of embodiments of the settler device 600C of the present disclosure.

FIG. 49 illustrates a perspective view of all the cones spaced at the desired vertical distance 656 from each other by the bumps and ridges shown in FIGS. 47-48. The cones 609 are aligned concentrically by the tubes 660 going through the notches 648 on each cone. The cones are supported at the bottom on the distributor 670, with three ridges on the distributor spaced the cones at a desired vertical distance to allow liquid to pass through the channel in between.

Referring now to FIG. 50, cones 609 of another embodiment of the present disclosure are generally illustrated. The cones 609 shown in FIG. 50 are similar to the cones described in conjunction with FIGS. 47-49 as well as other embodiments of cones of the present disclosure.

Notably, the cones 609 shown in FIG. 50 have holes 648 formed through the cones for the tubes 660. Unlike the slots of the cones in FIG. 47, the holes 648 do not extend to a large circumferential edge of the cone proximate to the large opening 646. The holes 648 alternate on one or the other side of each bump 613, so that when the vertical tubes 660 are passed through these holes, the bumps 613 are not aligned above each other and desired spacing above each cone is provided by the offset bumps.

FIG. 51 generally shows the tubes 660 from the top ports on the top end cap passing through the alternating holes 648 on the cones 609 so that the cones will not stack on each other without any gap. The tubes 660 are registered at the bottom on to the pins 696 on the distributor 670 so that the tubes are held vertical during the assembly into the housing.

Three spacers or upper ribs 684 on the distributor 670 provide the desired spacing between the distributor and a bottom cone 609 to allow liquid to flow up through this space into the periphery around the cone stack. Holes 663 may be seen on the tubes 660 at different heights so liquid may be aspirated from inside the settler 600C at any desired height at any time through one of these tubes. Holes 676 may also be seen around the periphery of the distributor 670 to allow gas bubbles rise up from them and entrain liquid around the periphery and into the annular space 652 (illustrated in FIG. 52). This entrained liquid will return down on the cones into the central channel 645 formed by the small openings 644 of the cone stack.

FIGS. 52-53 show the settler device 600 cut away in the middle showing only the top two cones 609 held at the desired vertical distance 656 between them. Four of the six peripheral tubes 660 inserted via the top peripheral ports 654A and registering with the pins 696 from the distributor 670 are shown. The ribs 684 on the distributor 670 are also shown to provide the spacing above the distributor for the inlet of liquid from the bottom side ports 654B (two of which are shown) to flow down initially and some of the liquid to go up in the space between the distributor and the bottom cone (not shown) of a stack of cones. The numerous gas or air holes 676 on the periphery of the distributor 670 are shown, which direct the inlet gas or air to escape through these holes into the annular space 652 around the cone stack.

FIG. 54 is a perspective view of multiple cones 609 spaced at the desired vertical distance 656 from each other by the bumps 613 shown in FIG. 48. These cones are aligned concentrically by the tubes 660 going through the holes 648 through each cone. The cones are supported at the bottom on the distributor 670, with three ridges on the distributor having spaced the cones at a desired vertical distance 658 (shown in FIG. 55) to allow liquid to pass through a channel in between the lower surface of the bottom cone and an upper surface of the distributor.

FIG. 55 is a perspective view of a cut-away section of the cone stack assembled inside the housing 601 of the settler device 600C. Four of the peripheral tubes 660 have been inserted via the top peripheral ports 654A and are registered with the pins 696 from the distributor 670. Ribs of the distributor 670 provide a predetermined spacing 658 between the distributor and an exterior surface 616 of the lowest cone 609. In this manner, liquid or gas injected into the housing 601 from one or more of the bottom side ports 654B (two of which are shown) will flow down initially and then go up in the space 658 between the distributor 670 and bottom cone 609 and into the annual space 652 around the perimeter of the cones.

FIGS. 56-57 are views of embodiments of the settler device 600C of the present disclosure. The settler device 600C generally includes cones 609 and other components described in conjunction with FIGS. 50-55. The settler device 600C is similar to the settler device described in conjunction with FIG. 41 where the peripheral tubes 660 from the top ports 654A are at the very edge of the cones.

However, in the settler device 600C of FIG. 57, the upper peripheral ports 654A are spaced away from the peripheral edge of the upper portion 603A and toward the longitudinal axis 650 to align tubes 660 inserted through the ports 654A with the holes 648 in the cones.

FIG. 58 is a top plan view of the settler assembly 600C and the upper portion 603A. Labels 604 are shown on the upper portion 603A. In one embodiment, the labels 604 are numbers marking the percentage of height from the top where the holes or orifices 663 (shown in FIG. 48) of aspirator tubes 660 inserted in the peripheral ports 654A are located. The tubes 660 and the orifices 663 can be configured to extend to any level within the housing. In one embodiment, a first label 604A is "0" which indicates the tube orifice are proximate to the upper portion 603A. A second label 604B is "80" showing the tube orifice is at 80% of the height of the housing. Similarly, the third label 604C is "60", the fourth label 604D is "100" indicating the tube orifice is proximate to the bottom of the housing, the fifth label 604E is "20" and the sixth label 604F is "40".

If no aspiration is needed in some applications, but instead control of culture parameters like pH, DO, dissolved $CO_2$, and T are desired for the liquid in the housing, the aspirator tubes 660 can be used as conduits for optical cables carrying the (i) incident light to fluorescent dye sensors (such as for pH, dissolved $CO_2$, and DO, and other parameters including glucose, lactate, glutamine, and ammonia) affixed to the tubes 660 with the tube optionally shortened to desired locations/heights and (ii) the fluorescent light from the sensors to the dedicated readers for converting light signal into pH, dissolved $CO_2$, DO, glucose, lactate, glutamine, and ammonia values. Similarly, one of the tubes can be converted to a thermowell, for inserting a thermocouple into a conducting fluid at its bottom for measuring the temperature of the cell culture fluid, just below the tube end. The markings on the top cap-end may then be appropriately labeled with parameter names.

Figure 59:
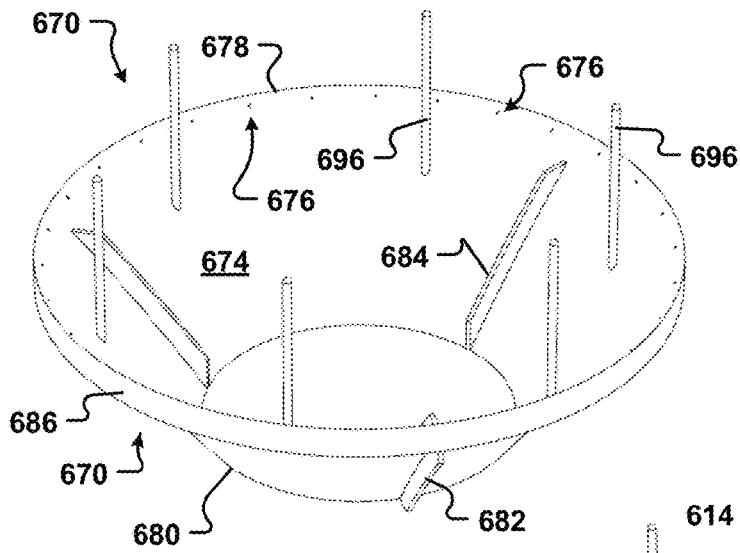
FIG. 59 is a perspective view of a distributor according to one embodiment of the present disclosure.

FIG. 59 is a detailed perspective view of one embodiment of a distributor 670 of the present disclosure. The distributor generally includes a body 674 which has a generally conical shape with truncated ends that define a large upper opening 678 and a smaller lower opening 680.

The distributor includes holes 676 to let air or gas bubbles rise up into the peripheral or annual space 652 between an outer edge of the cone stack and an interior surface of the housing of settler devices 600 of the present disclosure. Optionally, a flange 686 extends downwardly from an upper peripheral edge of the distributor 670. The flange 686 and an outer surface of the distributor body define a space 688 for gas to collect before passing through the holes 676.

The pins 696 on the distributor are used to register the aspirator tubes 660 at the bottom as described herein. The ridges above 684 and below 682 the distributor are sized to provide the desired vertical distance 658 between the distributor and the bottom cone 609, as well as the distance between the distributor and the bottom portion 603B of the settler devices 600.

Figure 60:
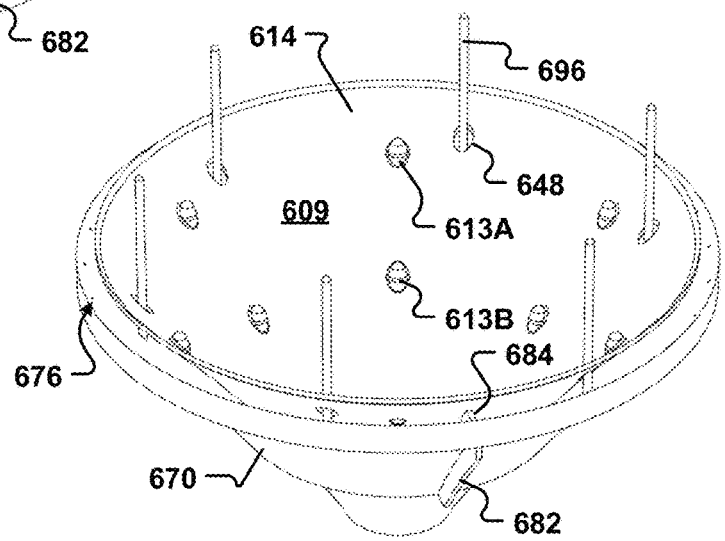
FIG. 60 is a perspective view of the distributor of FIG. 59 with a cone of the embodiment of FIG. 50.
Figure 61:
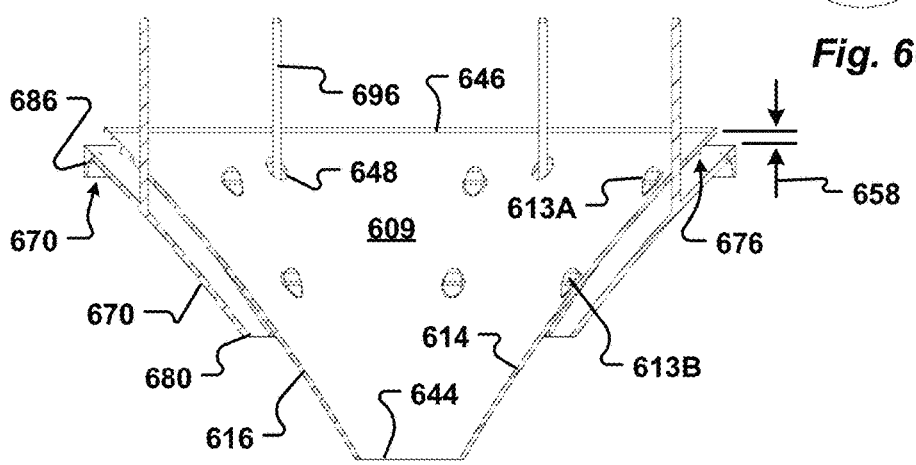
FIG. 61 is a cross-sectional front elevation view of the distributor and cone of FIG. 60.
Figure 62:
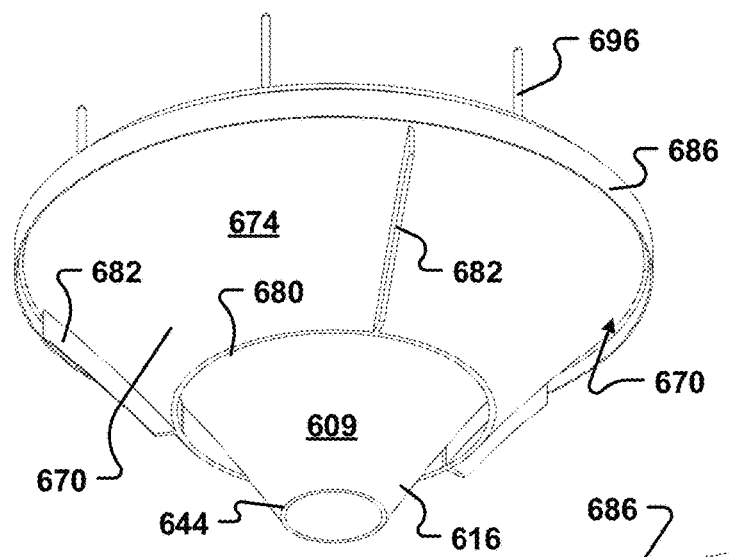
FIG. 62 is a bottom perspective view of the distributor and cone of FIG. 60.

FIGS. 60-62 illustrate how the bottom cone 609 is placed on the distributor 670, with pins 696 of the distributor going through the holes 648 on the cones 609. Spacers 684 on the upper surface of the distributor body contact a lower, exterior surface 616 of the lower cone 609 to provide the desired vertical space 658 in between the cone and the distributor. The upper spacers 684 may be ridges, bumps, or other features that project a predetermined distance above the inner surface of the distributor to space the lower cone a predetermined distance above the distributor. Similarly, the lower spacers 682 may be ridges, bumps or other features that project a predetermined distance down from the lower surface of the distributor. In one embodiment, the distributor includes three upper spacers 684 and three lower spacers 682. However, the distributor may have from 3 to 7 upper and/or lower spacers 684, 682.

Figure 63:
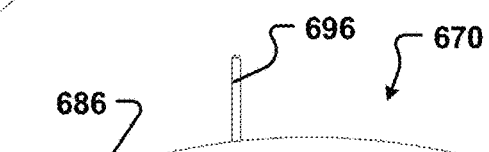
FIG. 63 is a bottom perspective view of the distributor of FIG. 59.
Figure 64:
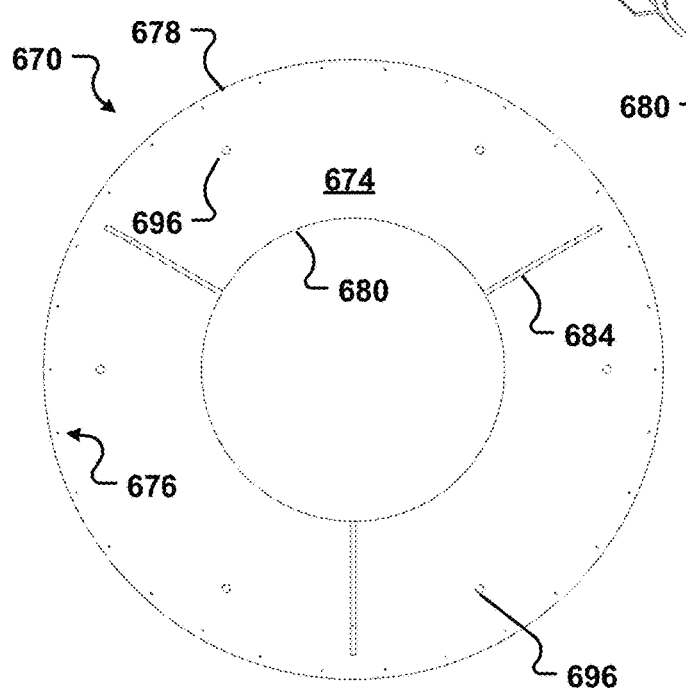
FIG. 64 is a top elevation view of the distributor of FIG. 59.
Figure 80:
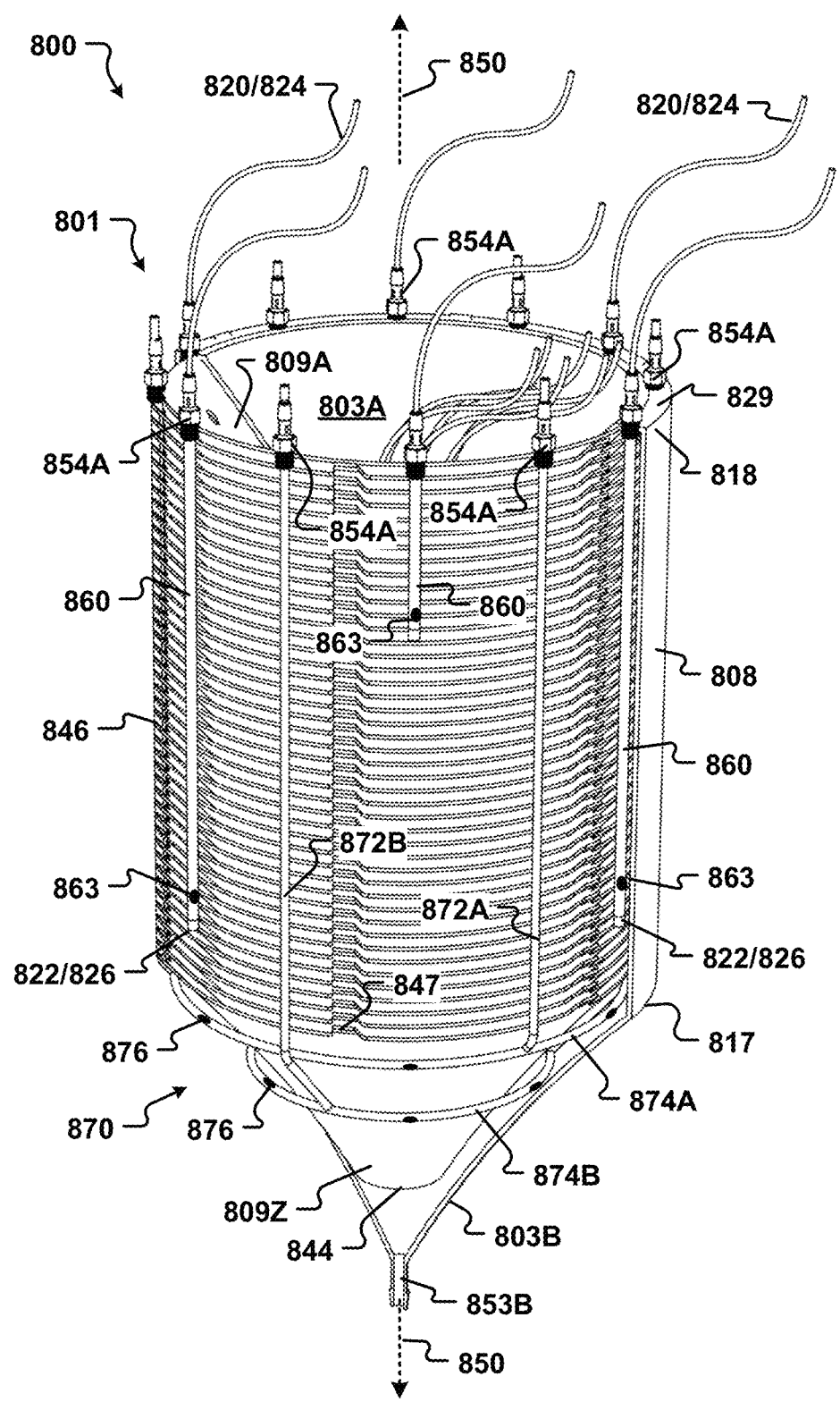
FIG. 80 is a partial cross-sectional front perspective view of a settler device according to another embodiment of the present disclosure.
Figure 83:
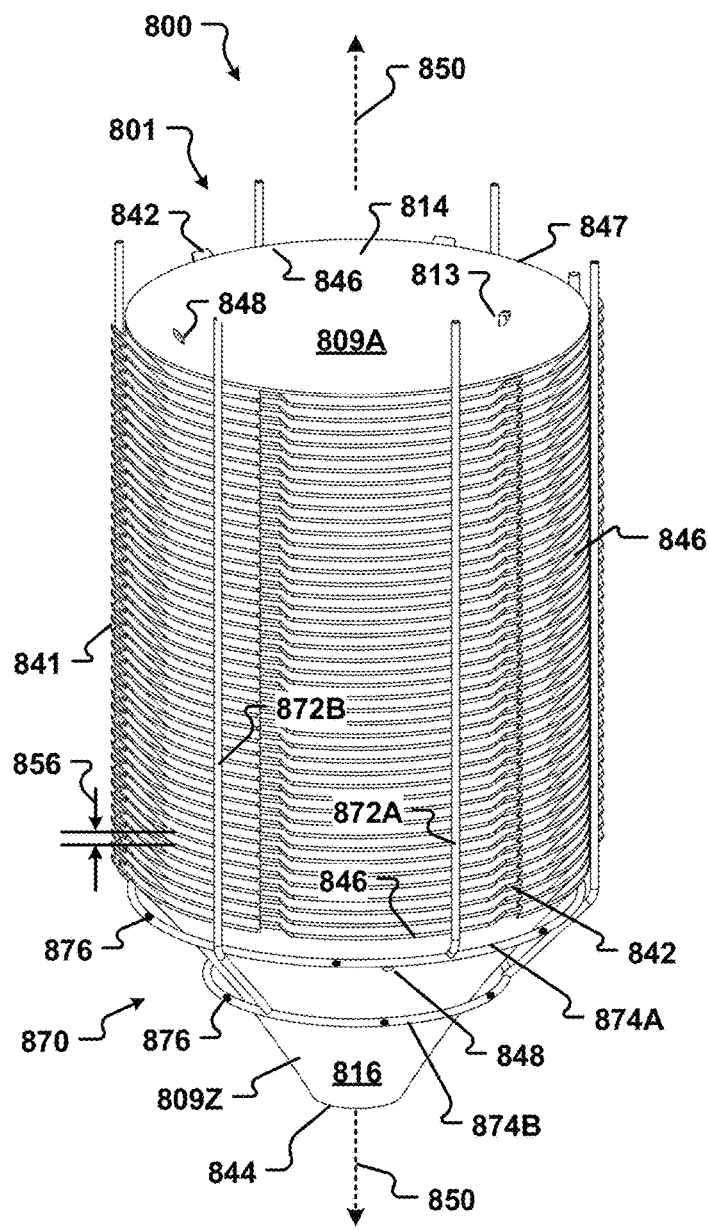
FIG. 83 is a front perspective view of the settler device of FIG. 80 with the housing removed for clarity.
Figure 84:
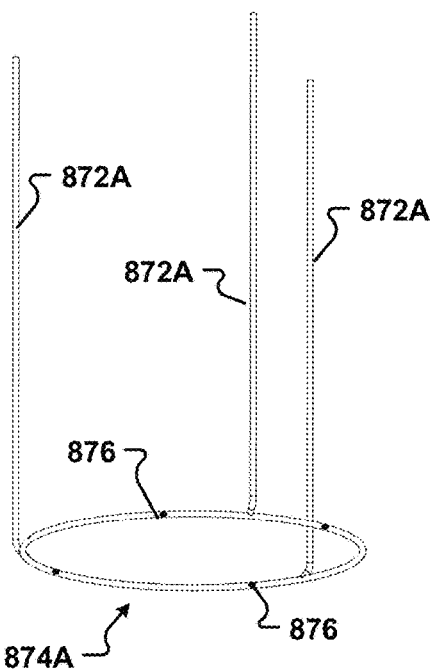
FIG. 84 is a front perspective view of a first portion of a distributor of an embodiment of the present disclosure.
Figure 85:
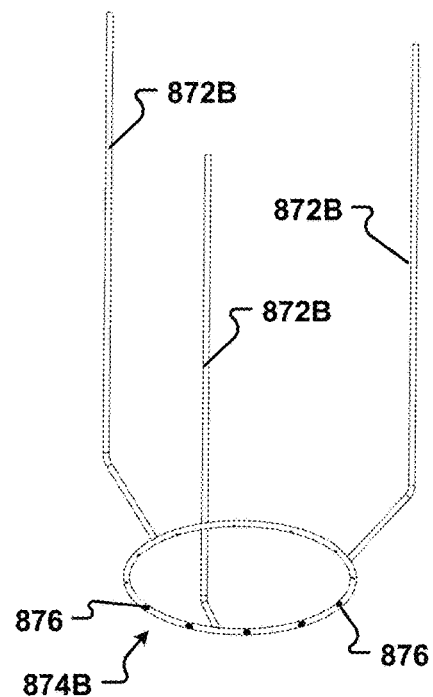
FIG. 85 is a front perspective view of a second portion of the distributor.

FIGS. 63-64 are additional views of the distributor 670 without any cones. Three rib spacers 682 in the lower surface and three rib spacers 684 in the upper surface are shown. As shown in FIG. 64, the distributor 670 includes a plurality of apertures or holes 676 around the large peripheral edge for gas to pass through.

In one embodiment, the distributor has between 20 and 60 apertures depending on the scale of the settling device. Optionally, the distributor has about 30 holes 676. The holes 676 can have any predetermined diameter. In one embodiment, the diameter of the holes 676 is between approximately 0.1 mm to approximately 7 mm.

Referring now to FIG. 65-67, another embodiment of a settler device 600D of the present disclosure is generally illustrated. The settler device 600D is similar to other settler devices described herein and includes many of the same or similar features. The settler device 600D generally comprises a housing with an upper portion 603A, a cylindrical portion 608, and a lower portion 603B. Cones 609 of all embodiments described herein can be positioned within the housing.

Notably, the lower portion 603B of the settler device 600D incorporates a liquid and gas distributor function instead of requiring a separate distributor. An interior surface of the lower portion 603B includes slots or grooves 630. In one embodiment, the grooves 630 extend generally parallel to the longitudinal axis 650.

The grooves 630 are spaced around the lower portion 603B proximate to an upper end 606 of the lower portion 603B. A top end 632 of each groove 630 is a first distance 634 from the upper end 606 of the lower portion. In one embodiment, top ends of the grooves 630 are closer to the upper end 606 than the outer peripheral ports 654B. More specifically, the outer peripheral ports 654B are a second distance 636 from the upper end 606 of the lower portion 603B, the second distance 636 being greater than the first distance 634.

The lower portion 603B of the housing includes spacers 615 that project inwardly. The spacers 615 are similar to the interior protrusions 684 of the distributors 670 described herein. The spacers 615 are configured to contact an outer surface 616 of a lower cone 609 to provide a predetermined space between the lower cone and an interior surface of the lower portion 603B.

In one embodiment, the spacers 615 comprises ribs, bumps, or other protrusions that extend a predetermined distance above the interior surface of the lower portion. In one embodiment, the spacers 615 have the same structure as the interior protrusions 684.

The lower housing may include three or more spacers 615 spaced around the interior surface. Optionally, the spacers 615 are short ribs around the edge of the bottom conical portion of distributor. The spacers 615 provide a desired space (after a bottom cone 609 is placed on the housing lower portion 603B) to allow gas or air bubbles from fluid that enters through an inlet 654B to rise through the slots 630 into the peripheral or annular space of the tubular section 608 of the settler device 600D. The spacers 615 are sized to form an annular space of sufficient size to enable a significant fraction of liquid from the inlet ports 654B around the conical sides of the lower portion 603B to rise up through the space in between the spacers 615 into the annular cylindrical portion of the settler assembly. The cells or particles in this liquid will settle down on each cone as the liquid comes down through the conical channels and moves toward the center and longitudinal axis 650 of the housing. The settled cells will fall down into the central channel 645 of the cones (similar to the channel 645 illustrated in FIG. 53), while some of the clarified liquid may be removed through the top central port 653A by choosing appropriate flow rates into the side inlet 654B and bottom 653B return ports.

FIGS. 67-68 illustrate the settler device 600D with a lower cone 609 positioned in the housing lower portion 603B. Note that the lower exterior surface of the cone 609 is spaced a predetermined distance from the interior surface of the lower portion 603B by the spacers 615 (shown in FIG. 65). A large edge 647 of the cone 609 is positioned above the peripheral side inlets 654B. The large edge 647 may optionally contact an interior surface of the lower portion 603B of the housing. Contact between an exterior surface of the cone 609 and the interior surface of the lower housing portion 603B is generally illustrated at point "A" of FIG. 68. However, the top end 632 of the slots 630 projects above the cone upper end 647. In this manner, liquid and gas entering the housing through any of the lower peripheral ports 654B can move up under the bottom cone 609 and in between the spacers 615, pass through the slots 630 and out the slot top ends 632 into the peripheral or annular space around the cone stack. A large fraction of liquid entering via the side inlet ports 654B will come down on the bottom conical housing or end-cap 603B and sweep down any settled cells, aggregates, beads or particles to exit via the bottom central port 653B.

FIG. 69 shows an exploded view of a settler device 600 with the top and bottom portions 603 spaced from the cylindrical portion 608 of the housing. These end-caps 603A, 603B can be attached to the cylindrical portion 608, in a variety of ways including heat welding, sonic welding, sealing with a gasket, gluing, and other methods known to those of skill in the art.

In one embodiment, the cylindrical portion 608 has flanges 618 that can be joined to corresponding surfaces of the upper 603A and lower 603B housing portions. Optionally, an upper end 606 of the lower housing portion 603B includes a similar flange 618.

Referring now to FIGS. 70-71, the height and volume of a settler device 600 of the present disclosure can be altered by adding one or more additional cylindrical portions 608. For example, the settler device 600 can optionally include a first cylindrical portion 608A and a second cylindrical portion 608B. The cylindrical portions 608 can have the same or a different volume and height. In the illustrated example of FIGS. 70-71, the first cylindrical portion 608A has a greater volume and height than the second cylindrical portion 608B.

Referring now to FIGS. 72-78, the setter device 600 is illustrated supported by a stand 700 of the present disclosure. As will be appreciated by one of skill in the art, as the settler device 600 is filled with process fluids, the weight will increase dramatically, requiring a strong stand 700 to support the weight. The stand 700 and its rollers 704 enable the settler device 600 to be moved into and out of position close to other process equipment such as a Bioreactor as needed.

The stand 700 generally comprises a base 702 with the rollers 704. Struts 706 extend upwardly from the base 702 to a rail 708. The interior of the rail is generally circular. In one embodiment, the rail 708 has a first end 710A and a second end 710B that define an opening.

The rail 708 is configured to support the housing 601 of the settler device 600. In one embodiment, the rail 708 has an interior dimension or diameter that is less than an exterior diameter of a portion the housing lower portion 603B. Accordingly, in one embodiment, the housing lower portion 603B contacts and is supported by the rail.

In another embodiment, the interior dimension of the rail 708 is less than a diameter of a flange 618 of the housing lower portion 603B. Accordingly, the flange 618 is supported by an upper surface of the rail.

The stand 700 may optionally include one or more supports 714. Optionally, a support 714 extends from an arm 712. In one embodiment, the supports 714 comprise a ring or loop. The supports 714 may be referred to as straps. The diameter of a support 714 optionally is adjustable.

A first or upper support 714A is configured to fit around a cylindrical portion 608 of the housing 601. A second or lower support 714B is configured to fit around a conical portion of the lower housing portion 603B. In one embodiment, the vertical position of one or more of the upper 714A and lower 714B support is adjustable. As shown in FIG. 78, the stand can include any number of supports 714. For example, in one embodiment, the stand 700 has two upper supports 714A to secure a cylindrical portion 608 with an increased height to the stand.

In one embodiment, the stand 700 is configured to measure a condition within the housing 601. For example, the stand 700 may include a sensor 716 to measure pH, DO, dissolved $CO_2$, glucose, lactate, glutamine, ammonia and T. A sensor 716 may comprise a collector associated with a fluorescent probe or a fluorescent dye sensor. Additionally, or alternatively, one or more of the sensors 716 is configured to measure temperature. For example, one sensor 716 may be a thermometer, a thermowell, or another suitable device. As described above in conjunction with FIGS. 42-46, one optional method of measuring conditions (such as pH, DO, dissolved $CO_2$, glucose, lactate, glutamine, ammonia and T within the housing) is by positioning appropriate sensors in the tubes 660 or at the bottom of the tubes.

As illustrated in FIG. 72, one or more sensors 716 may be associated with the supports 714 used to secure the settler device to the stand. In one embodiment, one or more of the sensors 716 is operable to detect and/or measure light from within the housing. For example, the sensors may collect light from corresponding fluorescent dye sensor patches attached inside the settler's cylindrical wall 608 and the conical bottom end-cap 603B. In this embodiment, at least a portion of the housing 601 comprises a transparent or translucent material. The sensor 716 may optionally be positioned proximate to a window configured to transmit incident and fluorescent light through the housing to the sensor.

In one embodiment, a suitable transmission line 620 is connected to the sensors. In one embodiment, the transmission line comprises a fiber optic cable for directing incident light and collecting the emergent fluorescent light at different heights on the outside of housing. Additionally, or alternatively, the sensors 716 may transmit data wirelessly to a control system as described herein.

Referring now to FIG. 79, in one embodiment, sensors 716 are affixed directed to an exterior surface of the housing 601. The sensors 716 can be affixed to any portion of the housing, including the cylindrical portion 608, the upper portion 603A and the lower portion 603B. The sensors 716 are operable to measure one or more conditions (such as but not limited to one or more of pH, DO, dissolved $CO_2$, and T) within the housing. In one embodiment, a portion of the housing 601 proximate to the sensor 716 is transparent or translucent.

Referring now to FIGS. 80-85, another embodiment of a settler device 800 of the present disclosure is generally illustrated. The settler device 800 is similar to the settler devices 600A, 600B, 600C, and 600D described herein and has many of the same or similar features. In addition, the settler device 800 can include any of the cones 609 described for use with the settler devices 600. The settler device 800 generally comprises a lower conical portion 803B, a cylindrical portion 808, an upper conical portion 803A, and a stack or plurality of cones 809 positioned within the settling device.

Any suitable material known to those of skill in the art may be used to form the settler device 800 and the cones 809. The settler device may be formed of a first material and the cones can be formed of a second material. Optionally, the first and second materials are the same. Alternatively, the first material is different from the second material. In one embodiment, the settler device is formed of a plastic or a glass. Alternatively, the settler device is formed of a metal, such as a stainless steel.

Optionally, surfaces of the cones 809 and interior surfaces of the settler device may be completely or partially coated with one or more of a non-stick plastic, teflon, silicone and similar materials known to those of skill in the art. Surfaces of the settler device 800 and the cones 809 (especially when formed of stainless steel) may be electropolished to provide a smooth surface.

The lower conical portion 803B includes a port 853B. In one embodiment, the port 853B is approximately concentrically aligned with a longitudinal axis 850 of the settler device. The port 853B is the same as or similar to other ports 653B described herein.

Optionally, the lower conical portion 803B may include a second port (not illustrated) that is the same as, or similar to, the ports 654B described herein. When present, the second port is offset from the longitudinal axis.

In one embodiment, the second port is not included with the lower conical portion 803B of the setter device. For example, when the settler device 800 is formed of a metal, such as stainless steel, the second port may not be formed in the lower conical portion. In some embodiments, a second port is included in the lower conical portion of the settler device 800. For example, when the settler device 800 is formed of a plastic or a glass, the lower conical portion 803B may include the port 853B and a second port similar to ports 653B.

As will be appreciated by one of skill in the art, when the lower conical portion 803B does not include a second port, there is only one penetration through the lower conical portion for the port 853B. This is beneficial because having only one penetration limits the places where cells, beads, or particles in the settler device 800 can inadvertently accumulate and reduce the movement of cells, beads and particles toward the port 853B for collection. In addition, forming only one port in the lower conical portion 803B reduces the time required to manufacture the lower conical portion and eliminates a potential source of a leak from the settler device.

The cylindrical portion 808 has a lower end 817, an upper end 817, and an interior wall 819. The lower end 817 contacts and extends upwardly from the lower conical portion 803B.

The cones 809 may be of any embodiment described herein. In one embodiment, the cones 809 are similar to the cones 609 described in conjunction with FIG. 47 and include many of the same features. More specifically, each cone 809 of the plurality of cones includes a body with a first opening 844 oriented toward the lower conical portion 803B, a second opening 846 that is larger than the first opening, and an exterior edge 847 proximate to the second opening. The second opening 846 is oriented away from the lower conical portion 803B. The exterior edge 847 is spaced from the interior wall 819 to define an annular space 852 around the plurality of cones.

The cones 809 are approximately centered around the longitudinal axis 850 of the settling device 800 as generally illustrated in FIG. 81. More specifically, in one embodiment, the first and second openings 844, 846 of each cone 809 is approximately concentrically aligned with the longitudinal axis 850.

In one embodiment, an interior surface 814 of a cone is oriented at an angle of between approximately 5° to about 85° relative to the longitudinal axis 850. Optionally, the interior surface 814 is convex in longitudinal cross-section as generally illustrated in FIG. 81. For example, a longitudinal cross-section of a body of a cone 809 forms a line that is no linear. In one embodiment, the line has an arcuate shape with a first radius of curvature proximate to the first opening and a second radius of curvature proximate to the second opening, the second radius of curvature being different than the first radius of curvature.

The first openings 844 of the cones 809 define a central channel or column 845 that extends through the plurality of cones. The central column 845 (which is generally illustrated in FIG. 81), extends from the uppermost cone 809A through the lowest cone 809Z and is approximately concentrically aligned with the longitudinal axis 850. As cells and other particles settle out of fluid in the settling device 800 and onto the inner or settling surface 814 of a cone 809, the cells and particles slide down to the first opening 844 of the cone. Thereafter the cells and particles fall into the central column 845 and down to the lower conical portion 803B where they accumulate and can be collected through the port 853B.

The cones 809 optionally include a projection 813 (generally illustrated in FIG. 83) that extends from the interior surface 814. The projection 813 may have the same shape and arrangement as other projections 613 described herein. More specifically, the projections 813 (when present) are adapted to provide a predetermined distance 856 between an interior surface 814 of a first cone and a lower or exterior surface 816 of a second cone that is adjacent to and above the first cone. In one embodiment, the predetermined distance 856 between adjacent cones is between approximately 2 mm and approximately 30 mm, or approximately 5 mm.

Additionally, or alternatively, the cones 809 may include apertures 848. The apertures 848 may be the same as or similar to the holes 648 of the cones 609 described in conjunction with FIGS. 50-61. In one embodiment, the apertures 848 are spaced from the exterior edges 847 of the cones. The apertures are adapted to receive an alignment rod that extends generally vertically within the settler device 800. The apertures may have a circular shape. However, other shapes for the apertures are contemplated.

The apertures 848 may be formed in an alternating pattern on one or the other side of a projection 813. In this manner, when an alignment rod is passed through the apertures, the projections 813 are not aligned above each other and desired spacing 856 above each cone is provided by the offset projections.

The cones may include a projection 842 that extends outwardly from the exterior edge 847. The projection 842 can be used to align the cones 809. In some embodiments, the projection 842 may contact the interior wall 819 of the cylindrical portion 808. Alternatively, the projection 842 may be spaced from the interior wall.

The upper portion 803A is connected to the upper end 818 of the cylindrical portion 808. Notably, the upper portion 803A of the settler device 800 has a shape that is conical. More specifically, and referring now to FIGS. 81-82, the upper portion 803A has a first end 828 and a second end 829 separated by a conical portion 830.

The first end 828 is generally circular and has a first diameter. In one embodiment, the first diameter is greater than an interior diameter of the first openings 844 of the cones 809. In addition, the first diameter of the first end 828 is less than an interior diameter of the second openings 846 of the cones.

The first end 828 is oriented toward the lower conical portion 803B. More specifically, the first end 828 is positioned between the lower and upper ends 817, 818 of the cylindrical portion 808. The first end 828 can also be described as positioned between a first opening 844 and a second opening 846 of the uppermost cone 809A of the plurality of cones. Accordingly, the first end 828 is recessed into the cylindrical portion 808.

The conical portion 830 has a shape that generally corresponds to a least a portion of the interior surface 814 of the uppermost cone 809A. In one embodiment, a vertical cross-section of the conical portion 830 defines a line that is no linear. The line may have a slope and shape that match the shape of the cone interior surface 814. In this manner, the conical portion 830 is spaced from the interior surface 814 by a predetermined distance 858. The distance 858 is optionally between approximately 2 mm and approximately 30 mm, or approximately 5 mm. In one embodiment, the distance 858 is approximately equal to the distance 856 between adjacent cones.

This shape and configuration of the upper portion 803A is beneficial because it reduces the volume of the space above the interior surface 814 of the uppermost cone 809A. In this manner, the total liquid volume and resulting weight of the setter device 800 can be reduced without sacrificing the efficiency of the settler device. Moreover, reducing the volume of liquid above the inner surface 814 of the uppermost cone 809A improves the circulation of fluid within the settling device 800. Reducing the volume of the settler device also decreases the volume of fluid within the settling device, making it easier to adjust the temperature of the fluid and easier to control conditions of the fluid (such as its pH and levels of dissolved oxygen (DO), dissolved $CO_2$, glucose, lactate, glutamine, and ammonia) as well as nutrients in the fluid.

The second end 829 of the upper conical portion 803A has an outer edge that is generally circular and which has a second diameter that is greater than the first diameter. The second diameter is approximately equal to a diameter of the cylindrical portion 808. The second end 829 is interconnected to the upper end 818 of the cylindrical portion 808.

The upper conical portion 803A may include a plurality of ports 853A and 854A. The ports 853A, 854A may be the same as other ports 653A, 654A described herein and may be used in the same or similar manner.

The second end 829 of the upper conical portion 803A has at least one port 854A. The port 854A is positioned above the annual space 852 between the interior wall 819 and the exterior edges 847 of the cones 809. Optionally, the second end 829 includes from two to fourteen, or twelve, of the ports 854A. The ports 854A may be substantially evenly spaced around the second end 829.

A conduit 860 may be connected to the port 854A. In one embodiment, the conduit extends through the port. Alternatively, the conduit 860 may be connected to a portion of the port 854A extending into the settler device 800. Regardless, the conduit 860 can be positioned to extend downwardly into the annual space 852.

The conduit 860 may be the same as, or similar to, the conduits 660 of all embodiments described herein. Accordingly, the conduit 860 may include an interior lumen and an orifice 863 to withdraw fluid from the settler device 800. The orifice 863 may be formed at any position along the length of the conduit. Accordingly, the orifice 863 may be used to withdraw and sample fluid from any level of the annual space 852. Additionally, or alternatively, fluid samples may be taken from orifices 863 at different levels to determine if the pH, dissolved oxygen, dissolved $CO_2$, glucose, lactate, glutamine and ammonia in the fluid are evenly distributed and within acceptable ranges throughout the setter device. In this manner, a user can monitor the fluid to ensure it is circulating evenly within the settler device and to identify locations where the flow of fluid may be obstructed.

Additionally, or alternatively, the conduit 860 may optionally include a sensor to measure a condition of the fluid in the settler device. For example, the conduit 860 may include a sensor 822 to measure one or more of pH, dissolved oxygen, dissolved $CO_2$, glucose, lactate, glutamine and ammonia in the fluid. Additionally, or alternatively, the conduit 860 may include a sensor 826 to measure temperature of the fluid. The sensors 822 and/or 826 may be the same as, or similar to, the sensors 622 and 626 of all embodiments described herein.

In one embodiment, a transmission line 820 is inserted into a conduit 860 through the port 854A. The transmission line 820 can receive data from a sensor 822 associated with the conduit 860 and transmit the data to a display or a control system, such as a laptop or a personal computer.

In one embodiment, the transmission line 820 is a fiber optic cable and the conduit includes a transparent seal to receive data (or light) from a fluorescent dye sensor 622. The fluorescent dye sensor may be affixed on an exterior of the conduit 860 in contact with the fluid inside the settler device 800. The fluorescent dye sensor can measure one or more of pH, dissolved oxygen, dissolved $CO_2$, glucose, lactate, glutamine and ammonia in the fluid.

Additionally, or alternatively, a conduit 860 may optionally include a temperature sensor 826. The temperature sensor 826 may be positioned at an end of the conduit. However, the temperature sensor may be located at any other position of the conduit. In one embodiment, the temperature sensor 826 includes a heat-conductive seal such as a metal disk so that a data line 824 or a thermocouple may be inserted into the conduit 860 for measuring temperature (T). Other temperature sensors 826 known to those of skill in the art may be used with the settler device 800.

In one embodiment, cables 820, 824 extend from the conduit 860 to transmit data from the sensor 822/826 to an electronic hub or control system. In one embodiment, the control system is a laptop computer or a desktop computer.

Any suitable means known to those of skill in the art may be used to connect the sensors 822, 826 to the control system. For example, in one embodiment, the sensors 822, 826 transmit data wirelessly to the control system. In one embodiment, the sensors use Wi-Fi, Bluetooth™ NFC, other wireless communications protocol to transmit data to the control system.

Referring now to FIG. 81, the conduits 860 may have any desired length. Additionally, conduits 860 may have different lengths. For example, a first conduit 860A can have a first length that is shorter than a second length of a second conduit 860B. Similarly, a first orifice 863A of the first conduit 860A may be formed a first distance from the second end 829 that is less than a second distance from the second end of a second orifice 863B.

Additionally, or alternatively, a first sensor 822/826 associated with the first conduit 860A can measure a condition of the fluid at a first level of the settler device. A second sensor 822/826 associated with the second conduit 860B can measure the condition of the fluid at a second level that is lower than the first level. As described above, this is beneficial to ensure the fluid is flowing evenly through the settler device and that pH, dissolved oxygen, dissolved $CO_2$, glucose, lactate, glutamine and ammonia in the fluid and the temperature of the fluid are evenly distributed throughout the setter device.

Referring now to FIGS. 81-82, at least one port 853A extends through the first end 828 of the upper conical portion 803A. The port 853A is positioned above the central channel 845 defined by the first openings 844 of the cones 809. Optionally, the first end 828 includes from two to ten, or seven, of the ports 853A.

A conduit 860 can extend from the port 853A and into the central channel 845. For example, the conduit 860 may have a length sufficient to extend from the port 853A and downwardly past the first opening 844 of the uppermost cone 809A.

The conduit 860 may be used to withdraw fluid from the settler device and/or to measure a condition of the fluid. For example, a conduit 860E may have a free end 864 positioned within the central channel 845. Optionally, a lumen through the conduit 860E extends to the free end 864 such that fluid can be withdrawn through the conduit 860E.

Additionally, or alternatively, an orifice 863E may be formed at any position along the length of the conduit 860E. In this manner, the fluid 863E at any level of the central channel 845 may be withdrawn through the orifice 863E.

Withdrawing fluid from the central channel 845 through the conduit 860E can facilitate the flow of fluid upwardly within the annular space 852 such that cells or particles within the fluid settle onto the cones and migrate toward the central channel 845 and then downwardly to the lower conical portion 803B.

In one embodiment, a conduit 860C or 860D may include sensors 822 and/or 826 as described herein. Accordingly, conditions of fluid in the central channel 845, such as one or more of T, pH, dissolved oxygen, dissolved $CO_2$, glucose, lactate, glutamine and ammonia can be measured in the central column 845. In this manner, data from the sensors 822/826 positioned within the central column 845 may be compared to the data from similar sensors 822/826 positioned in the annular space 852 to identify differences in the fluid of the settler device. If differences in the T, pH, dissolved oxygen, dissolved $CO_2$, glucose, lactate, glutamine and ammonia are identified, the flow rates of fluids into or of fluid out of the settler device may be adjusted. Additionally, or alternatively, the flow rates of different liquid media components pumped into the settler device may be manipulated.

Referring now to FIGS. 80 and 83-85, the settler device 800 optionally includes a distributor 870 according to another embodiment of the present disclosure. The distributor 870 is configured to introduce a fluid, such as either a liquid or a gas, into the settler device.

The distributor 870 includes apertures 876 positioned to release the fluid which can flow up into the annular space 852 between the outer edges of the cones and the interior wall 819 of the cylindrical portion 808. The apertures 876 are sized to facilitate transport of fluid, cells or particles through the distributor 870. The apertures 876 may all be oriented in the same direction. Alternatively, some of the apertures can face different or opposite directions. Optionally, one or more of the apertures 876 can be oriented transverse to the longitudinal axis 850. Additionally, or alternatively, some of the apertures may be oriented radially or axially.

The distributor 870 generally includes a first ring 874A that is positioned below the lowest cone 809Z of the plurality of cones. In one embodiment, the first ring is positioned between the first and second openings 844, 846 of the lowest cone 809Z. The first ring 874A extends around the exterior surface 816 of the lowest cone 809Z. The first ring includes a plurality of apertures 876 through which fluids can flow.

A first tube 872A connects the first ring 874A to the upper conical portion 803A. The first tube transports fluids to and from the first ring through an internal lumen. In one embodiment, the first tube 872A extends upwardly in the annual space 852 and to a port 854A in the second end 829. Optionally, the first tube 872A extends through the port 854A. Alternatively, the first tube is connected to a portion of the port 854A within the settler device.

The first ring may include any number of the first tubes. For example, from one to five of the first tubes may be connected to the first ring. In one embodiment, the first ring 874A has three of the first tubes 872A.

In one embodiment, the lowest cone 809Z contacts the first ring 874A. Optionally, the first ring 874A supports the plurality of cones 809. In one embodiment, the first ring supports the plurality of cones 809 within the settling device. In this manner, the cones may be described as being suspended from the upper portion 803A of the housing by the first ring and its tubes 872A.

Additionally, contact of the first ring with the lowest cone 809Z also beneficially helps ensure proper alignment of the plurality of cones within the housing. For example, in one embodiment, the first ring and its vertical tubes 872A help to center or align the first openings 844 of the cones with the longitudinal axis 850 and/or ensure the spacing between the outer edges 847 of the cones and the interior wall 819 of the housing to define the annual space 852. Alternatively, the first ring 874A is spaced from the lowest cone 809Z.

Optionally, the tubes 872A contact a portion of the cones. In one embodiment, the tubes 872A contact outer edges 847 of the cones. Alternatively, the tubes 872A extend through slots or apertures 848 in the cones. In this manner, the tubes 872A can prevent unintended or inadvertent movement of the cones.

Additionally, or alternatively, the distributor 870 may optionally include a second ring 874B. The second ring has a plurality of apertures 876 for fluid to flow between the ring and the settler device. In one embodiment, the apertures 876 of the second ring are adapted to facilitate the flow of a liquid therethrough. For example, in one embodiment, the apertures of the second ring have a second size that is greater than a first size of the apertures of the first ring. In one embodiment, the apertures of the first ring are adapted to facilitate the flow of a gas therethrough.

The second ring 874B may be positioned below the first ring 874A. In one embodiment, the second ring 874A is positioned between the first ring 874A and the first opening 844 of the lowest cone 809Z of the plurality of cones.

The second ring 874B extends around the exterior surface 816 of the lowest cone 809Z. In one embodiment, the second ring has a second diameter that is less than a first diameter of the first ring 874A.

A second tube 872B with an internal lumen connects the second ring 874B to the upper conical portion 803A. The lumen can transport fluids to and from the second ring. In one embodiment, the second tube 872B extends upwardly in the annual space 852 and to a port 854A in the second end 829. Optionally, the second tube 872B extends through the port 854A. Alternatively, the second tube is connected to a portion of the port 854A within the settler device.

In one embodiment, the second ring 874B has three of the second tubes 872B. Alternatively, the second ring 874B may be connected to from one to five of the second tubes 872B.

Optionally, the second ring supports the plurality of cones 809 within the settling device. For example, the cones may be suspended from the upper portion 803A of the housing by the second ring and its tubes 872B. Additionally, or alternatively, the second ring and its tubes 872B help to center or align the first openings 844 of the cones with the longitudinal axis 850 and/or ensure the spacing between the outer edges 847 of the cones and the interior wall 819 of the housing to define the annual space 852. Alternatively, the second ring 874B is spaced from the lowest cone 809Z.

Additionally, or alternatively, the tubes 872B contact a portion of the cones 809, such as the outer edges of the cones. In this manner, the tubes 872B can prevent unintended or inadvertent movement of the cones. In one embodiment, the tubes 872B extend through slots or apertures 848 in the cones.

In one embodiment, the first and second rings 874A, 874B are formed separately. The first ring 874A can introduce a first fluid into the settler device 800. The second ring 874B can introduce a second fluid into the settler device. This is beneficial because in some operations the first fluid should be separated from the second fluid when introduced into the settling device. The first and second rings 874A, 874B may optionally be used to withdraw fluid from the settler device.

In one embodiment, during operation of the settler device, one or more of air, $O_2$, $CO_2$ and $N_2$ are introduced into the settling device through the first ring 874A of the distributor 870. Additionally, or alternatively, liquid media components may be pumped through the second ring 874B of the distributor. By manipulating the flow rates of the fluids through the first and second rings 874A, 874B, one or more of pH, dissolved oxygen, dissolved $CO_2$, glucose, lactate, glutamine and ammonia within the settling device are controlled. Optionally, a computer-controlled multi-gas mass flow controller is used to control the rates of fluids pumped into and out of the settling device.

In operation of the settler devices 600 and 800 of embodiments of the present disclosure, the cell culture fluid containing cells and/or particle of different sizes are pumped into the settler 600, 800 via one or more of the bottom ports 653B and/or 654B, 853B and the distributor 670, 870. The return flow is pumped out via the central bottom port 653B, 853B at a lower rate than the inlet flow rate, forcing a desired fraction of the inlet fluid to flow up in the annular space 652, 852 around the cones 609, 809, down through the conical channels between the cones, and flow up again via the central open channel 645, 845 and out of the top central port 653A, 853A.

Optionally, a heater can be connected to one or more of the ports 653, 654, 853, 854 to adjust the temperature of liquid within the settler 600, 800. For example, in one embodiment, a heat exchanger to heat or cool the inlet cell culture media can be connected to a bottom side port 654B, the central port 653B, 853B, or the outer ports 654A, 854A.

The larger and faster settling live stem cells, or cell clusters, or microcarrier beads settle on the conical surfaces of the cones, slide down and are collected via the central opening 645, 845 into the central bottom port 653B, 853B for recycling or harvesting. The slower or non-settling exosomes, smaller dead cells and cell debris, or smaller single live stem cells are washed up by the upward flow of liquid in the annual space between the cones and an interior surface of the settler housing as well as the central open channel 645, 845 and carried out via the top central outlet port 653A, 853A.

Computational fluid dynamic (CFD) simulations have confirmed the flow patterns of fluid through the flow channels of the settler devices of the present disclosure and been used extensively to guide the design of elements of embodiments of the settler devices of the present disclosure.

While the above description of the flow patterns occurs during continuous pumping of cell culture fluid via one or more of the inlet ports 654B and through a distributor 670, 870, in some biopharmaceutical applications such as clarifying cell culture broth from a fed-batch bioreactor, it is desirable to collect most of the secreted product in clarified supernatant remaining inside settler device 600, 800 after pumping in all the cell culture broth. It is useful to have an optional port 654A, 854A on the top side 603A, 803A with an inserted tube 660, 860 to aspirate the clarified supernatant remaining inside settler device to maximize the recovery of valuable product in the clarified supernatant. In other potential applications of the settler device 600, 800, such as cell washing, concentration and harvest, the optional top side port 654A, 854A may be useful for aspirating or removing the wash liquid, while settled cells, cell clusters or microcarrier beads are concentrated and harvested at the bottom port 653B, 853B, without subjecting these sensitive cells to shear-inducing centrifugal forces in the currently used devices for the same processes. As the liquid flows up or down through any of these straight or arcuate conical settler channels, its velocity changes drastically due to the cross-sectional area for liquid flow increasing with the radius. Therefore, the previous academic studies on settling particle flowrates and the simple algebraic equation for sizing rectilinear inclined settlers for a desired rate of clarified supernatant (presuming there is only one particle size) are not readily applicable for the conical or nearly conical surfaces of the cones of the present disclosure.

Many autologous and allogeneic cell therapy manufacturing protocols require gentle separation of cells and particles in a sterile, closed flow-through device. For example, ex vivo expansion of mesenchymal stem cells (MSCs) on microcarrier beads in a suspension bioreactor is followed by an enzymatic detachment of cells after they reach confluence on the beads and subsequent separation of MSCs from the beads. Currently the separation of stem cells (~20 microns) from microcarrier beads (~500 microns) is carried out by passing the mixture through sterile steel mesh with openings of about 100 microns, causing significant shear damage to stem cells and loss of about 15% of the expanded stem cells harvested through this separation process. Another example is in growth of Pluripotent stem cells (PSCs) into cell clusters or organoids. The growth of PSCs requires daily media exchanges to support their fast growth in small bioreactors, such as T-flasks or shake flasks. However, it is difficult to retain the cell clusters inside the bioreactor during their daily media exchanges. Even with extreme care, significant loss of cell clusters (~100 microns) is experienced during the slow pipetting of the spent media from the flasks.

In contrast, the settler devices of the present disclosure result in less loss and damage of cells. More specifically, settler devices of the present disclosure can separate dead Chinese hamster ovary (CHO) cells and cell debris (<8 microns) from live cells (>12 microns). The settler devices of the present disclosure can also separate 20 micron cells from 500 micron beads in some embodiments. Further, in some embodiments that incorporate sensors for pH and dissolved oxygen (DO), dissolved $CO_2$, glucose, lactate, glutamine, ammonia, and temperature, control of these culture parameters inside the settler devices of the present disclosure facilitate the growth of various stem cells (PSCs, MSCs) inside and eliminate the shear damage to cells, cell clusters and microcarrier beads. The sensors can rapidly detect any contamination by adventitious agents like microorganisms in real time or during regular sampling intervals. In addition, a settler device of the present disclosure can be used for stem cell expansion, differentiation, concentration and harvest without the need for keeping the settler device in and incubator or transporting the settler device between an incubator or a biosafety cabinet.

In one embodiment, the settler devices of the present disclosure can operate in perfusion bioreactor applications to separate and remove dead cells and cell debris (size <10 microns) from the settler device during continuous removal of spent media and recycle of live and productive CHO cells (12-24 microns) back into the settler device. In this manner, the settler device of the present disclosure eliminates two major problems experienced by many stem cell expansion and harvesting protocols: (i) daily open operator manipulation steps in a biosafety cabinet for media exchange operations to maintain cell expansion; and (ii) recurrent loss of stem cells and cell clusters during the spent media removal process. More specifically, in some embodiment, the settler device of the present disclosure eliminates these two problems because it does not require any open operator manipulation in a biosafety cabinet and no viable stem cells or cell clusters are lost during removal of the spent media.

The settler devices of the present disclosure provide additional benefits, including table-top control of cell culture parameters of the liquid medium inside the settler device. In contrast, all other commercially available stack of tissue culture flasks need to be placed inside an incubator. Further, the liquid flowing down gently over the adherent cells growing on the conical surfaces inside the settler devices of the present disclosure perfuse the cells with fresh oxygenated media, whereas the other cell culture systems hold the medium static or unmixed on the adherent cells for about 24 hours.

In any of the settler devices of this disclosure, liquid may be directed into, or drawn out of, any of the ports or openings in the housing of the settling device by one or more pumps (for example a peristaltic pump) in liquid communication with the port or opening. Such pumps, or other means causing the liquid to flow into or out of the settler devices, may operate continuously or intermittently. If operated intermittently, during the period when the pump is off, settling of particles or cells occurs while the surrounding fluid is still. This allows those particles or cells that have already settled to slide down the inclined conical surfaces unhindered by the upward flow of liquid. Intermittent operation has the advantage that it can improve the speed at which the cells slide downwardly, thereby improving cell viability and productivity. In a specific embodiment, a pump is used to direct a liquid suspension of cells from a bioreactor or fermentation media into the settler devices of the present disclosure.

Spent media can be removed continuously from the central top port 653A, 853A of the settler devices of the present disclosure by pumping fresh media in through a bottom side port 654B or through a distributor 670, 870. This prevents the loss of any live cells or cell clusters during the removal of the spent media. All other scalable adherent cell culture stacks have to be carried into a biosafety cabinet for daily manual media exchange operations inside.

Finally, harvesting of expanded stem cells after they have grown to confluence on the available growth surface is easily accomplished by adding the required enzyme solutions into the settler device 600, 800 through the inlet media ports 654B or a distributor 670, 870 and allowing the detached cells to slide gently down into the central channel 645, 845 of the cones and exit through the central bottom port 653B, 853B. In contrast, the other adherent cell culture system have to be taken inside the biosafety cabinet and manipulated extensively to harvest the detached stem cells.

Size distribution data for samples obtained from tests of the settler devices of embodiments of the present disclosure provided about 50% viable CHO cells showing a small peak of dead cells (8-10μ) and the settler's top effluent showing very clearly that the smaller dead cells and cell debris (less than 8μ) are removed preferentially in the top effluent. Further, viability percentage of CHO cells recovers from its typical drop over 7 days of fed-batch culture to around 90% in our perfusion bioreactor attached with a settler device of the present disclosure soon after the perfusion flow is turned on and increased gradually to remove dead cells and cell debris selectively from the bioreactor.

The settler devices of the present disclosure can be operated as an integrated bioreactor/settler which beneficially replaces two separate devices and eliminates many peristaltic pumps which were previously required for the transport of cell culture liquid between the two current devices. The settler devices can therefore be used for several important applications in cell therapy manufacturing, such as but not limited to: (i) separating single stem cells gently from microcarrier beads, (ii) retaining cell clusters completely while removing spent media continuously in a perfusion operation, (iii) concentrating and harvesting stem cells without any shear damage and (iv) growing adherent stem cells on the large area of inclined settling surfaces inside by installing sensors inside settler device to measure pH, DO, dissolved $CO_2$, glucose, lactate, glutamine, ammonia, and T and controlling these culture parameters by sparging a manipulated mixture of air, $O_2$, $CO_2$, $N_2$ and air and/or by manipulating the flow rates of different liquid media components pumped in through a distributor 670, 870 into the settler device.

The settler device provides many advantages over the current state-of-the-art, including the elimination of any need for (i) keeping the settler device inside an incubator to control all the culture parameters within the settler device, (ii) keeping the settler device inside a biosafety cabinet for sterile liquid handling and cell harvesting, and (iii) transporting the settler device back and forth between an incubator and biosafety cabinet for daily media exchanges.

To provide additional background, context, and to further satisfy the written description requirements of 35 U.S.C. § 112, the following references are incorporated by reference herein in their entireties: European Patent EP0521583B1, U.S. Pat. Nos. 1,701,068, 2,230,386, U.S. Pat. Nos. 2,261, 101, 2,307,154, 2,651,415, 5,624,580, 5,840,198, 5,948,271, 6,146,891, U.S. Patent App. Pub. 2005/0194316, U.S. Patent App. Pub. 2007/0246431, U.S. Patent App. Pub. 2009/159523, U.S. Patent App. Pub. 2011/097800, U.S. Patent App. Pub. 2012/180662, U.S. Patent App. Pub. 2014/011270, U.S. Patent App. Pub. 2014/0225286, and U.S. Patent App. Pub. 2017/0090490.

The foregoing examples of the present disclosure have been presented for purposes of illustration and description. These examples are not intended to limit the disclosure to the form disclosed herein. Consequently, variations and modifications commensurate with the teachings of the description of the disclosure, and the skill or knowledge of the relevant art, are within the scope of the present disclosure. The specific embodiments described in the examples provided herein are intended to further explain the best mode known for practicing the disclosure and to enable others skilled in the art to utilize the disclosure in such, or other, embodiments and with various modifications required by the particular applications or uses of the present disclosure. It is intended that the appended claims be construed to include alternative embodiments to the extent permitted by the prior art.

What is claimed is:

1. A settling device operable for use in the production of cell therapy products, biological proteins, polypeptides or hormones, vaccines, viral vectors or gene therapy products, comprising:
    a lower conical portion with a port;
    a cylindrical portion with a lower end contacting and extending upwardly from the lower conical portion, an upper end, and an interior wall;
    a plurality of cones provided within the settling device, each cone of the plurality of cones including a body with a first opening oriented toward the lower conical portion, a second opening that is larger than the first opening, and an exterior edge proximate to the second opening that is spaced from the interior wall, the plurality of cones approximately centered around a longitudinal axis of the settling device;
    an upper portion connected to the upper end of the cylindrical portion, wherein the upper portion has a shape that is conical with a first end that has a first diameter and a second end with a second diameter that is larger than the first diameter, the first end being oriented toward the lower conical portion; and
    an outer conduit extending from the upper portion and downwardly in an annular space between the interior wall of the cylindrical portion and the exterior edges of the cones.

2. The settling device of claim 1, wherein the outer conduit is oriented approximately parallel to the longitudinal axis.

3. The settling device of claim 1, wherein the outer conduit comprises a lumen and an orifice to withdraw fluid from the settling device, the orifice positioned between the upper and lower ends of the cylindrical portion to withdraw fluid from a predetermined level within the settling device.

4. The settling device of claim 1, further comprising a sensor associated with the outer conduit to measure a condition within the settling device, wherein the sensor is operable to measure at least one of pH, dissolved oxygen (DO), dissolved $CO_2$, glucose, lactate, glutamine, ammonia, and temperature.

5. The settling device of claim 4, wherein the sensor is positioned between the upper and lower ends of the cylindrical portion.

6. The settling device of claim 1, wherein the first end of the upper portion is positioned between the first opening and the second opening of an uppermost cone of the plurality of cones.

7. The settling device of claim 1, further comprising a second conduit extending from the first end of the upper portion, the second conduit extending downwardly through the first opening of an uppermost cone of the plurality of cones and into a central column defined by the first openings of the plurality of cones.

8. The settling device of claim 7, wherein the second conduit includes a sensor to measure a condition of fluid in the central column.

9. The settling device of claim 7, wherein the second conduit has a lumen and an orifice to withdraw fluid from the central column.

10. The settling device of claim 1, further comprising a first distributor element positioned within the settling device below the second opening of a lowest cone of the plurality of cones, the first distributor element configured to introduce fluid into or withdraw fluid from the settling device.

11. The settling device of claim 10, wherein the first distributor element comprises a first ring extending around an exterior surface of the lowest cone, the first ring connected to a first tube extending upwardly in the annular space and to the upper portion.

12. The settling device of claim 11, further comprising a second distributor element positioned within the settling device, the second distributor element being separate from the first distributor element and comprising:
    a second ring extending around the exterior surface of the lowest cone and positioned between the first ring and the first opening of the lowest cone of the plurality of cones; and
    a second tube extending upwardly in the annular space and to the upper portion.

13. The settling device of claim 10, wherein the first distributor element comprises a body with:
    a lower surface;
    a lower protrusion extending from the lower surface to define a channel between the lower surface of the body and an interior surface of the lower conical portion;
    an upper surface;
    an upper protrusion extending from the upper surface to define a space between the upper surface of the body and the lowest cone of the plurality of cones; and
    a plurality of holes extending through the body proximate to a large end of the body.

14. The settling device of claim 1, wherein an interior surface of each cone of the plurality of cones is convex and oriented at an angle of between approximately 5 degrees to about 85 degrees relative to the longitudinal axis, and wherein a longitudinal cross-section of a body of a cone of the plurality of cones forms a line with an arcuate shape, the line having a first radius of curvature proximate to the first opening and a second radius of curvature proximate to the second opening, the second radius of curvature being different than the first radius of curvature.

15. A method of settling particles in a suspension, comprising:

introducing a liquid suspension of particles into a settling device, the settling device comprising:
- a lower conical portion with a port;
- a cylindrical portion with a lower end contacting and extending upwardly from the lower conical portion, an upper end, and an interior wall;
- a plurality of cones provided within the settling device, each cone of the plurality of cones including a body with a first opening oriented toward the lower conical portion, a second opening that is larger than the first opening, and an exterior edge proximate to the second opening that is spaced from the interior wall;
- an upper portion connected to the upper end of the cylindrical portion;
- a first conduit extending from the upper portion and including an orifice positioned within a central column defined by the first openings of the plurality of cones;
- an outer conduit extending from the upper portion and downwardly in an annular space between the interior wall of the cylindrical portion and the exterior edges of the cones; and
- a sensor associated with the outer conduit;

measuring one or more of pH, dissolved oxygen (DO), dissolved $CO_2$, glucose, lactate, glutamine, ammonia and temperature in the annular space with the sensor associated with the outer conduit;

collecting a clarified liquid through the orifice of the first conduit; and collecting a concentrated liquid suspension from the port of the lower conical portion.

16. The method of claim 15, wherein the liquid suspension comprises at least one of:
(a) a recombinant cell suspension, an alcoholic fermentation, a suspension of solid catalyst particles, a municipal waste-water, industrial waste-water, mammalian cells, bacterial cells, yeast cells, plant cells, algae cells, plant cells, mammalian cells, murine hybridoma cells, stem cells, CAR-T cells, red blood precursor and mature cells, cardiomyocytes, yeast in beer, and eukaryotic cells;
(b) recombinant microbial cells selected from at least one of *Pichia pastoris, Saccharomyces cerevisiae, Kluyveromyces lactis, Aspergillus niger, Escherichia coli,* and *Bacillus subtilis*; and
(c) one or more of microcarrier beads, affinity ligands, and surface activated microspherical beads; and
wherein the clarified liquid collected comprises at least one of biological molecules, organic or inorganic compounds, chemical reactants, chemical reaction products, hydrocarbons (e.g., terpenes, isoprenoids, polyprenoids), polypeptides, proteins (e.g., brazzein, colony stimulating factors), alcohols, fatty acids, hormones (e.g., insulin, growth factors), carbohydrates, glycoproteins (e.g., erythropoietin, monoclonal antibodies), beer, and biodiesel.

17. The method of claim 15, further comprising controlling at least one of pH, dissolved oxygen, dissolved $CO_2$, glucose, lactate, glutamine and ammonia within the settling device by manipulating the flow rates of at least one of air, $O_2$, $CO_2$ and $N_2$ introduced into the settling device through a first distributor element or manipulating the flow rates of different liquid media components pumped in through a second distributor element.

18. The method of claim 15, wherein introducing a liquid suspension of particles into the settling device comprises pumping the liquid suspension through a distributor element positioned within the settling device below the second opening of a lowest cone of the plurality of cones.

19. A settling device operable for use in the production of cell therapy products, biological proteins, polypeptides or hormones, vaccines, viral vectors or gene therapy products, comprising:
- a lower conical portion with a port;
- a cylindrical portion with a lower end contacting and extending upwardly from the lower conical portion, an upper end, and an interior wall;
- a plurality of cones provided within the settling device, each cone of the plurality of cones including a body with a first opening oriented toward the lower conical portion, a second opening that is larger than the first opening, and an exterior edge proximate to the second opening that is spaced from the interior wall, the plurality of cones approximately centered around a longitudinal axis of the settling device;
- an upper portion connected to the upper end of the cylindrical portion;
- an outer conduit extending from the upper portion and downwardly in an annular space between the interior wall of the cylindrical portion and the exterior edges of the cones; and
- a first distributor element positioned within the settling device below the second opening of a lowest cone of the plurality of cones, the first distributor element configured to introduce fluid into or withdraw fluid from the settling device, wherein the first distributor element comprises a body with:
  - a lower surface;
  - a lower protrusion extending from the lower surface to define a channel between the lower surface of the body and an interior surface of the lower conical portion;
  - an upper surface;
  - an upper protrusion extending from the upper surface to define a space between the upper surface of the body and the lowest cone of the plurality of cones; and
  - a plurality of holes extending through the body proximate to a large end of the body.

20. The settling device of claim 19, wherein the upper portion has a shape that is conical with a first end that has a first diameter and a second end with a second diameter that is larger than the first diameter, the first end being oriented toward the lower conical portion.

* * * * *